(12) United States Patent
Silverbrook

(10) Patent No.: US 7,874,665 B2
(45) Date of Patent: *Jan. 25, 2011

(54) PRINTER HAVING NESTED MEDIA TRAYS

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 12/436,124

(22) Filed: May 6, 2009

(65) Prior Publication Data

US 2009/0213162 A1   Aug. 27, 2009

Related U.S. Application Data

(63) Continuation of application No. 11/014,731, filed on Dec. 20, 2004, now Pat. No. 7,543,808, which is a continuation-in-part of application No. 10/760,254, filed on Jan. 21, 2004, now Pat. No. 7,448,734.

(51) Int. Cl.
*B41J 2/01* (2006.01)

(52) U.S. Cl. .................................... 347/104

(58) Field of Classification Search ............... 347/104
See application file for complete search history.

(56) References Cited

U.S. PATENT DOCUMENTS

| | | | |
|---|---|---|---|
| 4,958,822 A | 9/1990 | Rutishauser et al. | |
| 4,985,710 A | 1/1991 | Drake | |
| 5,160,945 A | 11/1992 | Drake | |
| 5,191,382 A | 3/1993 | Okamura et al. | |
| 5,221,397 A | 6/1993 | Nystrom | |
| 5,240,238 A | 8/1993 | Lee | |
| 5,577,613 A * | 11/1996 | Laidlaw | 220/4.27 |
| 5,666,595 A | 9/1997 | Sameshima et al. | |
| 5,682,186 A | 10/1997 | Bohorquez et al. | |
| 5,746,528 A | 5/1998 | Mayer et al. | |
| 5,785,308 A | 7/1998 | Flores et al. | |
| 6,017,117 A | 1/2000 | McClelland et al. | |
| 6,032,942 A | 3/2000 | Cho | |
| 6,049,346 A | 4/2000 | Cho | |
| 6,106,178 A | 8/2000 | Chiu | |
| 6,148,172 A | 11/2000 | Kanda et al. | |

(Continued)

FOREIGN PATENT DOCUMENTS

EP    0722839 A2    7/1996

(Continued)

*Primary Examiner*—Matthew Luu
*Assistant Examiner*—Shelby Fidler

(57) ABSTRACT

A printer is provided having a media tray, a printhead, and a delivery passage extending from a base of the printer to the printhead past the media tray via which media is supplied from the media tray to the printhead. The base is configured to be received in a recessed region of an upper surface of a first auxiliary media tray in a nested arrangement. The base has a first opening for delivering first auxiliary media supplied by the first auxiliary tray into the delivery passage. A lower surface of the first auxiliary tray is configured to be received in a recessed region of an upper surface of a second auxiliary media tray in a nested arrangement. The lower surface has a second opening for delivering second auxiliary media supplied by the second auxiliary tray into the delivery passage via an auxiliary delivery passage of the first auxiliary tray.

1 Claim, 44 Drawing Sheets

U.S. PATENT DOCUMENTS

| | | |
|---|---|---|
| 6,270,177 B1 | 8/2001 | King et al. |
| 6,281,912 B1 | 8/2001 | Silverbrook |
| 6,331,004 B1 | 12/2001 | Katou et al. |
| 6,382,769 B1 | 5/2002 | Silverbrook |
| 6,397,035 B2 * | 5/2002 | Kataoka et al. ............. 399/388 |
| 6,409,306 B1 | 6/2002 | Shiida |
| 6,439,908 B1 | 8/2002 | Silverbrook et al. |
| 6,443,555 B1 | 9/2002 | Silverbrook et al. |
| 6,554,398 B2 | 4/2003 | Wyangaert et al. |
| 6,557,976 B2 | 5/2003 | McElfresh et al. |
| 6,588,882 B2 | 7/2003 | Silverbrook |
| 6,592,205 B2 | 7/2003 | Beerling et al. |
| 6,643,480 B2 | 11/2003 | Kuwata et al. |
| 6,652,082 B2 | 11/2003 | Silverbrook |
| 6,672,706 B2 | 1/2004 | Silverbrook |
| 6,679,584 B2 | 1/2004 | Silverbrook |
| 6,691,998 B2 | 2/2004 | Mori |
| 6,820,974 B2 | 11/2004 | Silverbrook |
| 2002/0056962 A1 * | 5/2002 | Mori .......................... 271/242 |
| 2005/0035998 A1 | 2/2005 | Ando et al. |
| 2005/0062827 A1 | 3/2005 | Otsuka et al. |

FOREIGN PATENT DOCUMENTS

| | | |
|---|---|---|
| EP | 0921006 B1 | 6/1999 |
| JP | 03-234651 | 10/1991 |
| JP | 05-048784 | 2/1993 |
| JP | 09-251222 | 9/1997 |
| JP | 2001-328323 | 11/2001 |
| JP | 2002-029045 | 1/2002 |
| JP | 2002-127426 | 5/2002 |
| WO | WO 00/54973 | 9/2000 |
| WO | WO 01/39981 A1 | 6/2001 |
| WO | WO 03/086770 A1 | 10/2003 |

* cited by examiner

PRINTER HAVING NESTED MEDIA TRAYS

CROSS REFERENCE TO RELATED APPLICATION

The present application is a Continuation of U.S. Ser. No. 11/014,731 filed Dec. 20, 2004, now issued U.S. Pat. No. 7,543,808, which is a Continuation-In-Part application of U.S. Ser. No. 10/760,254 filed on Jan. 21, 2004, now issued U.S. Pat. No. 7,448,734. In the interests of brevity, the disclosure of the parent application is incorporated in its entirety into the present specification by cross reference.

FIELD OF THE INVENTION

The present invention relates to a printer unit for printing images from an image input device, and in particular to a printer unit having an integral data connector that can be readily connected to an image input device to receive image data for printing.

CO-PENDING APPLICATIONS

The following applications have been filed by the Applicant simultaneously with application Ser. No. 11/014,731:

| | | | | |
|---|---|---|---|---|
| 7,152,972 | 7,621,620 | 7,669,961 | 7,331,663 | 7,360,861 |
| 7,328,973 | 7,427,121 | 7,407,262 | 7,303,252 | 7,249,822 |
| 7,537,309 | 7,311,382 | 7,360,860 | 7,364,257 | 7,390,075 |
| 7,350,896 | 7,429,096 | 7,384,135 | 7,331,660 | 7,416,287 |
| 7,488,052 | 7,322,684 | 7,322,685 | 7,311,381 | 7,270,405 |
| 7,303,268 | 7,470,007 | 7,399,072 | 7,393,076 | 7,681,967 |
| 7,588,301 | 7,249,833 | 7,524,016 | 7,490,927 | 7,331,661 |
| 7,524,043 | 7,300,140 | 7,357,492 | 7,357,493 | 7,566,106 |
| 7,380,902 | 7,284,816 | 7,284,845 | 7,255,430 | 7,390,080 |
| 7,328,984 | 7,350,913 | 7,322,671 | 7,380,910 | 7,431,424 |
| 7,470,006 | 7,585,054 | 7,347,534 | 7,306,320 | 7,377,635 |
| 7,686,446 | 11/014,730 | | | |

The disclosures of these co-pending applications are incorporated herein by reference.

CROSS REFERENCES TO RELATED APPLICATIONS

The following patents or patent applications filed by the applicant or assignee of the present invention are hereby incorporated by cross-reference.

| | | | | |
|---|---|---|---|---|
| 7,364,256 | 7,258,417 | 7,293,853 | 7,328,968 | 7,270,395 |
| 7,461,916 | 7,510,264 | 7,334,864 | 7,255,419 | 7,284,819 |
| 7,229,148 | 7,258,416 | 7,273,263 | 7,270,393 | 6,984,017 |
| 7,347,526 | 7,465,015 | 7,364,255 | 7,357,476 | 11/003,614 |
| 7,284,820 | 7,341,328 | 7,246,875 | 7,322,669 | 6,623,101 |
| 6,406,129 | 6,505,916 | 6,457,809 | 6,550,895 | 6,457,812 |
| 7,152,962 | 6,428,133 | 7,204,941 | 7,282,164 | 7,465,342 |
| 7,278,727 | 7,417,141 | 7,452,989 | 7,367,665 | 7,138,391 |
| 7,153,956 | 7,423,145 | 7,456,277 | 7550585 | 7,122,076 |
| 7,148,345 | 7,416,280 | 7,252,366 | 7,488,051 | 7,360,865 |
| 7628468 | 7,334,874 | 7,393,083 | 7,475,965 | 7578582 |
| 7591539 | 10/922,887 | 7,472,984 | 10/922,874 | 7,234,795 |
| 7,401,884 | 7,328,975 | 7,293,855 | 7,410,250 | 7,401,900 |
| 7527357 | 7,410,243 | 7,360,871 | 10/922,877 | 6,746,105 |
| 7,156,508 | 7,159,972 | 7,083,271 | 7,165,834 | 7,080,894 |
| 7,201,469 | 7,090,336 | 7,156,489 | 7,413,283 | 7,438,385 |
| 7,083,257 | 7,258,422 | 7,255,423 | 7,219,980 | 7591533 |
| 7,416,274 | 7,367,649 | 7,118,192 | 7618121 | 7,322,672 |
| 7,077,505 | 7,198,354 | 7,077,504 | 7614724 | 7,198,355 |
| 7,401,894 | 7,322,676 | 7,152,959 | 7,213,906 | 7,178,901 |
| 7,222,938 | 7,108,353 | 7,104,629 | 7,246,886 | 7,128,400 |
| 7,108,355 | 6,991,322 | 7,287,836 | 7,118,197 | 7575298 |
| 7,364,269 | 7,077,493 | 6,962,402 | 7686429 | 7,147,308 |
| 7524034 | 7,118,198 | 7,168,790 | 7,172,270 | 7,229,155 |
| 6,830,318 | 7,195,342 | 7,175,261 | 7,465,035 | 7,108,356 |
| 7,118,202 | 7,510,269 | 7,134,744 | 7,510,270 | 7,134,743 |
| 7,182,439 | 7,210,768 | 7,465,036 | 7,134,745 | 7,156,484 |
| 7,118,201 | 7,111,926 | 7,431,433 | 09/575,197 | 7,079,712 |
| 6,825,945 | 7,330,974 | 6,813,039 | 6,987,506 | 7,038,797 |
| 6,980,318 | 6,816,274 | 7,102,772 | 7,350,236 | 6,681,045 |
| 6,728,000 | 7,173,722 | 7,088,459 | 09/575,181 | 7,068,382 |
| 7,062,651 | 6,789,194 | 6,789,191 | 6,644,642 | 6,502,614 |
| 6,622,999 | 6,669,385 | 6,549,935 | 6,987,573 | 6,727,996 |
| 6,591,884 | 6,439,706 | 6,760,119 | 7,295,332 | 7,064,851 |
| 6,826,547 | 6,290,349 | 6,428,155 | 6,785,016 | 6,831,682 |
| 6,741,871 | 6,927,871 | 6,980,306 | 6,965,439 | 6,840,606 |
| 7,036,918 | 6,977,746 | 6,970,264 | 7,068,389 | 7,093,991 |
| 7,190,491 | 7,511,847 | 7663780 | 10/962,412 | 7,177,054 |
| 7,364,282 | 10/965,733 | 10/965,933 | 10/974,742 | 7538793 |
| 6,982,798 | 6,870,966 | 6,822,639 | 6,737,591 | 7,055,739 |
| 7,233,320 | 6,830,196 | 6,832,717 | 6,957,768 | 7,170,499 |
| 7,106,888 | 7,123,239 | 10/727,181 | 10/727,162 | 7,377,608 |
| 7,399,043 | 7,121,639 | 7,165,824 | 7,152,942 | 10/727,157 |
| 7,181,572 | 7,096,137 | 7,302,592 | 7,278,034 | 7,188,282 |
| 7592829 | 10/727,180 | 10/727,179 | 10/727,192 | 10/727,274 |
| 10/727,164 | 7523111 | 7573301 | 7660998 | 10/754,536 |
| 10/754,938 | 10/727,160 | 10/934,720 | 7,369,270 | 6,795,215 |
| 7,070,098 | 7,154,638 | 6,805,419 | 6,859,289 | 6,977,751 |
| 6,398,332 | 6,394,573 | 6,622,923 | 6,747,760 | 6,921,144 |
| 10/884,881 | 7,092,112 | 7,192,106 | 7,374,266 | 7,427,117 |
| 7,448,707 | 7,281,330 | 10/854,503 | 7,328,956 | 10/854,509 |
| 7,188,928 | 7,093,989 | 7,377,609 | 7600843 | 10/854,498 |
| 10/854,511 | 7,390,071 | 10/854,525 | 10/854,526 | 7549715 |
| 7,252,353 | 7607757 | 7,267,417 | 10/854,505 | 7517036 |
| 7,275,805 | 7,314,261 | 10/854,490 | 7,281,777 | 7,290,852 |
| 7,484,831 | 10/854,523 | 10/854,527 | 7549718 | 10/854,520 |
| 7631190 | 7557941 | 10/854,513 | 10/854,499 | 10/854,501 |
| 7,266,661 | 7,243,193 | 10/854,518 | 10/934,628 | |

Some applications have been listed by docket numbers. These will be replaced when application numbers are known.

BACKGROUND OF THE INVENTION

With the development of high-speed, high-quality printers, e.g., a printer printing more than about 30 pages per minute at least 1200 dots per inch, such as those developed and proposed by the present Applicant, for example, in International Application Publication No. WO 00/64679, it is necessary to provide high-precision print media feeding and handling through the printhead assembly. This is because such printers use non-scanning, pagewidth printheads which extend across the width of the sheets of print media so as to print directly thereon as the print media passes the printhead. Thus, precise control of the print media path is fundamental to ensuring good print quality. This is especially the case when duplex printing is provided by using two adjacent printheads.

Accordingly, there is a need to detect the presence of anomalies in the print media being supplied to the printhead in order to guard against multiple-page feeds and the like, which can result in reprinting being required, thus reducing the advantage of providing high-speed printing capabilities.

BACKGROUND OF THE INVENTION

Traditionally, printer units have been employed in a home or office environment to connect to a personal computer, to enable electronic documents and images to be readily downloaded to the printer unit for printing. Standard connecting cables are typically provided to connect the printer unit to the computer, and such cables are generally configured to mate with standard sockets provided in the printer unit and sockets associated with the computer, to establish electrical connection for transmission of image data.

Whilst such a connection system is sufficient for connecting a printer unit to a permanent or semi-permanent image source such as a computer, it does not readily lend itself to establishing an electrical connection between portable image sources such as digital cameras and the like, which typically require specific connecting leads.

Digital cameras capable of producing video or still images have become increasingly popular, due in the main to their ease of use and the fact that images are stored electronically rather than on a roll of film. In this regard, in order to produce traditional photos of the stored images, the images are downloaded from the camera to an image printer where the image is printed onto a media, such as photographic paper. This can be performed at retail outlets whereby a dedicated printer unit is provided to receive the image from the camera and print out selected images onto appropriate sized paper. At such outlets the camera can be docked into position with the dedicated printer unit or connected by supplied cables, to facilitate the transfer of the image data from the printer unit to the printer unit. As the printer unit is dedicated to performing such tasks, the printer unit typically is provided with a wide range of connectors to suit the variety of digital cameras commercially available.

In recent times, many commercially available printer units have been introduced which are capable of receiving image data from a mobile source such as a digital camera and allow printing of images from such a source. Typically, such printer units are provided with standard sockets which receive connecting cables that are provided with the mobile source and allow the mobile source to communicate with the printer unit to transmit images for printing. In these cases, if a connecting cable is required to connect the mobile source to the printer unit, the user must have ready access to the connecting cable, which requires the cable to be carried with the user. In this regard, for matters of convenience, the user may not always carry the connecting cable with the camera, or the connecting cable may be misplaced and as such, a replacement cable may need to be accessed to facilitate printing.

There is a requirement therefore, to provide a printer unit that is capable of receiving data from an image input device such as a digital camera or the like, and which includes a connector element that is integral with the printer unit to receive image data from the image input device for printing.

SUMMARY OF THE INVENTION

In a first aspect the present invention provides an inkjet printer unit for use in a network environment comprising:

a body having;

at least one media input tray for supplying one or more sheets of media for printing;

a print engine for printing an image on a sheet of media, said print engine including a removable pagewidth inkjet printhead; and a delivery passage for delivering a sheet of media from the at least one media input tray to the print engine for printing;

wherein the base of the body is configured to receive at least one auxiliary media input tray for supplying one or more sheets of media for printing, and an opening is provided in said base to receive a sheet of media from said auxiliary media input tray for delivery to the print engine via said delivery passage.

Optionally the base of the body comprises an edge portion and a central portion, whereby the central portion projects beyond the edge portion.

Optionally the central portion is received within a recess provided in the auxiliary media input tray.

Optionally the opening is formed in the edge portion of the base.

Optionally the delivery passage extends from the opening to the print engine.

Optionally the opening communicates directly with the delivery passage whereby a sheet of media received by said opening is received within said delivery passage.

Optionally the delivery passage comprises one or more transport rollers to deliver the sheet of media to the print engine.

Optionally the print engine comprises a control system and the control system controls the operation of the one or more transport rollers to control the delivery of the sheet of media to the print engine.

Optionally the print engine comprises an inlet for receiving the sheet of media from the delivery passage, and the delivery passage is arranged to deliver the sheet of media into said inlet.

Optionally the print engine comprises a cartridge and the pagewidth printhead is provided on said cartridge.

Optionally the cartridge comprises one or more ink storage reservoirs for storing ink for printing by said pagewidth printhead.

Optionally the cartridge is removable from the print engine.

Optionally the print engine comprises a cradle and the cradle is configured to receive the cartridge.

Optionally the cradle is mounted to said body and includes an inlet for receiving a sheet of media from said delivery passage.

In a further aspect there is provides an inkjet printer unit, wherein the print engine also comprises a removable cartridge, the printer unit further comprising a data input means for receiving image data from an image input device; and wherein the data input means includes a connector that is extendible from the printer unit to connect with the image input device and which facilitates transferal of said image data from the image input device to the print engine for printing.

In a further aspect there is provides an inkjet printer unit, the printer unit further comprising at least one auxiliary media input tray adapted to support the body thereon for supplying one or more sheets of media to the print engine for printing; wherein, the print engine includes a pagewidth printhead has at least 30000 ink delivery nozzles arranged thereon for ejecting ink onto a surface of said media.

In a further aspect there is provides an inkjet printer unit, wherein the print engine has a control system for controlling the operation of the printhead, the printer unit further comprising: at least one auxiliary media input tray adapted to support the body thereon for supplying one or more sheets of media to the print engine for printing;

wherein, the printhead has a plurality of ink ejection nozzles arranged thereon for ejecting individual drops of ink onto a surface of the media and the control system determines whether a nozzle ejects a drop of ink at a rate of at least 50 million determinations per second.

In a second aspect the present invention provides a printer unit comprising:

a data input means for receiving image data from an image input device; and, a print engine for printing an image associated with said image data, the print engine comprising a cartridge and a pagewidth printhead, the pagewidth printhead being removable with the cartridge removable; wherein the data input means includes a connector that is extendible from the printer unit to connect with the image input device and which facilitates transferal of said image data from the image input device to the print engine for printing.

Optionally the connector is retractable such that when the connector is not connected to the image input device, it is contained substantially within the printer unit.

Optionally the connector comprises an electrical cable and a plug.

Optionally the plug is adapted to be received within a socket provided in the image input device.

Optionally the electrical cable is a USB cable.

Optionally the connector is a pictbridge connector.

Optionally the image input device is a digital camera.

Optionally the cartridge comprises one or more ink storage reservoirs for storing ink for printing by said pagewidth printhead.

Optionally the print engine further comprises a cradle and the cradle is configured to receive the cartridge.

In a further aspect there is provided an inkjet printer unit, the printer unit further comprising:

a body having;

at least one media input tray for supplying one or more sheets of media for printing; and a delivery passage for delivering a sheet of media from the at least one media input tray to the print engine for printing; wherein the base of the body is configured to receive at least one auxiliary media input tray for supplying one or more sheets of media for printing, and an opening is provided in said base to receive a sheet of media from said auxiliary media input tray for delivery to the print engine via said delivery passage.

In a further aspect there is provided an inkjet printer unit, the printer unit further comprising:

a body having;

at least one media input tray for supplying one or more sheets of media for printing; and at least one auxiliary media input tray adapted to support the body thereon for supplying one or more sheets of media to the print engine for printing; wherein, the print engine includes a pagewidth printhead having at least 30000 ink delivery nozzles arranged thereon for ejecting ink onto a surface of said media.

In a further aspect there is provided an inkjet printer unit, wherein the print engine has a control system for controlling the operation of the printhead, the printer unit further comprising:

a body having;

at least one media input tray for supplying one or more sheets of media for printing; and at least one auxiliary media input tray adapted to support the body thereon for supplying one or more sheets of media to the print engine for printing; wherein, the printhead has a plurality of ink ejection nozzles arranged thereon for ejecting individual drops of ink onto a surface of the media and the control system determines whether a nozzle ejects a drop of ink at a rate of at least 50 million determinations per second.

In a third aspect the present invention provides an inkjet printer unit for use in a network environment comprising:

a body having;

at least one media input tray for supplying one or more sheets of media for printing; and a print engine for printing an image on a sheet of media;

at least one auxiliary media input tray adapted to support the body thereon for supplying one or more sheets of media to the print engine for printing; wherein, the print engine includes a pagewidth printhead having at least 30000 ink delivery nozzles arranged thereon for ejecting ink onto a surface of said media.

Optionally the pagewidth printhead has at least 10,000 ink delivery nozzles arranged thereon for ejecting ink onto a surface of said media.

Optionally the pagewidth printhead has at least 20,000 ink delivery nozzles arranged thereon for ejecting ink onto a surface of said media.

Optionally the pagewidth printhead has at least 50,000 ink delivery nozzles arranged thereon for ejecting ink onto a surface of said media.

Optionally the print engine comprises a cartridge and the pagewidth printhead is provided on the cartridge.

Optionally the cartridge comprises one or more ink storage reservoirs for storing ink for printing by said pagewidth printhead.

Optionally the cartridge is removable from the print engine.

Optionally the print engine comprises a cradle, the cradle being configured to receive the cartridge.

Optionally the cradle is mounted to said body and includes a securing mechanism for securing the cartridge within the cradle.

Optionally the body is supported on a surface of the auxiliary media input tray and said body engages with said surface in a nested arrangement.

Optionally the base of said body is provided with an elongate opening for receiving one or more sheets of media supplied from said auxiliary media input tray.

Optionally the one or more sheets of media supplied by the auxiliary media input tray are delivered to the print engine from said elongate opening via a delivery passage formed within the body.

Optionally the delivery passage comprises one or more transport rollers for transporting the one or more sheets of media to the print engine.

Optionally the one or more sheets of media supplied by the media input tray of the body of the printer unit are delivered to the print engine from said input media tray via the delivery passage formed within the body.

Optionally the transport rollers are controlled by a control system provided in the print engine to control the rate of delivery of the sheets of media to the print engine.

Optionally the print engine comprises an inlet for receiving the sheets of media delivered via the delivery passage.

Optionally the print engine comprises a drive mechanism for receiving the sheets of media via the inlet and delivering the sheets past the pagewidth printhead for printing.

Optionally the drive mechanism comprises a drive roller and a pinch roller, and the drive roller is driven by a print engine motor under control of the control system of the print engine.

Optionally the print engine comprises an exit mechanism positioned downstream of the pagewidth printhead for receiving the printed sheets of media and delivering the sheets to a collection area for collection.

Optionally the exit mechanism comprises an exit roller and idler wheels, and the exit roller is driven by the print engine motor under control of the control system of the print engine.

In a further aspect there is provided an inkjet printer unit, wherein the print engine includes a removable pagewidth inkjet printhead, the printer unit further comprising a delivery passage for delivering a sheet of media from the at least one media input tray to the print engine for printing; wherein the base of the body is configured to receive at least one auxiliary media input tray for supplying one or more sheets of media for printing, and an opening is provided in said base to receive a sheet of media from said auxiliary media input tray for delivery to the print engine via said delivery passage.

In a further aspect there is provided an inkjet printer unit, wherein the print engine includes a cartridge and a pagewidth printhead, the pagewidth printhead being removable with the cartridge removable, the printer unit further comprising a data input means for receiving image data from an image input device, wherein the data input means includes a connector that is extendible from the printer unit to connect with the image input device and which facilitates transferal of said image data from the image input device to the print engine for printing.

In a further aspect there is provided an inkjet printer unit, wherein the print engine includes a control system for controlling the operation of the printhead, the printer unit further comprising at least one auxiliary media input tray adapted to support the body thereon for supplying one or more sheets of media to the print engine for printing; wherein, the printhead has a plurality of ink ejection nozzles arranged thereon for ejecting individual drops of ink onto a surface of the media and the control system determines whether a nozzle ejects a drop of ink at a rate of at least 50 million determinations per second.

In a fourth aspect the present invention provides an inkjet printer unit comprising:

a body having; at least one media input tray for supplying one or more sheets of media for printing; and a print engine having a printhead for printing an image on said media and a control system for controlling the operation of the printhead;

at least one auxiliary media input tray adapted to support the body thereon for supplying one or more sheets of media to the print engine for printing; wherein, the printhead has a plurality of ink ejection nozzles arranged thereon for ejecting individual drops of ink onto a surface of the media and the control system determines whether a nozzle ejects a drop of ink at a rate of at least 50 million determinations per second.

Optionally the printhead has a plurality of ink ejection nozzles arranged thereon for ejecting individual drops of ink onto a surface of the media and the control system determines whether a nozzle ejects a drop of ink at a rate of at least 100 million determinations per second.

Optionally the printhead has a plurality of ink ejection nozzles arranged thereon for ejecting individual drops of ink onto a surface of the media and the control system determines whether a nozzle ejects a drop of ink at a rate of at least 300 million determinations per second.

Optionally the printhead has a plurality of ink ejection nozzles arranged thereon for ejecting individual drops of ink onto a surface of the media and the control system determines whether a nozzle ejects a drop of ink at a rate of at least one billion determinations per second.

Optionally the printhead is a pagewidth printhead.

Optionally the print engine comprises a cartridge and the printhead is provided on the cartridge.

Optionally the cartridge comprises one or more ink storage reservoirs for storing ink for printing by said printhead.

Optionally the cartridge is removable from the print engine.

Optionally the print engine comprises a cradle, the cradle being configured to receive the cartridge.

Optionally the cradle is mounted to said body and includes a securing mechanism for securing the cartridge within the cradle.

Optionally the body is supported on a surface of the auxiliary media input tray and said body engages with said surface in a nested arrangement.

Optionally the base of said body is provided with an elongate opening for receiving one or more sheets of media supplied from said auxiliary media input tray.

Optionally the one or more sheets of media supplied by the auxiliary media input tray are delivered to the print engine from said elongate opening via a delivery passage formed within the body.

Optionally the delivery passage comprises one or more transport rollers for transporting the one or more sheets of media to the print engine.

Optionally the one or more sheets of media supplied by the media input tray of the body of the printer unit are delivered to the print engine from said input media tray via the delivery passage formed within the body.

Optionally the transport rollers are controlled by the control system to control the rate of delivery of the sheets of media to the print engine.

Optionally the print engine comprises an inlet for receiving the sheets of media delivered via the delivery passage.

Optionally the print engine comprises a drive mechanism for receiving the sheets of media via the inlet and delivering the sheets past the pagewidth printhead for printing.

Optionally the drive mechanism comprises a drive roller and a pinch roller, and the drive roller is driven by a print engine motor under control of the control system of the print engine.

Optionally the print engine comprises an exit mechanism positioned downstream of the pagewidth printhead for receiving the printed sheets of media and delivering the sheets to a collection area for collection.

Optionally the exit mechanism comprises an exit roller and idler wheels, and the exit roller is driven by the print engine motor under control of the control system of the print engine.

In a further aspect there is provided an inkjet printer unit, wherein the printhead is a removable pagewidth inkjet printhead, the printer unit further comprising a delivery passage for delivering a sheet of media from the at least one media input tray to the print engine for printing; wherein the base of the body is configured to receive at least one auxiliary media input tray for supplying one or more sheets of media for printing, and an opening is provided in said base to receive a sheet of media from said auxiliary media input tray for delivery to the print engine via said delivery passage.

In a further aspect there is provided an inkjet printer unit, wherein the print engine comprises a cartridge and a pagewidth printhead, the pagewidth printhead being removable with the cartridge removable, the printer unit further comprising a data input means for receiving image data from an image input device; wherein the data input means includes a connector that is extendible from the printer unit to connect with the image input device and which facilitates transferal of said image data from the image input device to the print engine for printing.

In a further aspect there is provided an inkjet printer unit, wherein, the printhead is a pagewidth printhead having at least 30000 ink delivery nozzles arranged thereon for ejecting ink onto a surface of said media.

DETAILED DESCRIPTION OF PREFERRED EMBODIMENTS

Figure 1:
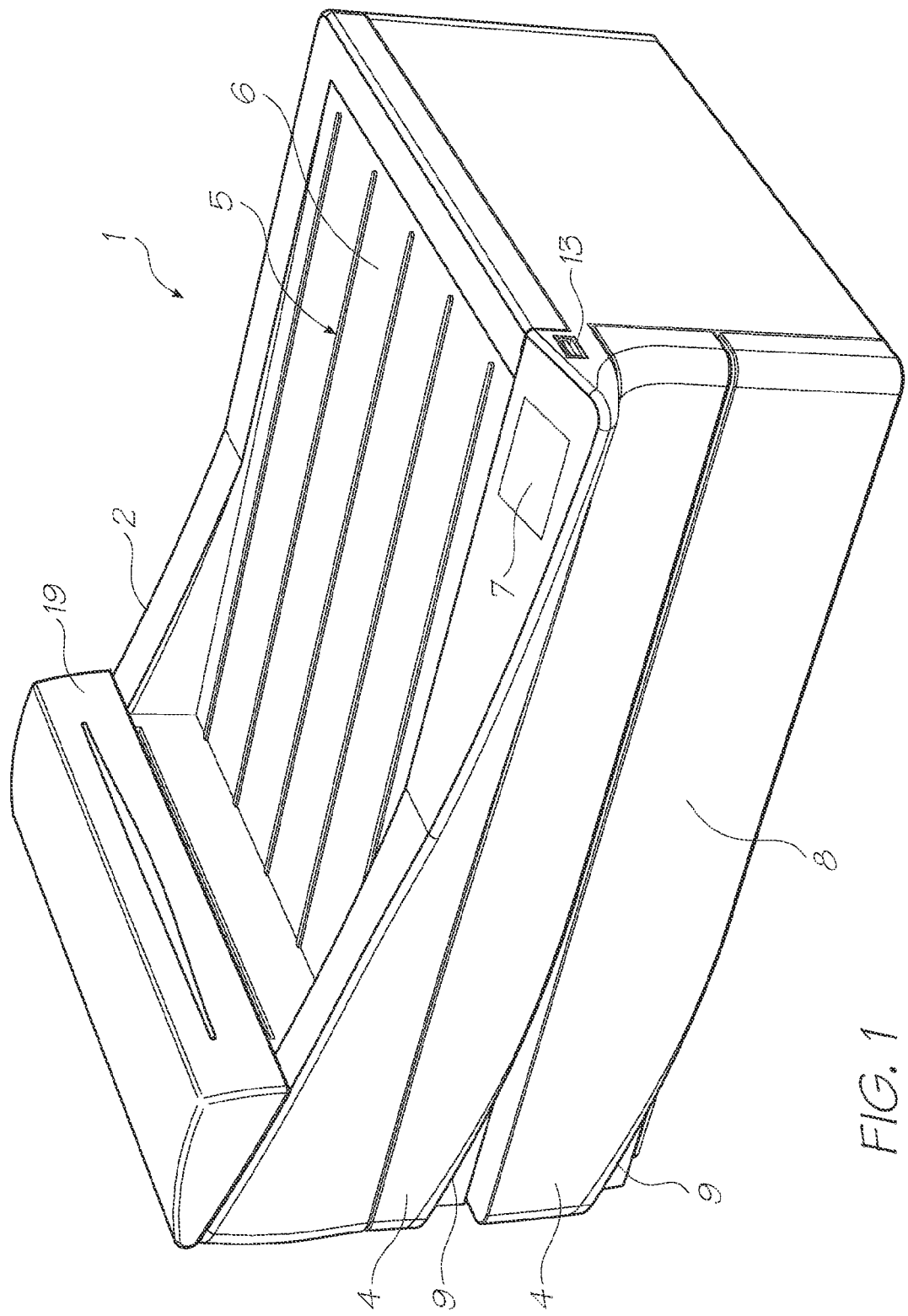
FIG. 1 shows a front perspective view of a printer unit in accordance with an embodiment of the present invention.
Figure 2:
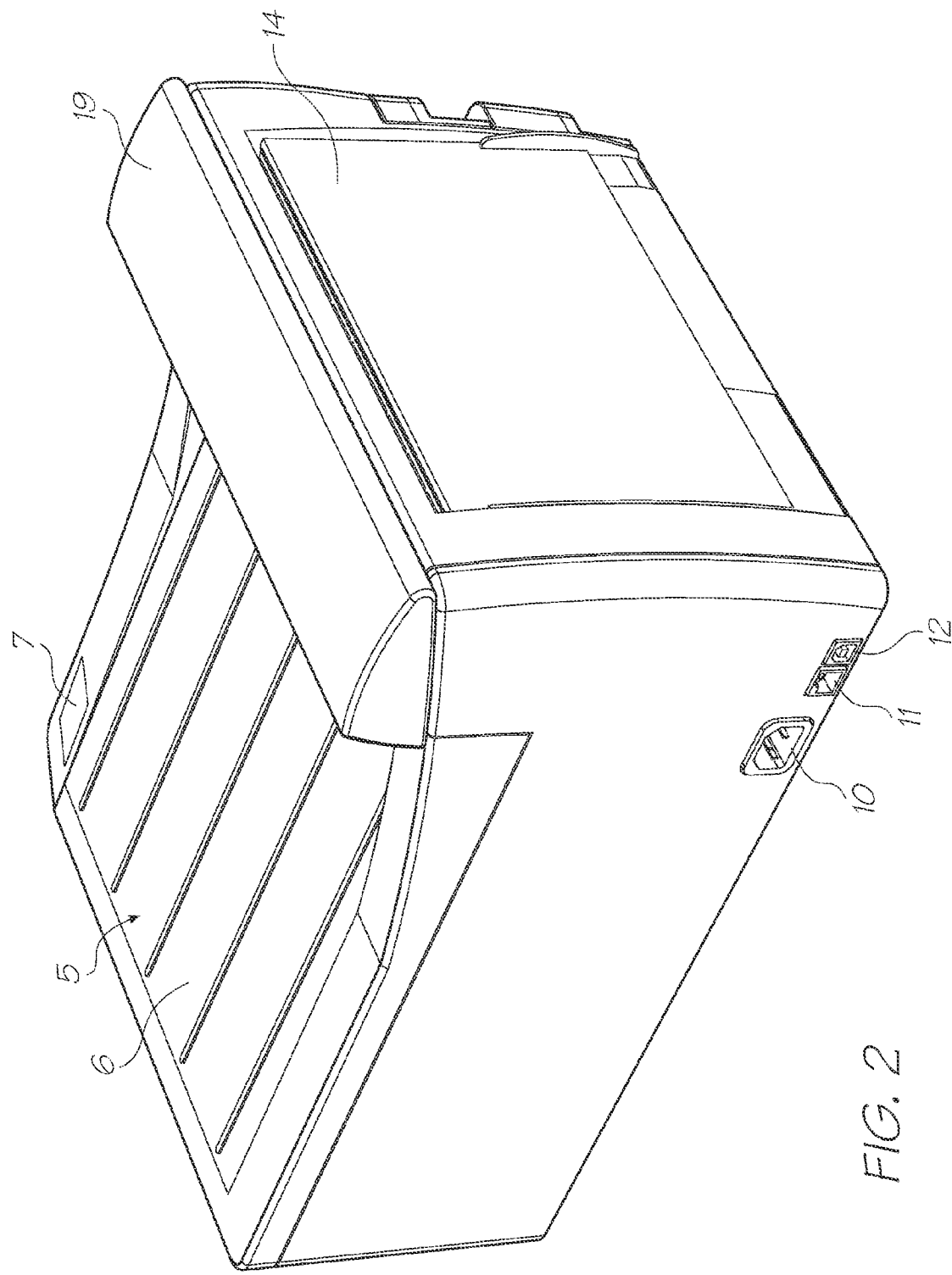
FIG. 2 shows a rear perspective view of the printer unit of FIG. 1.

As shown in FIGS. 1-10, in an exemplary form the present invention is embodied in an inkjet printer unit 1 that can be used within a network or workgroup to receive print jobs from one or more sources and to print the jobs at high speed and with full color photo quality of at least 1600 dpi. It should be appreciated that within the following detailed description and claims, all references to printing speeds and in particular the term ppm, will refer to pages printed with full process colour images (not spot colour) and requiring at least 80% image coverage of the page. For example a printer unit capable of printing 60 ppm will refer to a printer unit that is capable of printing 60 pages of print media a minute whereby the pages are printed in full process colour and the image covers at least 80% of the page. As such, all comparisons with existing printer units are based upon this printing requirement.

The printer unit 1 has a substantially rectangular body 2 which is configured to house a print engine 3 and two input media trays 4, for storing a supply of media for printing by said print engine 3. The body 2 is configured such that the upper surface 5 forms a media output region 6 for collecting printed media following printing by the print engine 3. In this arrangement, the printer unit 1 is sized and shaped to accommodate a wide variety of media sizes, such as classic photo sized media as well as A4 sized media and U.S. legal sized media (8.5" by 14").

Figure 3:
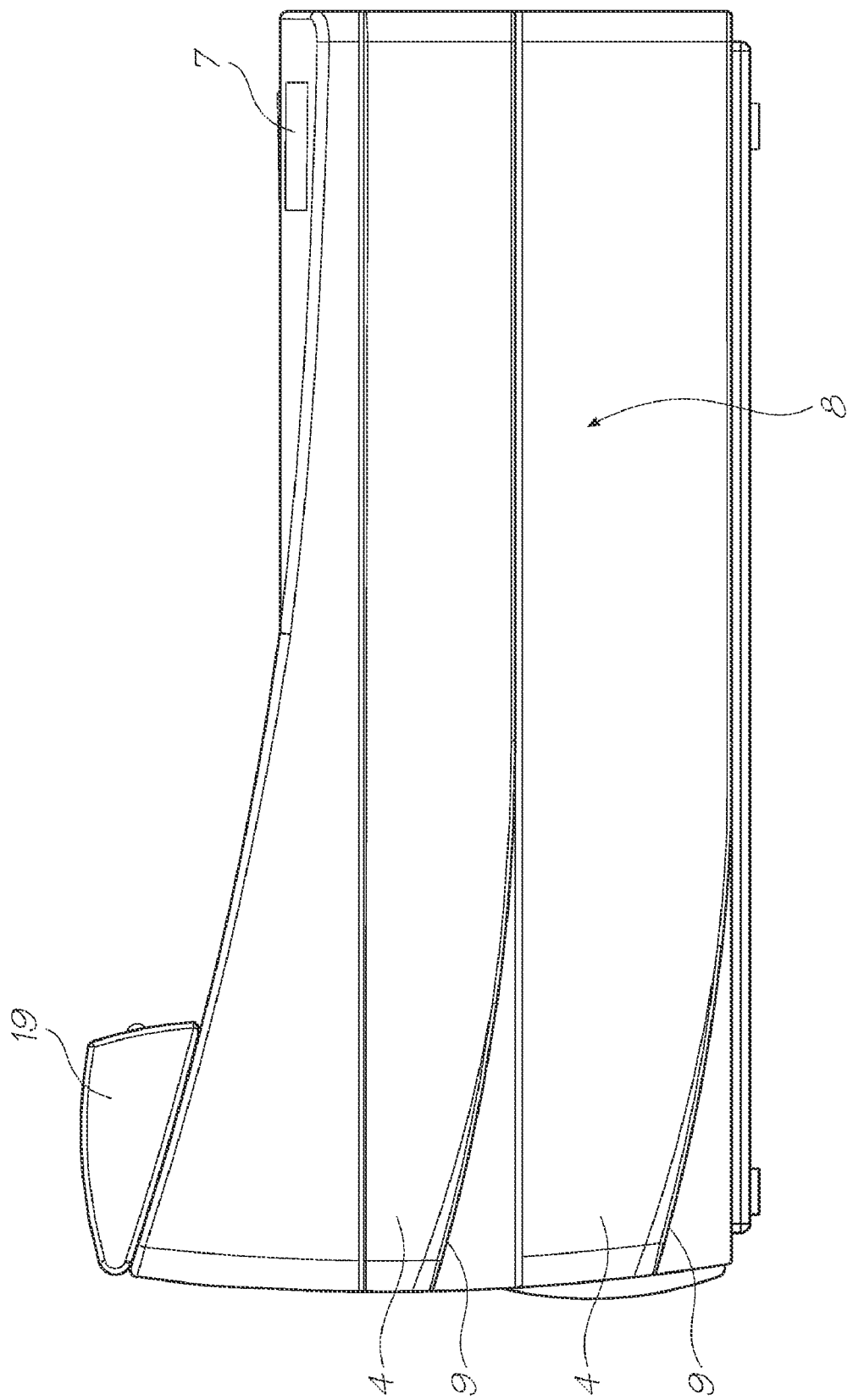
FIG. 3 shows a front plan view of the printer unit of FIG. 1.

As shown more clearly in FIG. 3, the front of the printer unit 1 is provided with a user interface unit 7, which may be in the form of an LCD touchscreen. The user interface unit 7 conveys information to the user and allows the user to directly input information to the printer unit 1 to control the operation of the printer unit 1, via selecting an option on the display screen. The type of information which the user interface unit 7 may display to the user and which the user may input into the printer unit can vary, however typically this can relate to the status of the ink stored in the printer unit 1, the need to correct any paper jams or the like, as well as information relating to the ink refilling procedure. The use of a touch screen LCD is particularly beneficial as a user interface, as the display can be programmed to a specific language thereby overcoming the need to provide separate markings or text on the printer unit 1 which may be specific to the country to which the printer unit is to be used. However, it should be appreciated that the user interface unit 7 could be in a number of different forms, such as conventional buttons and the like, which allow the user to interact with the printer unit 1.

Figure 9:
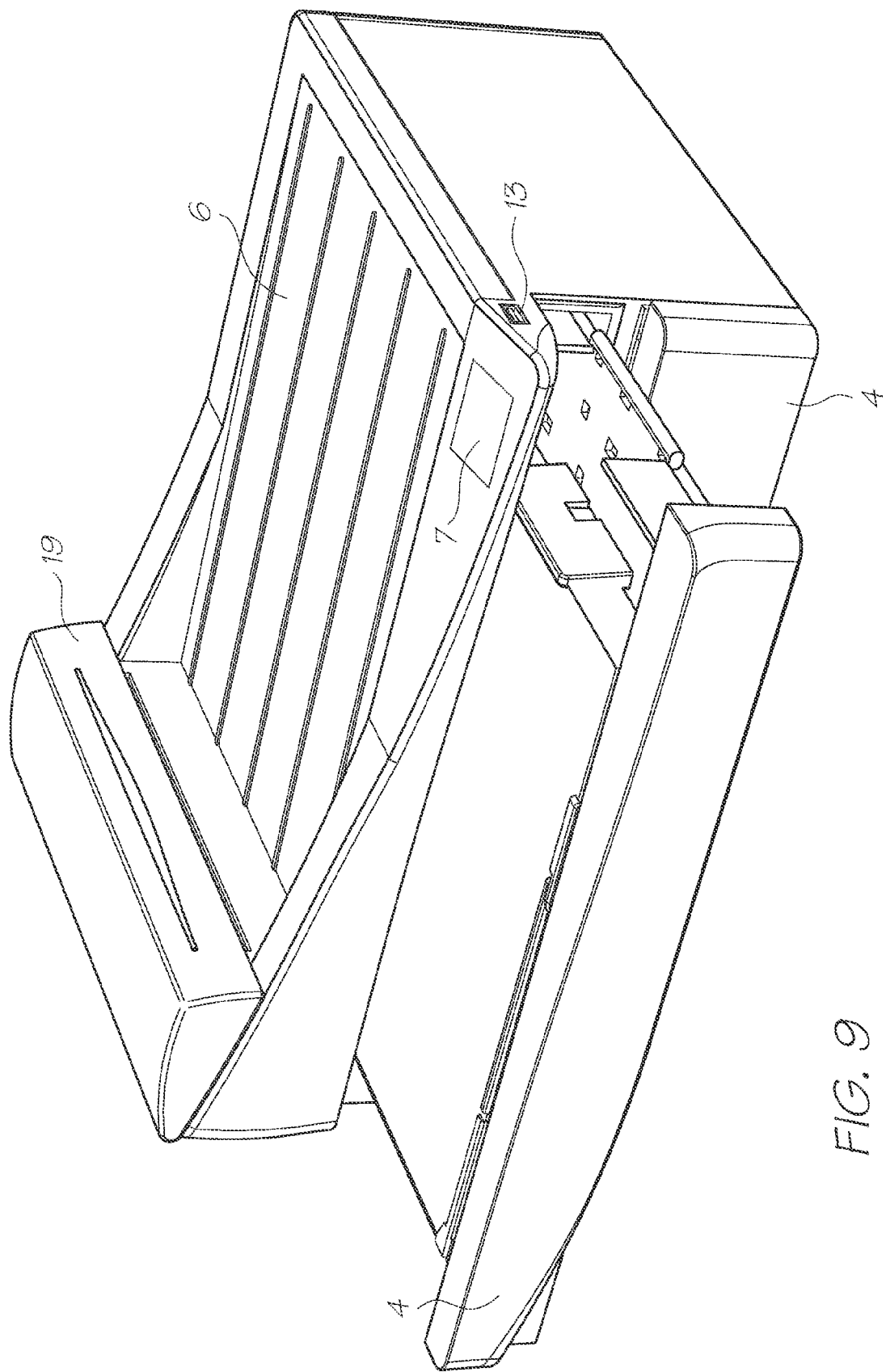
FIG. 9 shows a front perspective view of the printer unit of FIG. 1 having the upper media tray partly withdrawn.
Figure 10:
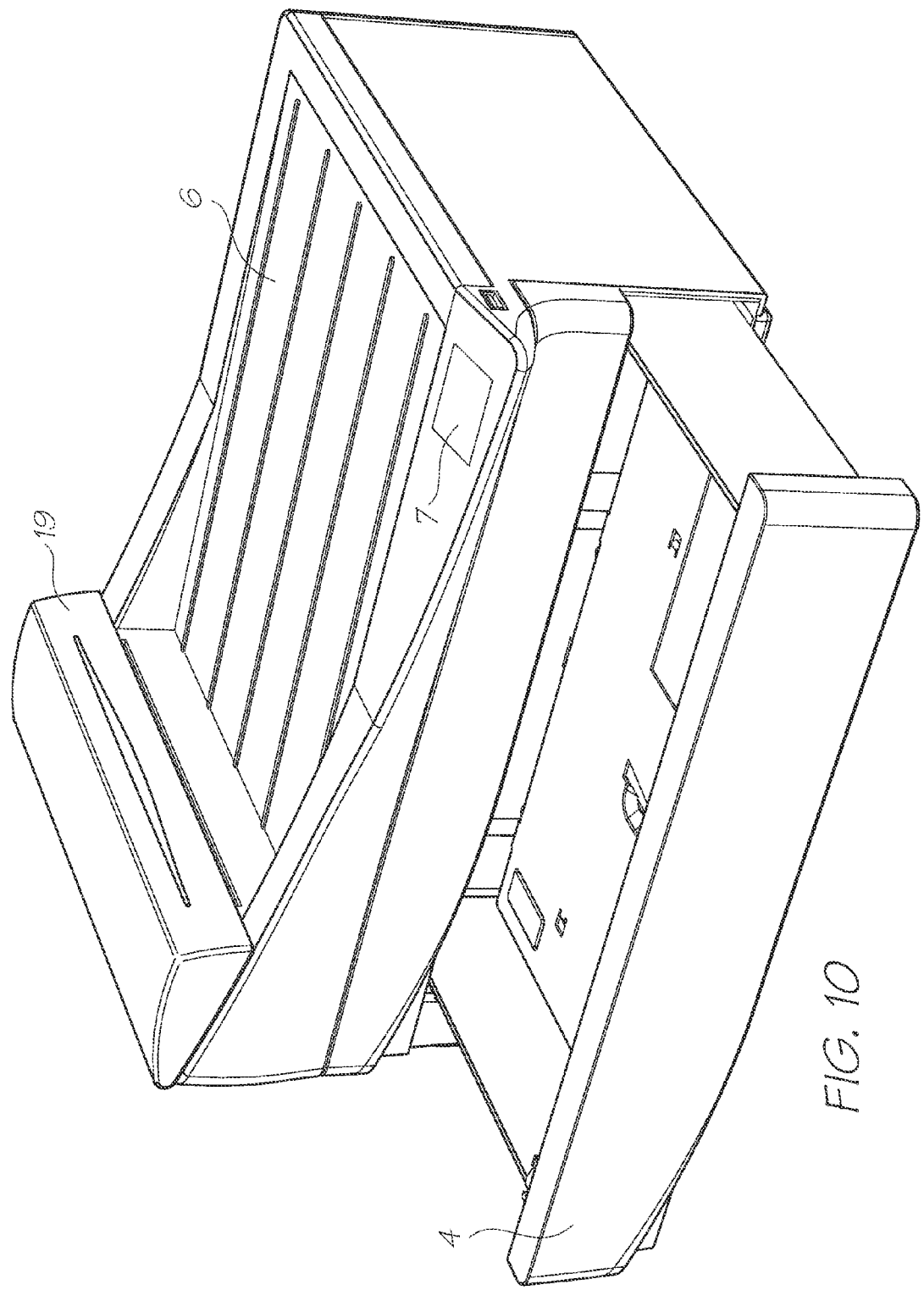
FIG. 10 shows a front perspective view of the printer unit of FIG. 1 having the lower media tray partly withdrawn.

The input media trays 4 are accessed from the front of the printer unit 1, and as such the front surfaces 8 of the trays 4, form the majority of the front surface of the printer unit 2. As shown in FIGS. 9 and 10, the input media trays 4 are arranged to slide outwardly from the body 2 to enable access to the interior of the trays such that media can be loaded into the trays for printing by the print engine 3. In this regard, the front surfaces 8 of the trays 4 are provided with a handle 9 to allow gripping of the trays 4 to facilitate the sliding action required to access the interior of the trays. The interior of the trays 4 are arranged to accommodate various sized media, and as shown, the upper tray is configured to have a capacity less than the lower tray, namely the upper tray has a 250 sheet capacity and the lower tray has a 500 sheet capacity. It should be appreciated however that the capacity of the trays could vary and in some instances both trays could have the same capacity.

Figure 4:
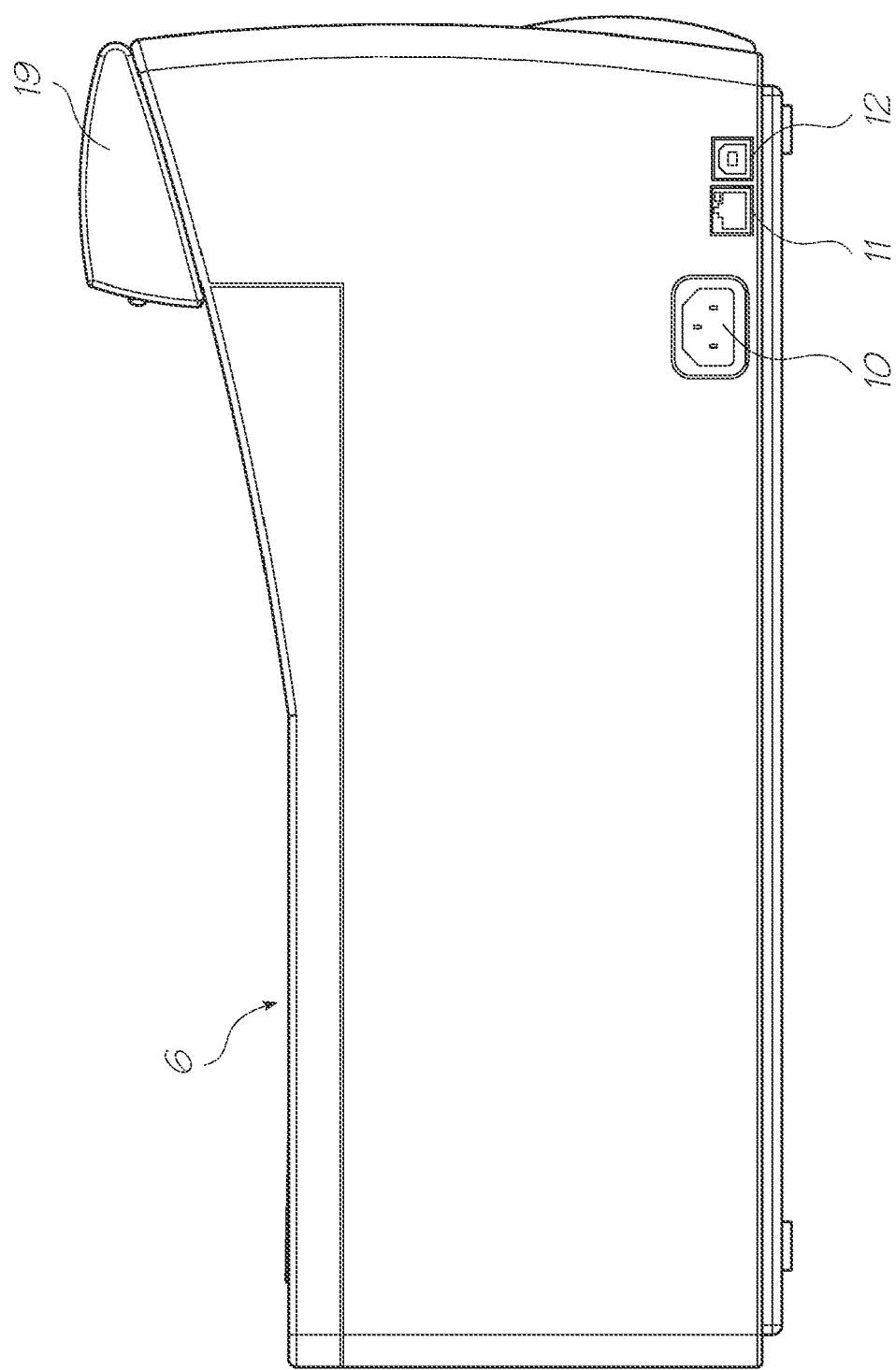
FIG. 4 shows a rear plan view of the printer unit of FIG. 1.

As shown in FIG. 4, the rear of the printer unit 1 includes power and data connections in the form of a power inlet 10 and network Ethernet socket 11 and a USB device socket 12. The power inlet 10 enables the printer unit 1 to be connected to a mains power supply to receive operating power, which can be distributed to operate the various components of the printer unit 1, which will be come apparent later in the description. Similarly, the printer unit 1 can be connected to one or more computer terminals via the network Ethernet socket 11 or the USB device socket 12, such that a variety of users can sent print jobs to the printer unit 1 for printing. The manner in which this is controlled will be described in more detail later in the description.

Figure 5:
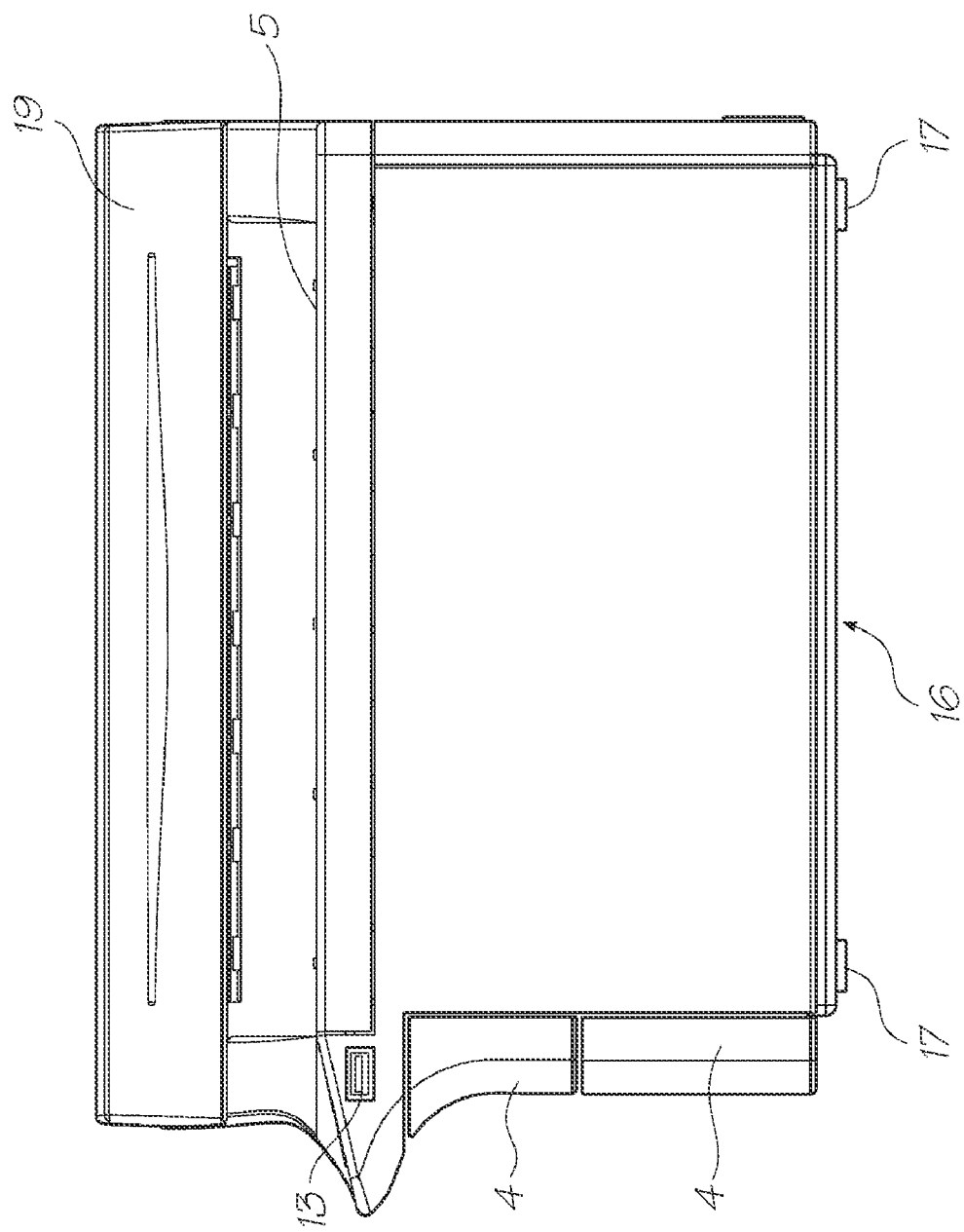
FIG. 5 shows a side plan view of the printer unit of FIG. 1.

As shown in FIG. 5, a pictbridge connector 13 is provided on a side of the body 2, remote from the region of body 2 that houses the print engine 3. The pictbridge connector 13 provides a direct connection between the printer unit 1 and an image input device, typically a digital camera or recorder. In this regard, a digital camera can be readily connected to the printer unit 1 and photo images can be downloaded from the digital camera and printed by the printer unit 1, which is able to print high speed full colour photo images on photo quality media, thereby allowing standard photos to be quickly and simply produced.

In one form, the pictbridge connector 13 is in the form of a retractable cord arrangement that can be readily retraced from the body 2 of the printer unit and connected to an appropriate socket provided on the digital camera or the like. This overcomes the need for the user to provide a separate connector cord to connect the digital camera to the printer unit 1, as often such a separate cord is not readily carried by the user with the camera, which can prevent the user from readily printing photos from the camera. The connector 13 may include an electrical cable that is wound within the body 2 of the printer unit and which is connected to the control system of the printer unit at one end and which terminates in a plug portion at its free end. The electrical cable can be unwound from the body such that the plug portion can be received within an appropriate port provided in the digital camera or the like, to facilitate electrical communication between the two devices. In this regard the cable can be a standard USB cable and plug and is received within a standard USB port provided in the digital camera.

Figure 6:
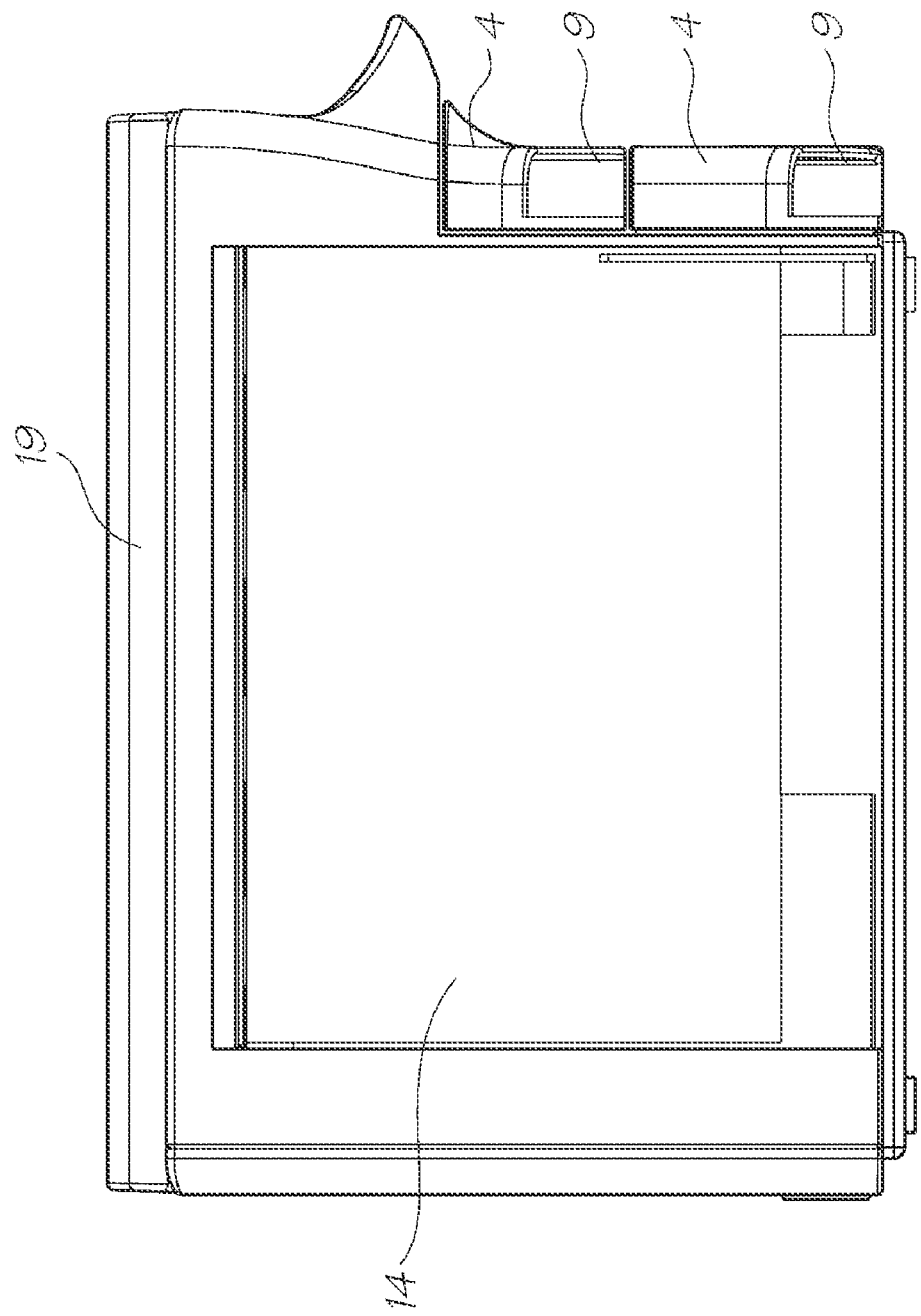
FIG. 6 shows a side plan view of the printer unit of FIG. 1, the side being opposite to the side of the printer unit shown in FIG. 5.
Figure 11:
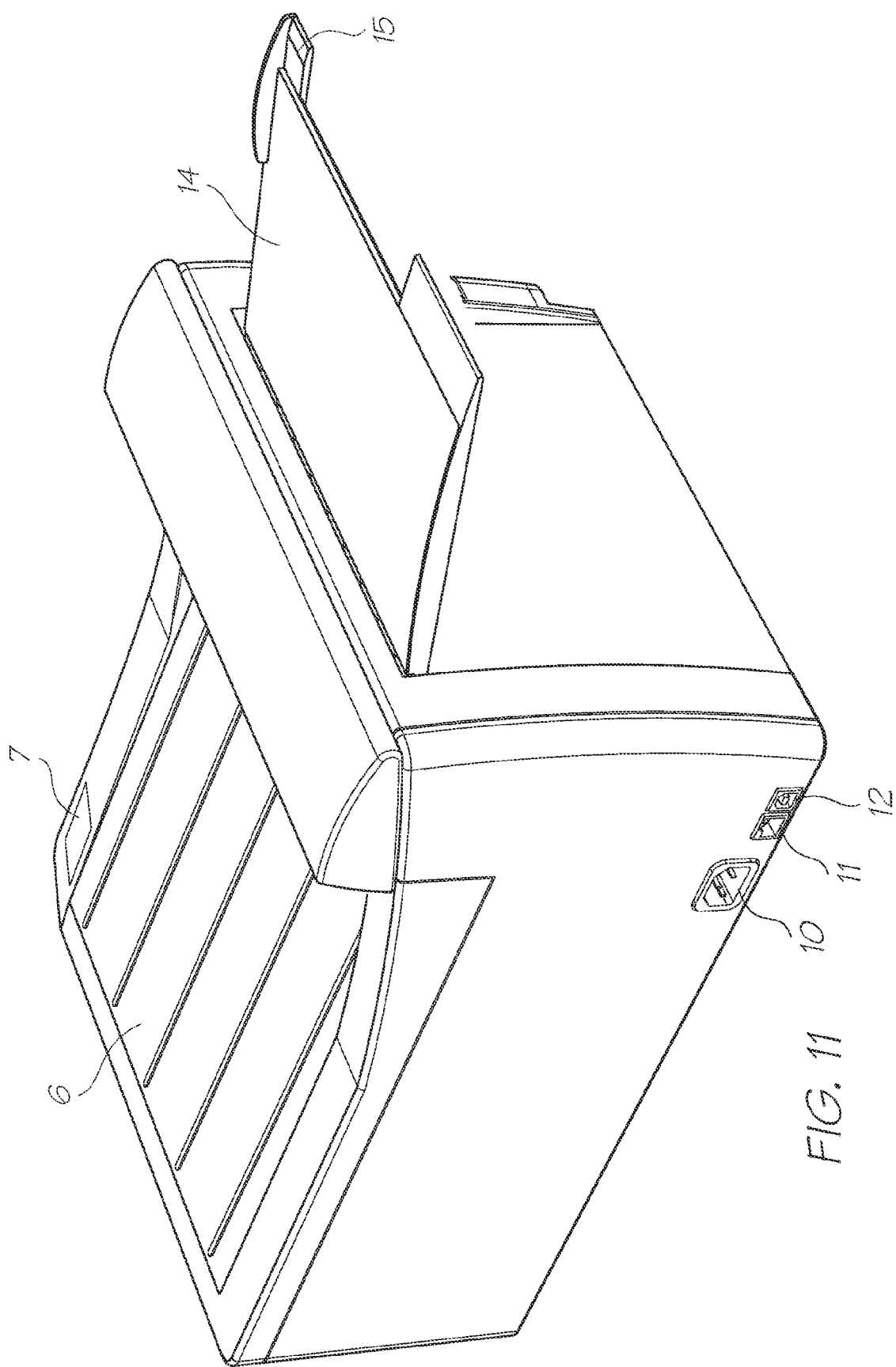
FIG. 11 shows a rear perspective view of the printer unit of FIG. 1, having the manual feed mechanism employed for manually feeding media for printing.

As shown in FIGS. 6 and 11, the side of the printer unit 1 adjacent the print engine 3 is provided with a manual feed mechanism 14, to enable heavy media to be fed to the print engine 3 for printing, which would otherwise have difficulty being transported to the print engine 3 from the input media trays 4. Typically, the manual feed mechanism is employed for media up to a width of 8.5" and greater then 200 gsm. As shown in FIG. 6, when not in use the manual feed mechanism 14 is arranged to be flush with the surface of the printer unit 1 and in the event that heavy media requires printing, the manual feed mechanism 14 is pivoted to a locked operational position as shown in FIG. 11, whereby the heavy media can be supplied to the print engine 3 for printing. A margin slider 15 is provided on the manual feed mechanism 14 to aid in aligning the media prior to transport to the print engine 3 for printing.

Figure 7:
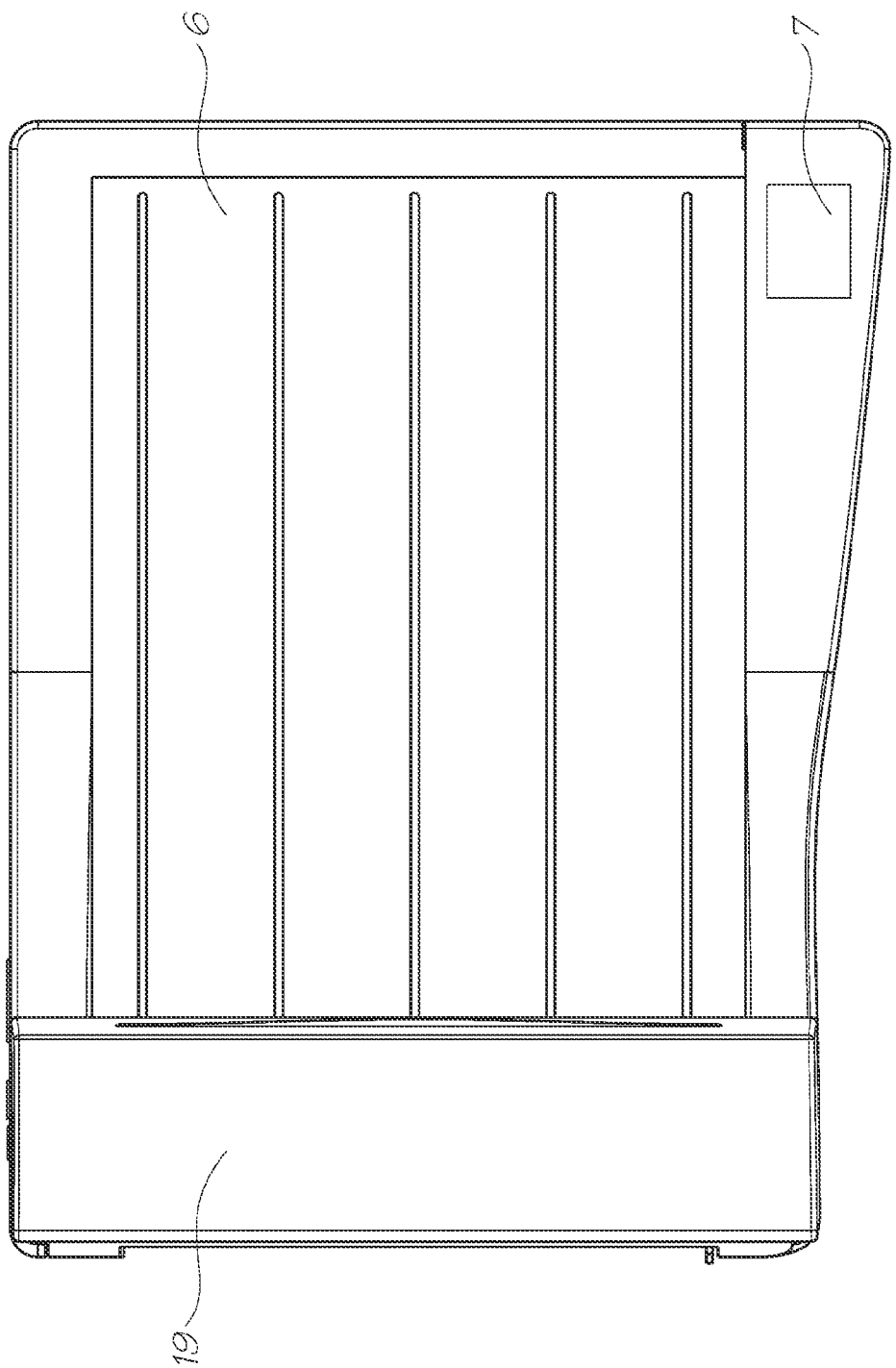
FIG. 7 shows a top plan view of the printer unit of FIG. 1.

The media output region 6 is shown from a top view in FIG. 7, and generally consists of a substantially flat, rectangular surface formed downstream of the print engine 3.

Figure 8:
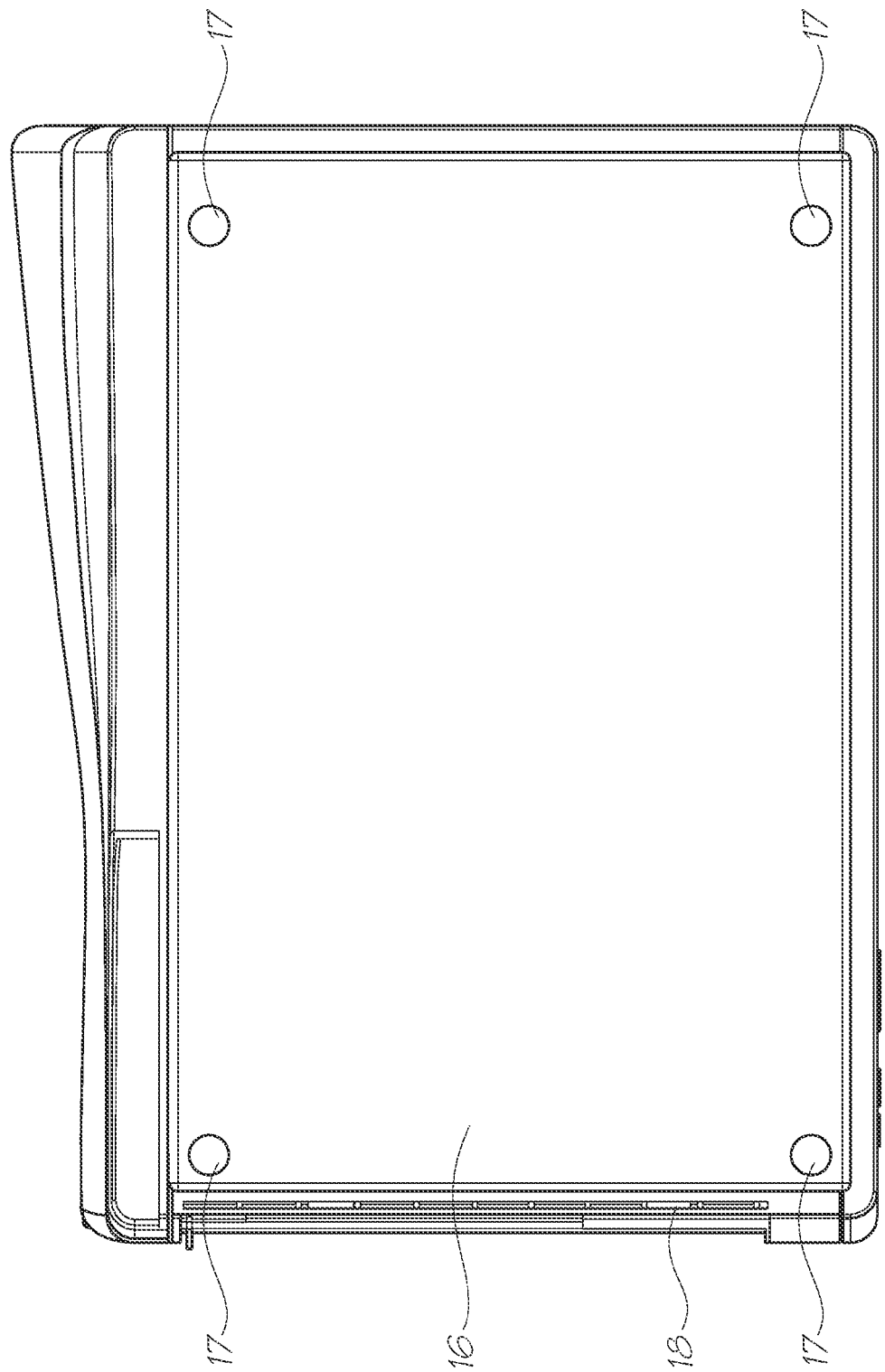
FIG. 8 shows a bottom plan view of the printer unit of FIG. 1.

The bottom of the printer unit is shown in FIG. 8, and generally consists of a base surface 16 upon which a plurality of foot portions 17 are provided to allow the printer unit to be supported on a substantially flat surface, such as a desktop or cabinet. The foot portions 17 may be in the form of rubber pads which provide gripping stability to the printer unit 1 as it is placed on a support surface. The bottom of the printer unit 1 is also provided with an elongate opening 18 formed in the region adjacent the side of the body 2 having the manual feed mechanism 14, the purpose of the elongate opening will be described in more detail later in the description.

Figure 12:
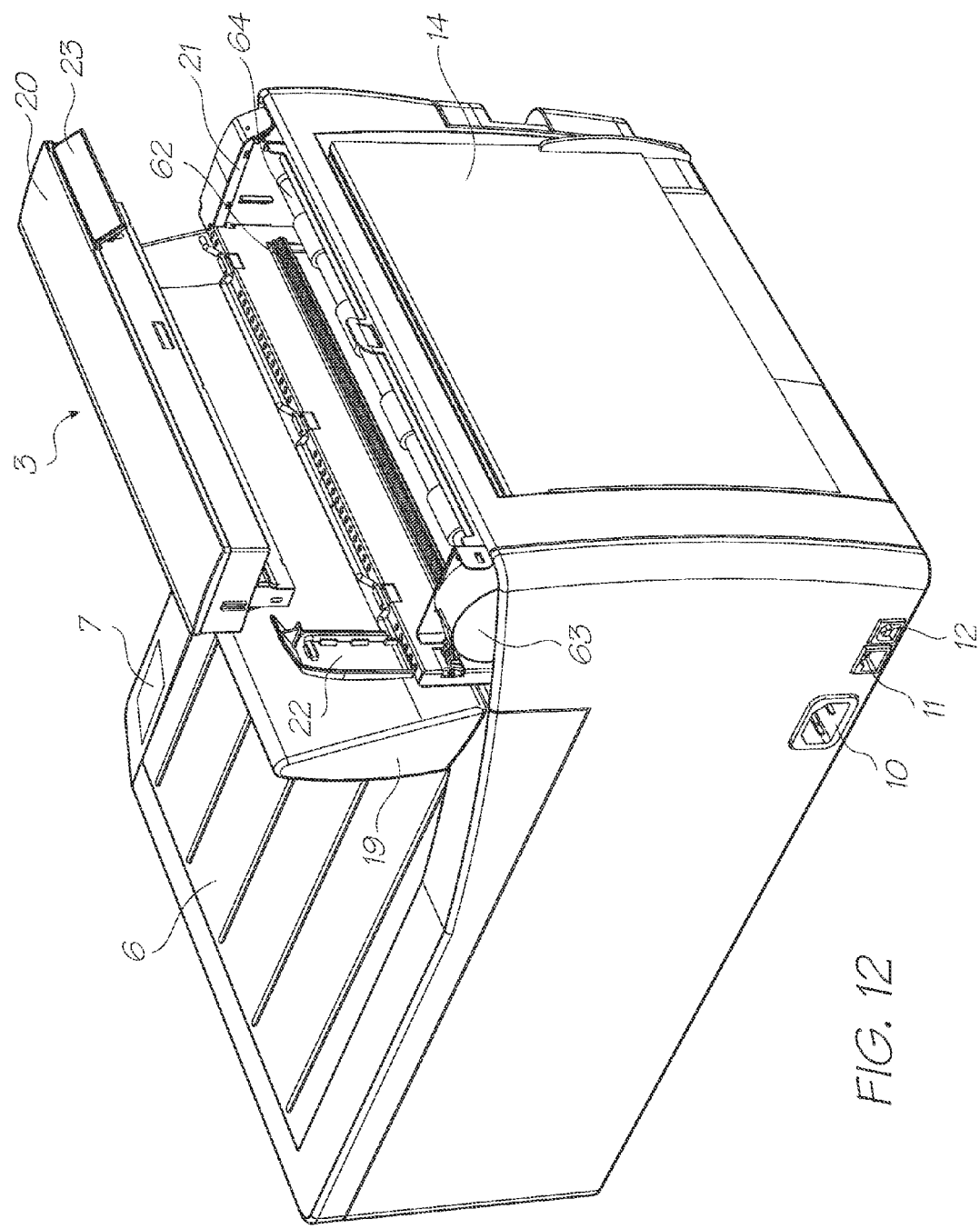
FIG. 12 shows a rear perspective view of the printer unit of FIG. 1, having the cover opened and having the cartridge unit removed from the print engine.
Figure 13:
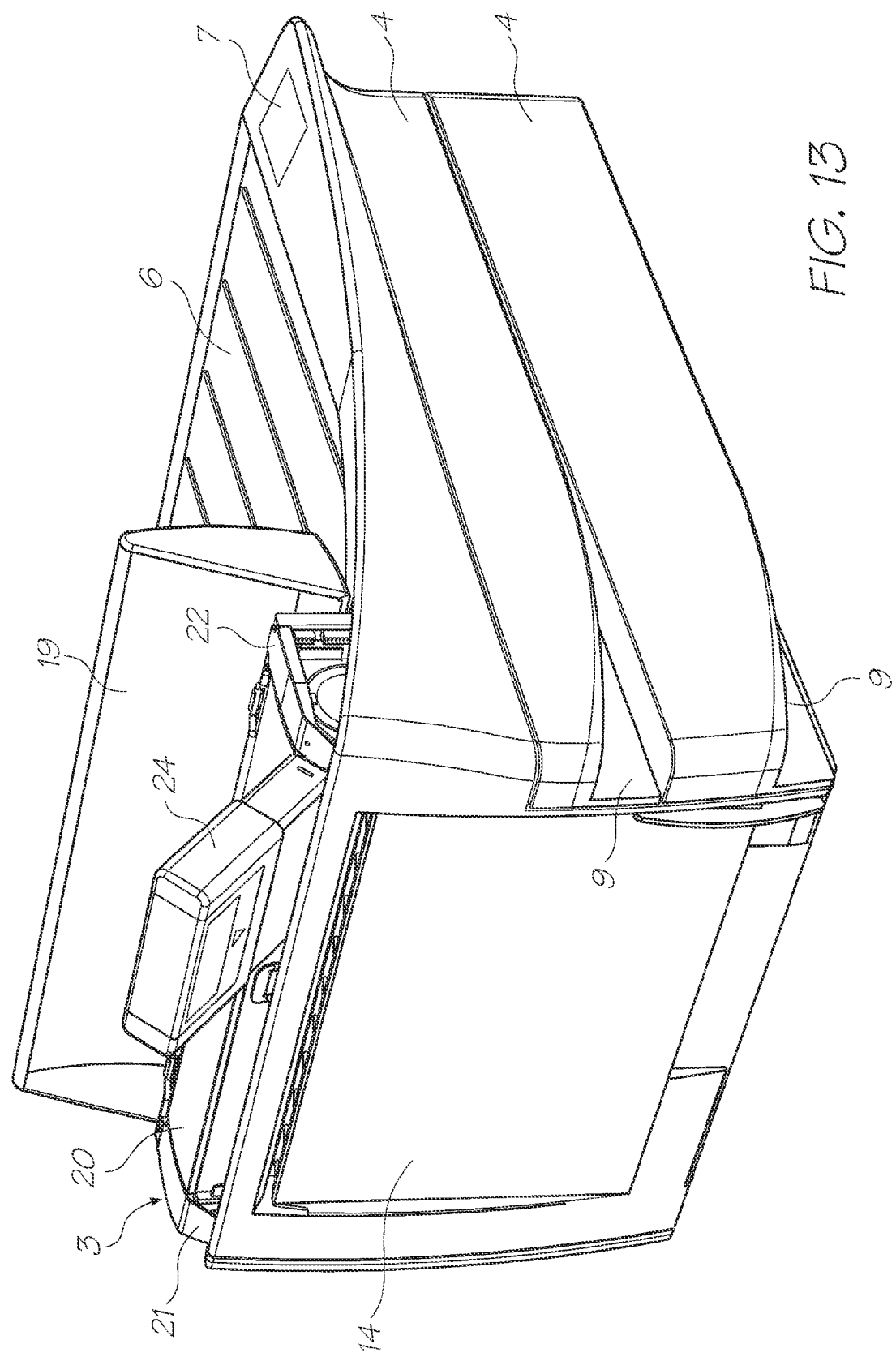
FIG. 13 shows a front perspective view of the printer unit of FIG. 1, wherein an ink refill unit is employed to refill the cartridge unit of the print engine.

As shown in FIGS. 12 and 13, the print engine 3 is located beneath a cover 19, which is pivotally attached to the body 2 to allow access to the print engine 3. The print engine 3 generally consists of a cartridge unit 20 which is received within a cradle unit 21, the cradle unit 21 being secured within the body 2 of the printer unit 1. The cartridge unit 20 is removable from the cradle unit 21 via releasing a locking arm 22, and subsequently the cartridge unit 20 can be readily replaced where necessary, as is shown in FIG. 12.

FIG. 13, shows the manner in which the print engine 3 can be refilled with ink or other suitable printing fluid when required. In this regard, the cartridge unit 20 has a refill port 23 formed in a surface thereof which is adapted to receive a refill unit 24. The refill unit 24 is brought into contact with the refill port 23 and ink or other printing fluid is discharged into the cartridge unit 20 to refill the depleted supply. Upon refilling, the refill unit 24 is removed from the cartridge unit 20 and the cover 19 is closed, for printing to continue. Further details of the print engine and the refilling process will be described in more detail later in the description.

Figure 14:
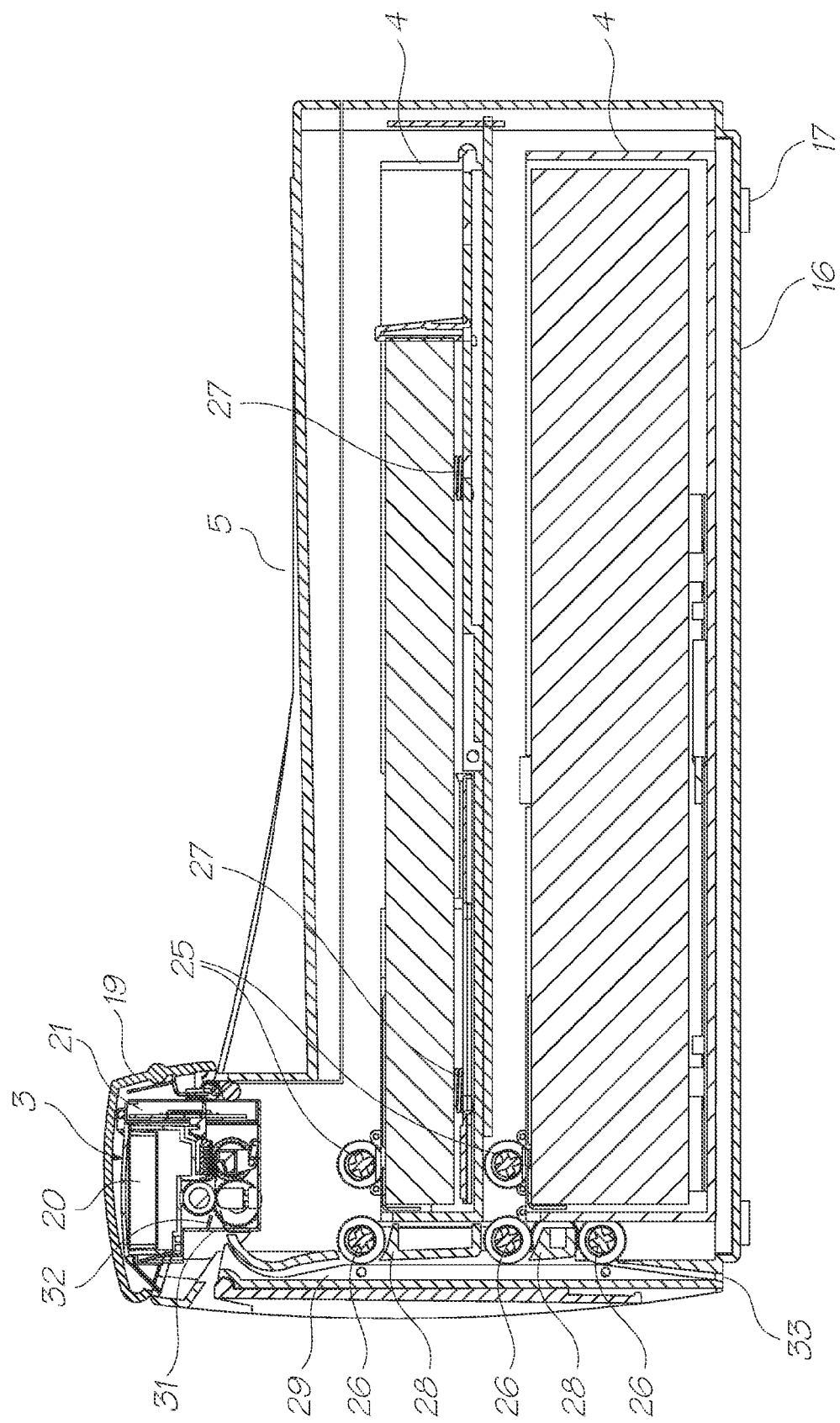
FIG. 14 shows a cross sectional view of the printer unit of FIG. 3.

FIG. 14 is a cross sectional view of the printer unit 1 and shows in more detail the manner in which the media is stored and handled by the printer unit 1. As mentioned earlier, the input media trays 4 are retained within the body 2 in a vertical arrangement, thereby forming an upper media tray and a lower media tray. In the embodiment shown in FIG. 14, the upper media tray is of a reduced capacity and contains media of a different size to that contained in the lower media tray.

The print engine 3 is disposed at one end of the body 2 above the media trays 4, such that media from the media trays 4 assumes a vertical transport path to the print engine 3 for printing. In this regard, each media tray 4 is provided with a picker roller 25, which separates the uppermost sheet of media present in the media trays, and delivers the sheet to a transport roller 26. The picker roller 25 is driven by a motor (not shown) which is operated under control of the control system provided in the print engine 3, to ensure that the correct type of media is delivered to the print engine at the required speed. The picker roller 25 as shown is a D-type roller whereby during rotation, a portion of the circumference of the roller contacts the media and causes the media to be fed to the transport roller 26. As the picker roller 25 rotates, the portion of the circumference of the roller which is substantially flat is brought into the vicinity of the sheet of media. This causes the roller 25 to lose contact with the sheet, thereby releasing the sheet from the action of the roller 25 and allowing the sheet to proceed under action of the transport roller 26. To ensure that the uppermost sheet of the media is correctly positioned with respect to the picker roller 25, the media present in the trays 4 are urged towards the roller 25 by way of resilient spring members 27, thereby ensuring that following delivery of the upper most sheet of media by the picker roller 25, the next sheet is in a position to be delivered. It will be appreciated that D-type rollers are well known in the art of media picking mechanisms and as such their operation will not be further described in this description. It should also be appreciated that other types of picking mechanisms could also be applied to the present invention without going beyond the scope of the present invention.

Figure 15:
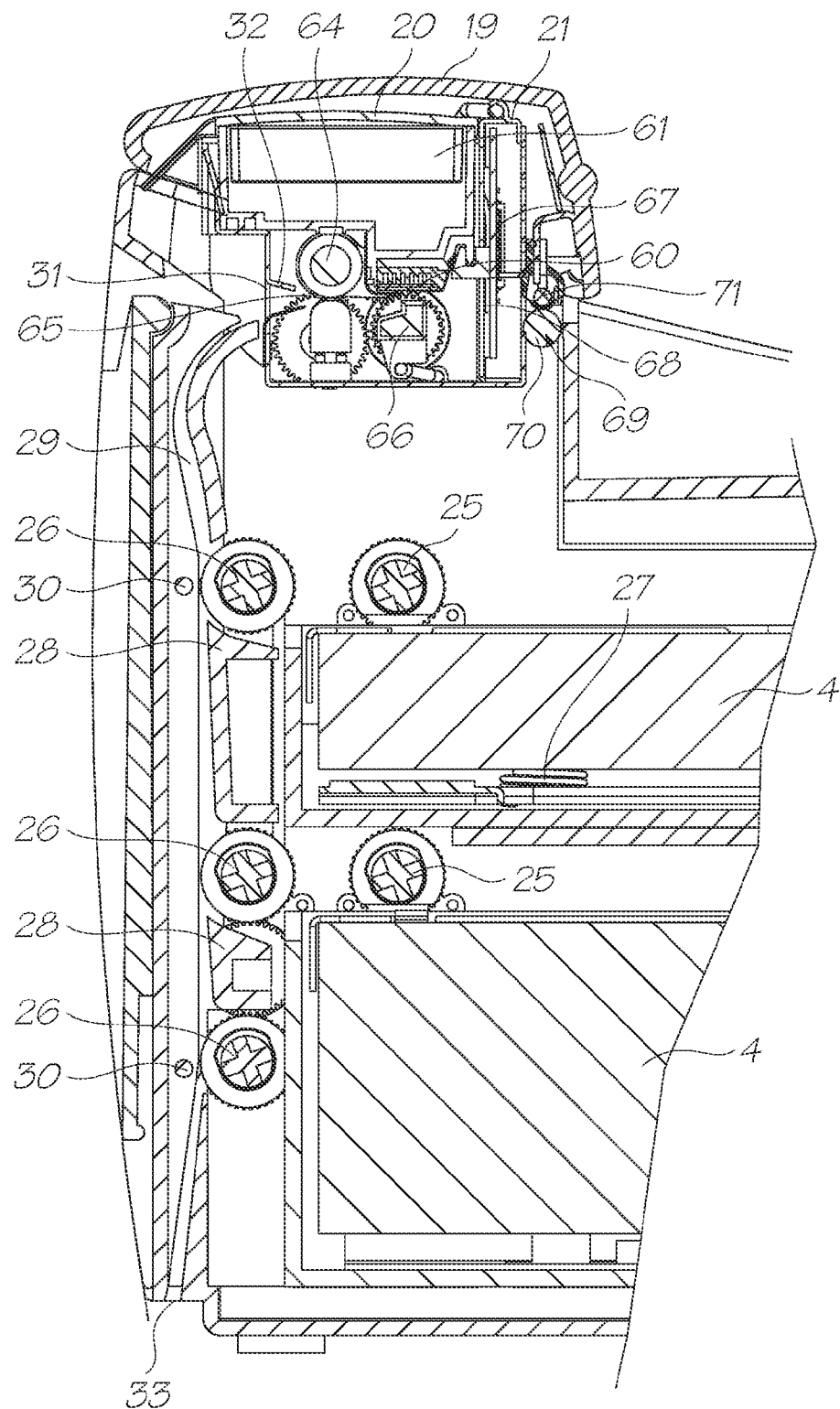
FIG. 15 shows an enlarged view of FIG. 14, showing more clearly the media handling mechanisms employed by the printer unit.

As is more clearly shown in FIG. 15, under action of the picker roller 25 the uppermost sheet of media is fed to the vicinity of the transport roller 26 where it contacts a tray guide 28. The tray guide 28 is shaped to impart a vertical delivery path to the sheet of media to deliver the sheet into a common internal feed slot 29 that extends in a vertical direction from the trays 4 to the print engine 3. Once the sheet of media enters the common internal feed slot 29 it is captured by the transport roller 26 which then delivers the sheet to the print engine 3. In the instance where the sheet is picked from the lower input media tray 4, during the vertical passage of the sheet from the lower tray 4 to the print engine 3, the sheet is transferred to the transport roller of the upper tray 4 which delivers the sheet to the print engine 3. In this regard, in order to transport the sheet from the lower tray 4, it is under the action of more than one transport roller.

The transport rollers 26 are driven by a motor (not shown) which is driven at a constant speed, the speed controlled by the control system of the print engine to ensure that the ideal printing speed is maintained. Idle rollers 30 are provided in the vicinity of the transport rollers to create a pinch area to contact the sheet of media to aid delivery of that sheet to the print engine 3.

As clearly shown in FIG. 15, the common internal feed slot 29 is shaped at its uppermost end to deliver the media into an inlet 31 provided in the print engine 3. In this regard, the inlet 31 of the print engine 3 is provided with guide members 32 to aid in directing the sheet of media into the drive mechanism of the print engine 3 whereby it is transported past the print head for printing under action of the drive mechanism. This will be discussed in more detail below.

Figure 16:
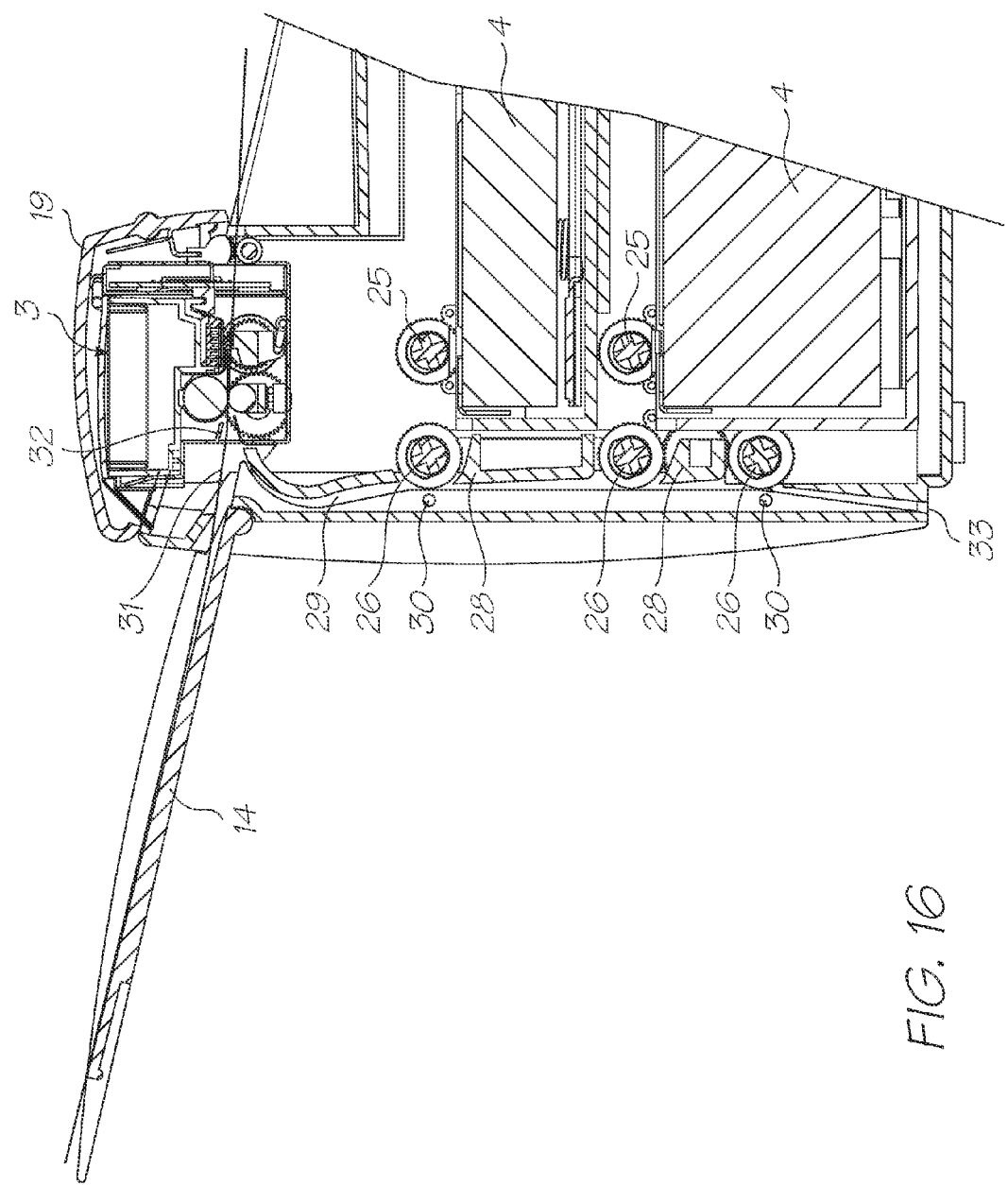
FIG. 16 shows a cross sectional view of the printer unit as shown in FIG. 14, showing the manual feed mechanism employed.

As shown in FIG. 16, in order to deliver heavy media to the print engine 3 for printing, the manual feed mechanism 14 is pivoted into position to support a sheet of the heavy media. In this position, the sheet of heavy print media is directly delivered into the inlet 31 of the print engine 3 through an external input slot 33 provided in the body 2 of the printer unit.

As discussed previously, one particular application of the present invention is for use as a network or workgroup printer unit which can receive print jobs from multiple sources for printing. In this regard, depending upon the number of sources, the capacity of the printer should be such that it is able to process a large number of print jobs without requiring constant media recharging. As discussed previously, the upper input media tray is arranged to have a capacity of 250 sheets of A4 media whilst the lower input media tray is adapted to have a capacity of 500 sheets of A4 media. Whilst this capacity may be sufficient for a large number of applications, in some applications, particularly those where the printer unit 1 is accessed by a large number of individuals which large print jobs, there may be a need to increase the media capacity of the printer unit 1.

Figure 17:
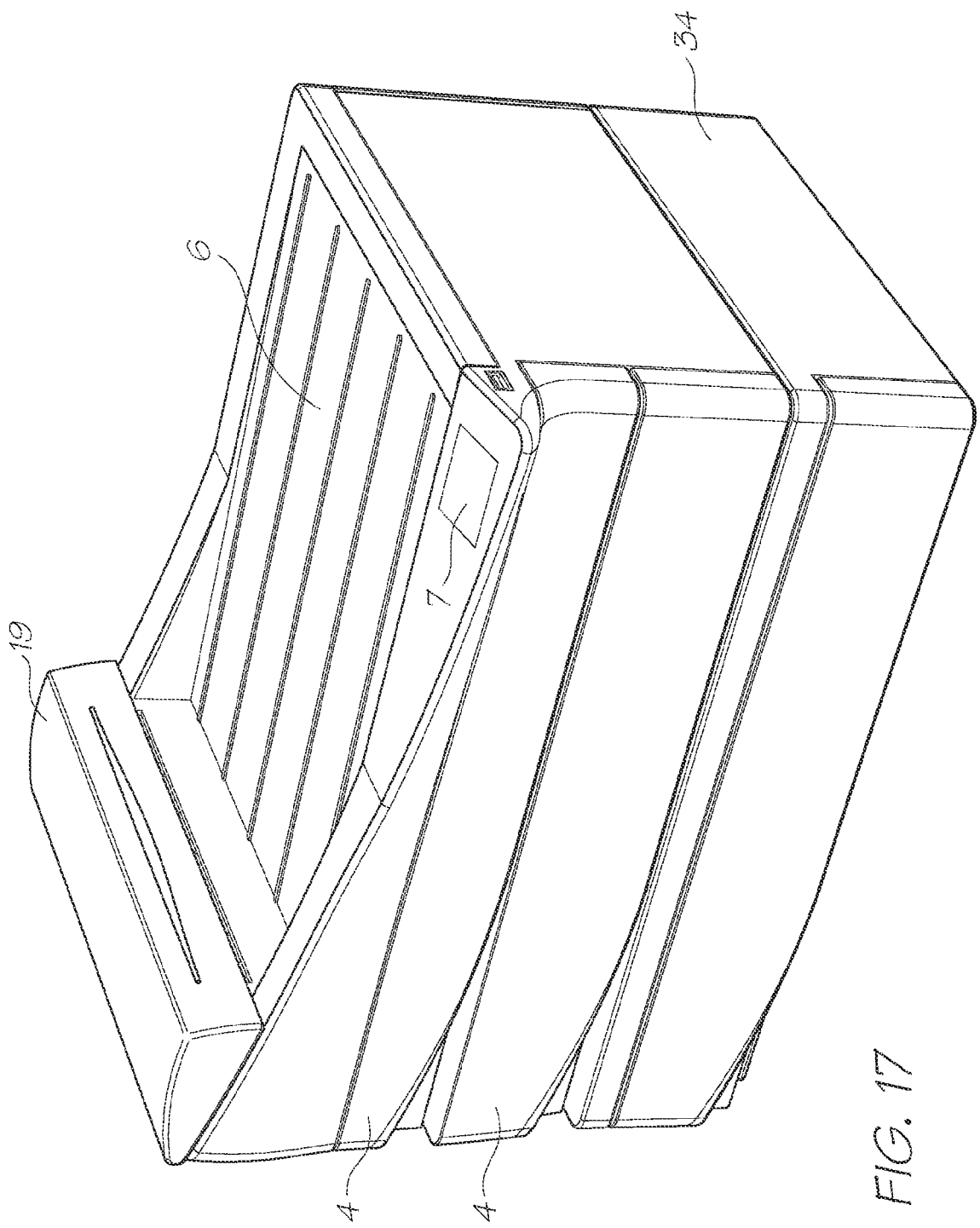
FIG. 17 shows a front perspective view of the printer unit of printer unit of FIG. 1, employing an extender tray assembly for supplying additional media for printing.

The manner in which this can be achieved is shown in FIG. 17, wherein an extender tray assembly 34 is added to the printer unit 1 to increase the media capacity. In the embodiment as shown, the extender tray assembly 34 is similar to the existing lower input media tray and has a capacity of around 500 sheets of A4 media. The addition of the extender tray assembly 34 has therefore increased the media capacity of the printer unit 1 by two thirds to have a capacity of 1250 sheets of A4 media.

Figure 18:
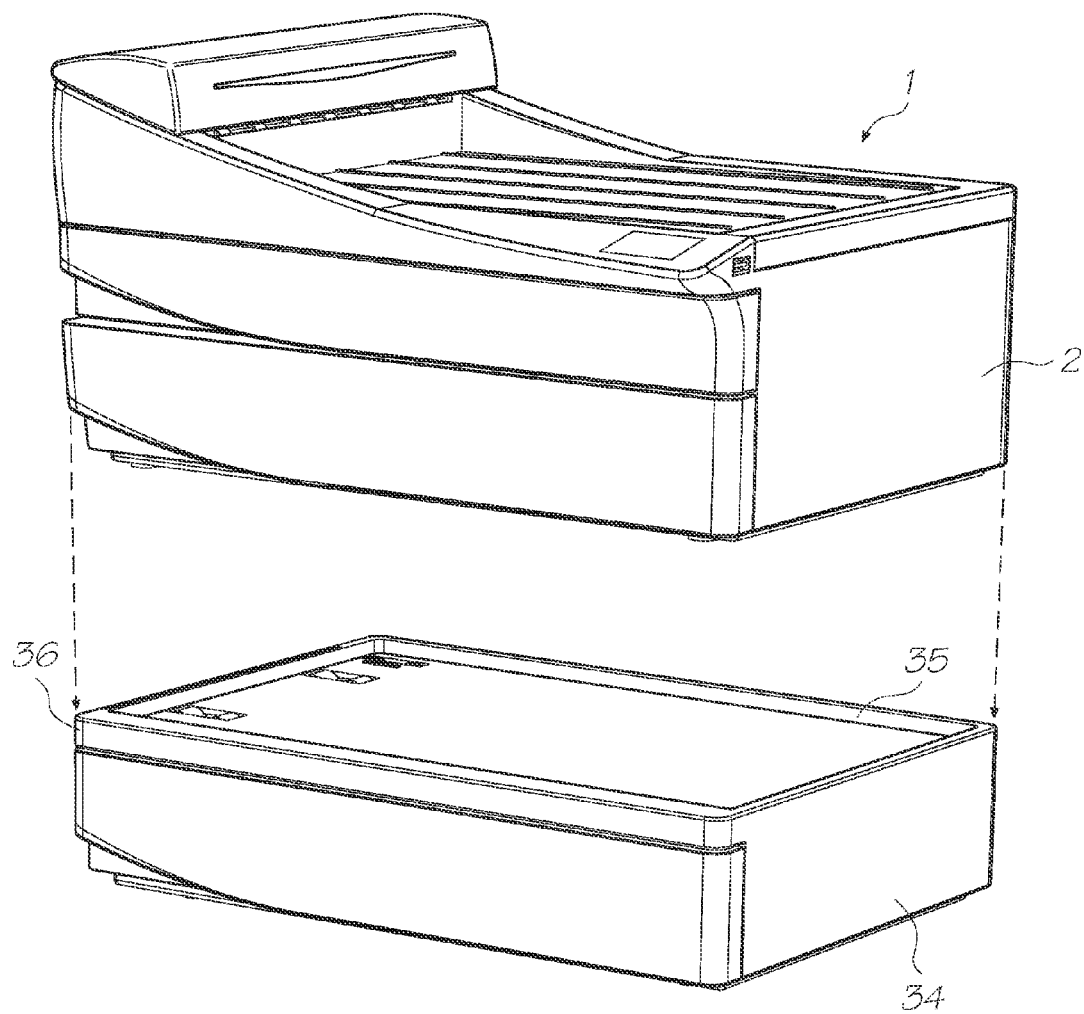
FIG. 18 shows an exploded front perspective view of the arrangement of FIG. 17.
Figure 19:
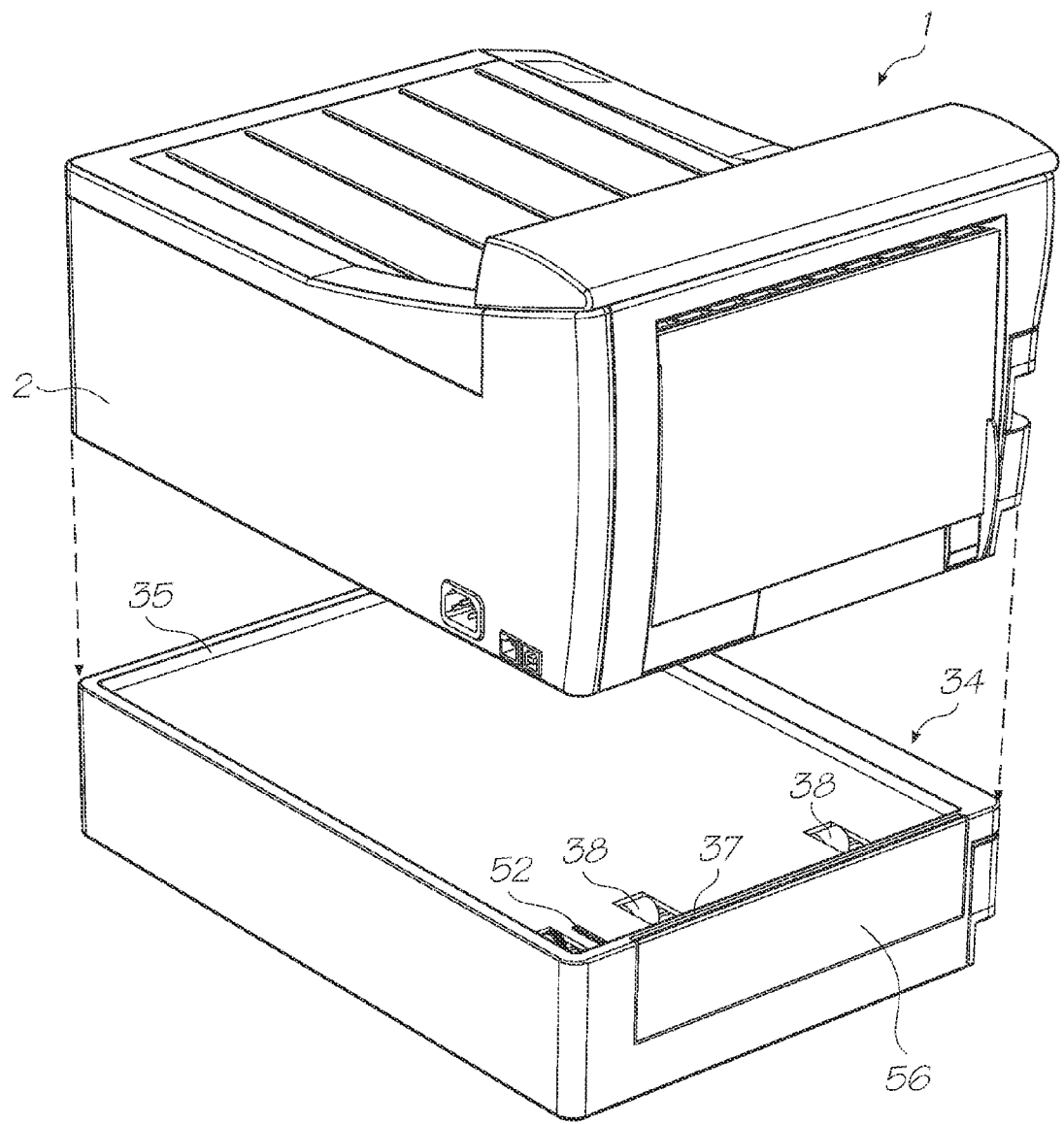
FIG. 19 shows an exploded rear perspective view of the arrangement of FIG. 17.

As shown more clearly in FIGS. 18 and 19, the extender tray assembly 34 is configured to receive the printer unit 1 in a nesting engagement, wherein the upper edge 35 of the extender tray assembly 34 is raised or projects outwardly from the upper surface of the extender tray assembly to define a recessed region which receives the base of the printer unit 1. In this arrangement, the printer unit 1 is firmly supported on the extender tray assembly 34 in a nested arrangement, to ensure stability of the printer unit 1 on top of the extender tray assembly 34.

The extender tray assembly 34 generally comprises a frame portion 36 which receives an input media tray 4 of the type previously discussed with respect to the printer unit 1. The input media tray 4 has a handle 9, in the same manner as previously discussed, which allows a user to grip the tray 4 and slide the tray from the frame portion 36 to access the interior of the tray, should the tray require recharging with media. Like the input media trays of the printer unit 1, the tray of the extender tray assembly can be adjustable to accommodate media of varying sizes.

Figure 20:
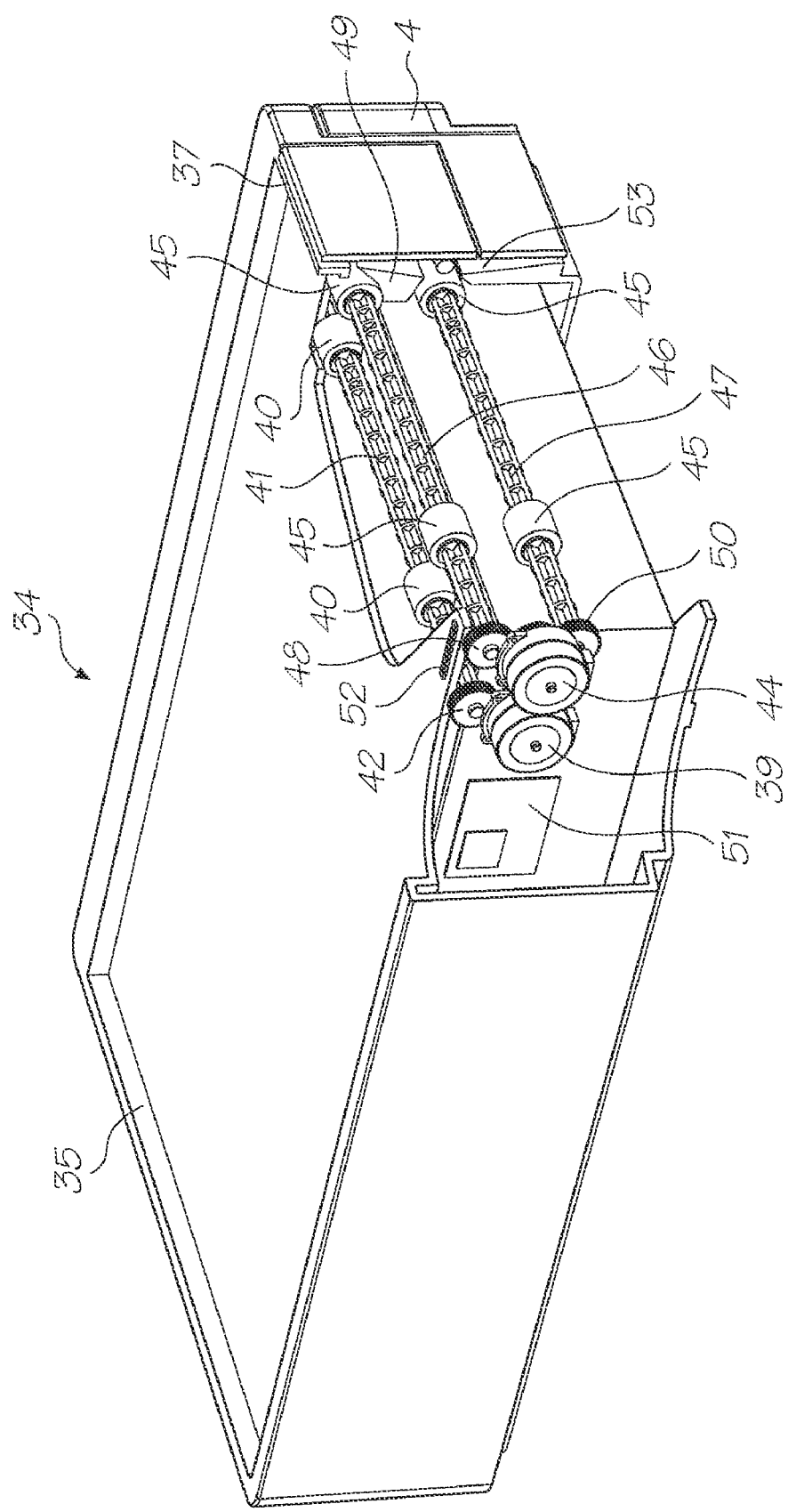
FIG. 20 shows a partially sectioned rear perspective view of the extender tray of FIG. 17.

Referring to FIG. 20, the extender tray assembly 34 also contains a number of elements which enable the media stored in the paper tray to be transferred to the print engine 3 of the printer unit 1 for printing. In this regard, the upper surface of the extender tray assembly 34 has a media exit slot 37 extending along an edge thereof. The media exit slot 37 is arranged to align with the elongate opening 18 formed on the bottom surface of the body 2 of the printer unit when the printer unit is positioned atop the extender tray assembly 34. As will be discussed below, the alignment of the exit slot 37 with the elongate opening 18 allows a sheet of media a passage from the extender tray assembly 34 to the print engine 3.

The extender tray assembly 34 has a picker mechanism 38 provided within the frame portion 36 in the area proximal the media exit slot 37. The picker mechanism is provided to pick and separate the uppermost sheet of media from the stack of media provided in the input media tray. The picker mechanism 38 operates in the same manner as previously described in relation to the printer unit 1, and consists of a picker motor 39 and picker rollers 40. The picker rollers 40 are in the form of D-type rollers and are provided on a central shaft 41 which is rotated by the picker motor 39 via a picker gear 42. A transport mechanism 43 is also provided adjacent the picker mechanism 38 for receiving a sheet of media from the picker mechanism 38 and delivering it through the internal media path 53, out the media exit slot 37 and into the body 2 of the printer unit.

The transport mechanism operates in the same way as described previously in relation to the transport rollers provided in the printer unit 1, and comprises a transport motor 44 and transport rollers 45. Two transport rollers 45 are provided on an upper shaft 46 which is driven by the transport motor 44 via a transport gear 48. A guide element 49 is provided adjacent the transport rollers 45 of the upper shaft 46 and operates in the same manner as the previously described guide members 32 of the printer unit 1, namely to direct the sheets of media into the common internal feed slot 29. Two further transport rollers 45 are provided on a lower shaft 47, which is also driven by the transport motor 44 via a second transport gear 50. The purpose of these transport rollers 45 will be described in more detail below.

The picker motor 39 and the transport motor 44 are controlled by a control system 51 provided within the frame portion 36 of the extender tray assembly 34. Power and data contacts 52 are provided on the upper surface of the extender tray assembly 34 to receive power to operate the motors 39, 44 and data for the control system 51 to control the operation of the motors in response to the printing requirements of the print engine 3. The power and data contacts 52 are arranged to mate with corresponding power and data contacts (not shown) provided on the underside of the printer unit 1 when the printer unit 1 is mounted on the extender tray assembly 34.

The frame portion 36 of the extender tray assembly 34 also includes an access flap 54 provided adjacent the transport mechanism 43. The purpose of such an access flap 54 is to allow access to the region of the extender tray assembly 34 in the event of a paper jam in this vicinity. In this regard, should a paper jam occur in this region, the access flap 54 is easily displaced allowing the problem to be corrected, without requiring major disassembly of the entire unit.

Figure 21:
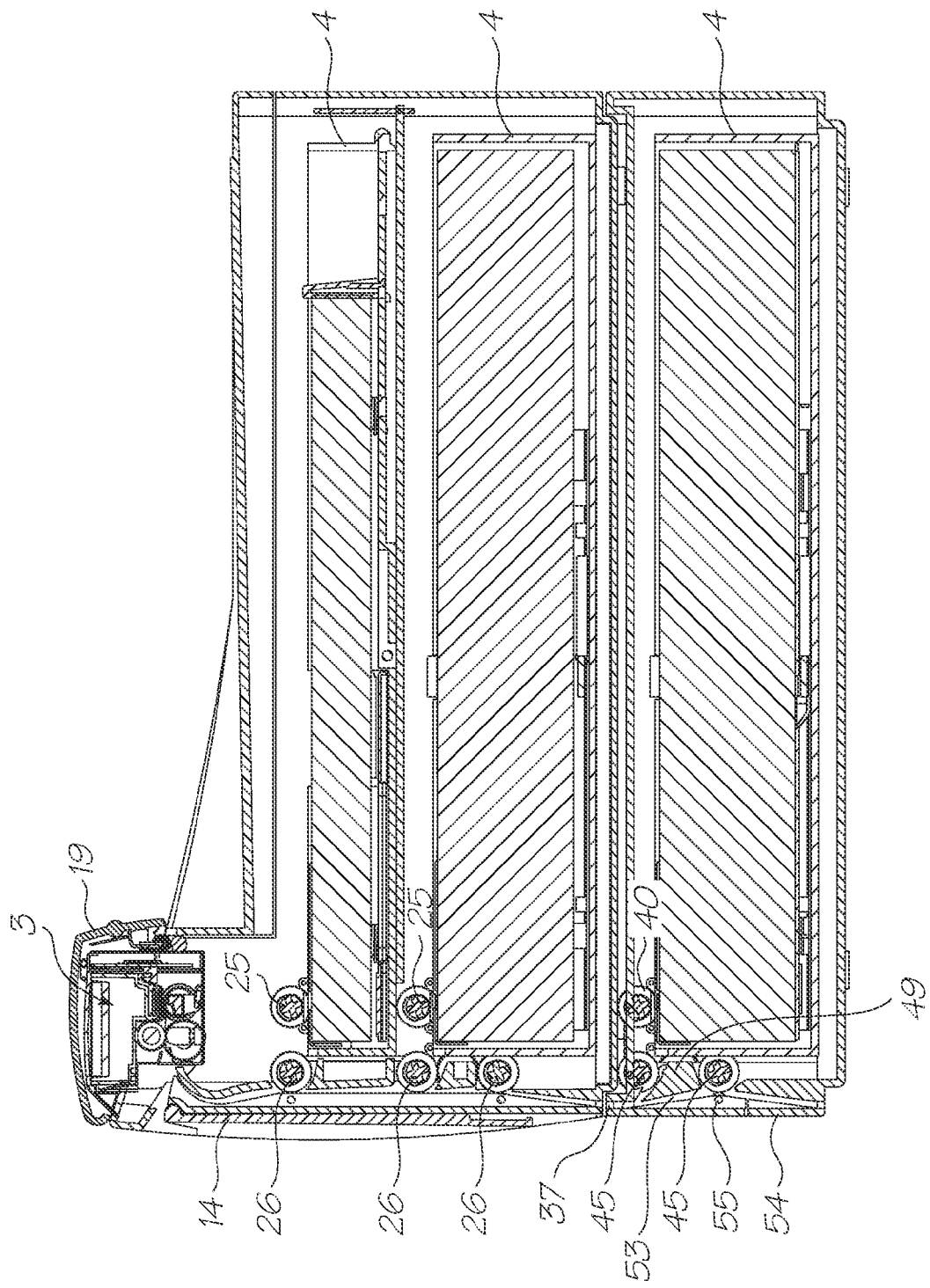
FIG. 21 shows a cross sectional plan view of the printer unit arrangement of FIG. 17.
Figure 22:
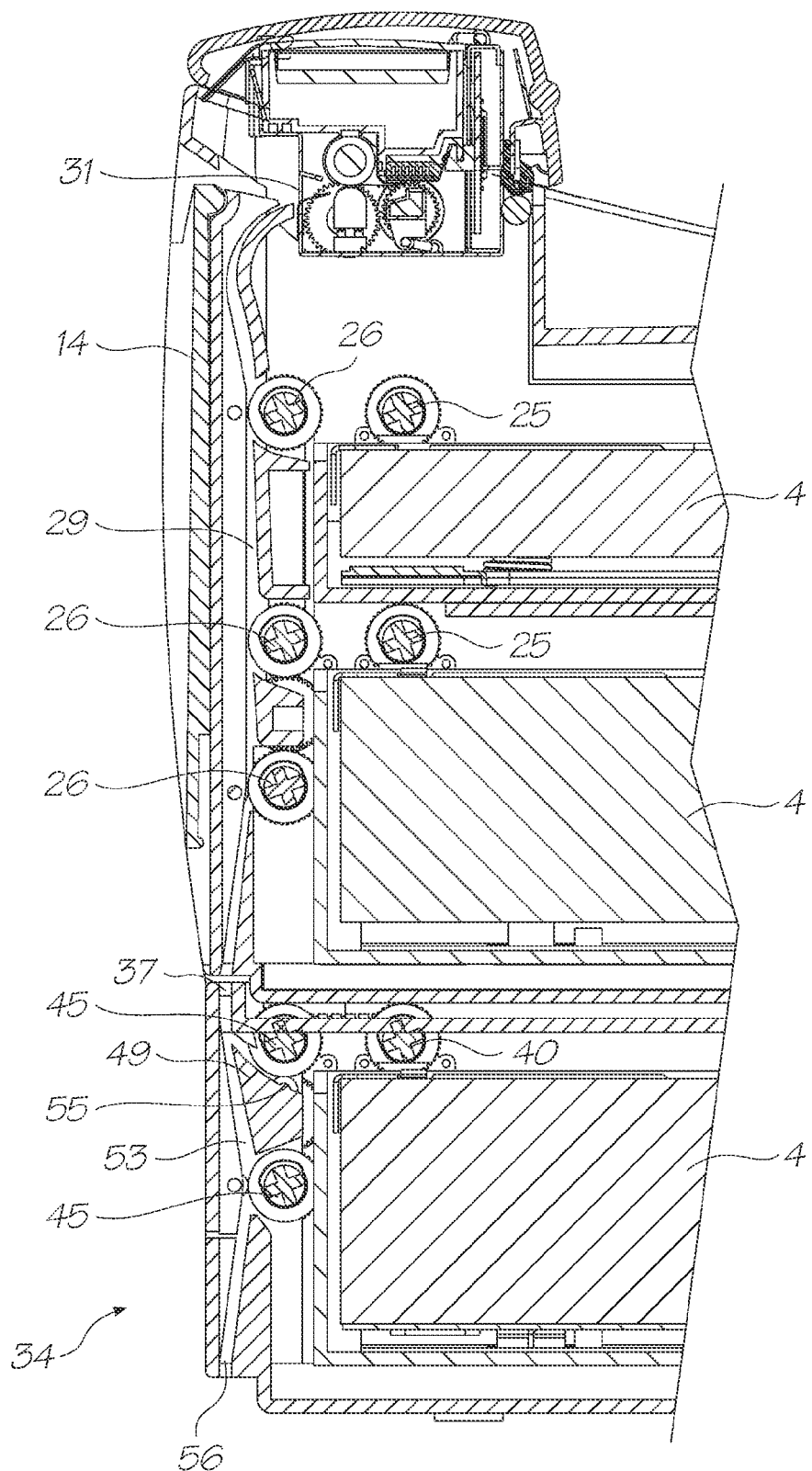
FIG. 22 shows an enlarged view of FIG. 21, showing more clearly the manner in which media is transported from the extender tray to the printer unit.

FIGS. 21 and 22 show in cross sectional view, the printer unit 1 positioned on the extender tray assembly 34. As can be clearly seen from FIG. 21, the upper edge 35 of the extender tray assembly 34 is configured to receive the base of the printer body 2 therein, in a nested arrangement. In this manner, the base of the printer body 2 has an edge region and a central region which projects beyond the edge region and which is received within the upper edge 35 of the extender tray assembly. This arrangement assists in the alignment of the media exit slot 37 formed in the extender tray assembly 34 with the elongate opening 18 provided in the base of the body 2, such that the internal media path 53 of the extender tray assembly forms an extension of the common internal feed slot 29 that extends through the body 2 of the printer unit.

FIG. 22 shows in more detail the manner in which a sheet of media can progress from the input paper tray of the extender tray assembly 34. As previously mentioned, the picker rollers 40 separate the uppermost sheet and deliver it to the transport rollers 45 of the upper shaft 46. An idle roller 55 is provided on the guide element 49, and acts to capture the sheet of media for transportation by the transport rollers 45. Under action of the transport rollers 45, the sheet of media is guided along the internal media path 53 and out the media exit slot 37, and into the internal feed slot 29 of the body 2 of the printer unit. The leading edge of the sheet of media continues in this substantially vertical path up along the internal feed slot 29 and contacts another transport roller 26 whereby it is further progressed along the internal feed slot 29 to the print engine 3.

As clearly shown in FIG. 22, the extender tray assembly 34 is provided with an entry slot 56 on its bottom surface, which enables another extender tray assembly to be added to the system to further increase the media capacity of the printer unit 1. In this regard, the purpose of the transport rollers 45 provided on the lower shaft 47 in the extender tray assembly 34, is to provide a transport facility for a sheet of media feed from another extender tray assembly disposed beneath the extender tray assembly 34 in the manner as described above.

Figure 23:
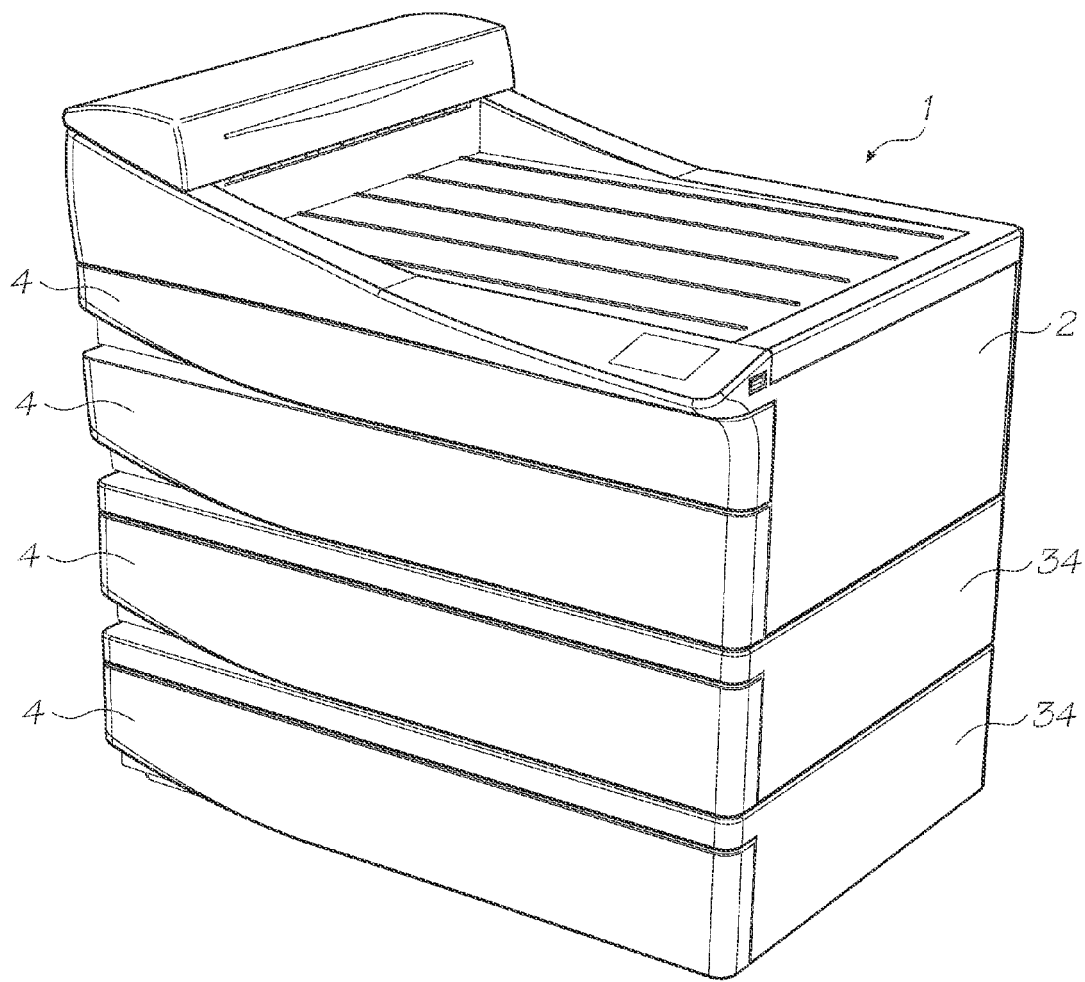
FIG. 23 shows a front perspective view of the printer unit of FIG. 1 employing two extender tray assemblies for supplying additional media to the printer unit for printing.
Figure 24:
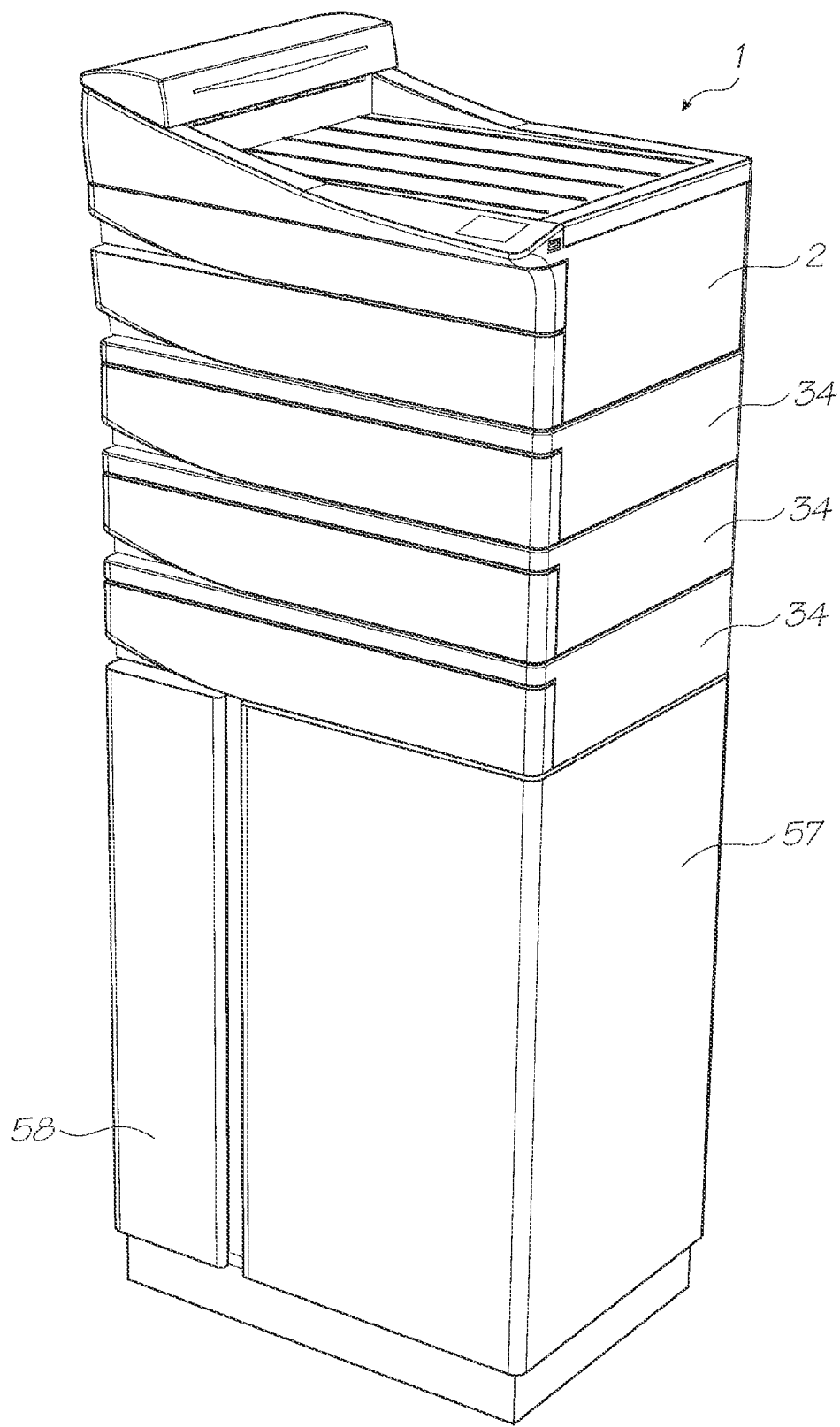
FIG. 24 shows a front perspective view of the printer unit of FIG. 1 employing three extender tray assemblies for supplying additional media to the printer unit for printing and being supported in an upright position on a stand unit.
Figure 25:
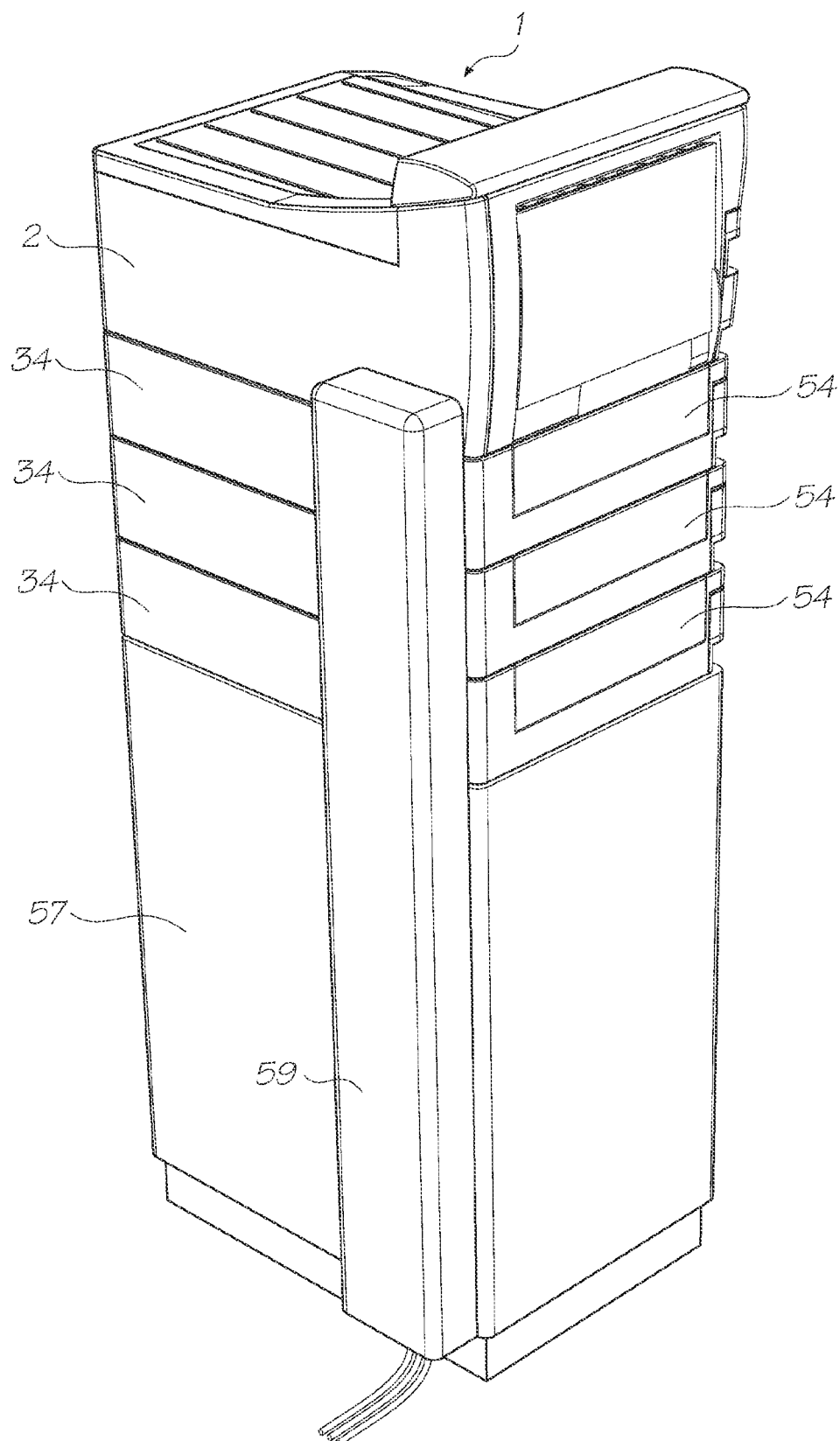
FIG. 25 shows a rear perspective view of the arrangement of FIG. 24.

A printer unit 1 employing two extender tray assemblies 34 is shown in FIG. 23. As will be appreciated, the number of extender tray assemblies 34 employed is very much dependant on the desired capacity of the printer unit 1. By increasing the number of extender tray assemblies 34 employed, the height of the printer unit 1 increases and as such, the printer unit 1 may be supplied with a customised stand unit 57 as shown in FIGS. 24 and 25.

In this embodiment of the present invention, the stand unit 57 is configured to receive the base of the lowermost extender tray assembly 34 in a nested arrangement, in much the same way as described previously in relation to the manner in which the extender tray assemblies 34 are arranged. The height of the stand unit 57 enables a printer unit 1 to employ a number of extender tray assemblies 34 and still be at a height that allows a user to readily use the printer unit and access the user interface unit 7. The stand unit 57 has the added benefit that it frees up desk space and provides a self contained, stand alone unit which can be readily located in a central position. The stand unit 57 may also have storage capabilities for storing media for use by the printer unit as is shown in FIG. 24. In this instance the body of the stand unit 57 may be in the form of a cupboard that is accessible by a door 58 formed in a front portion thereof. The interior of the stand unit may include shelves (not shown) upon which media can be stored in the event of the printer unit's supply of media requiring replenishment. As shown in FIG. 25, the stand unit 57 may also include a cover means 59 for covering the power and data cables that supply power and data to the printer unit 1, such that the stand unit 57 and the printer unit 1 for a tidy, stand alone printing station.

Figure 47:
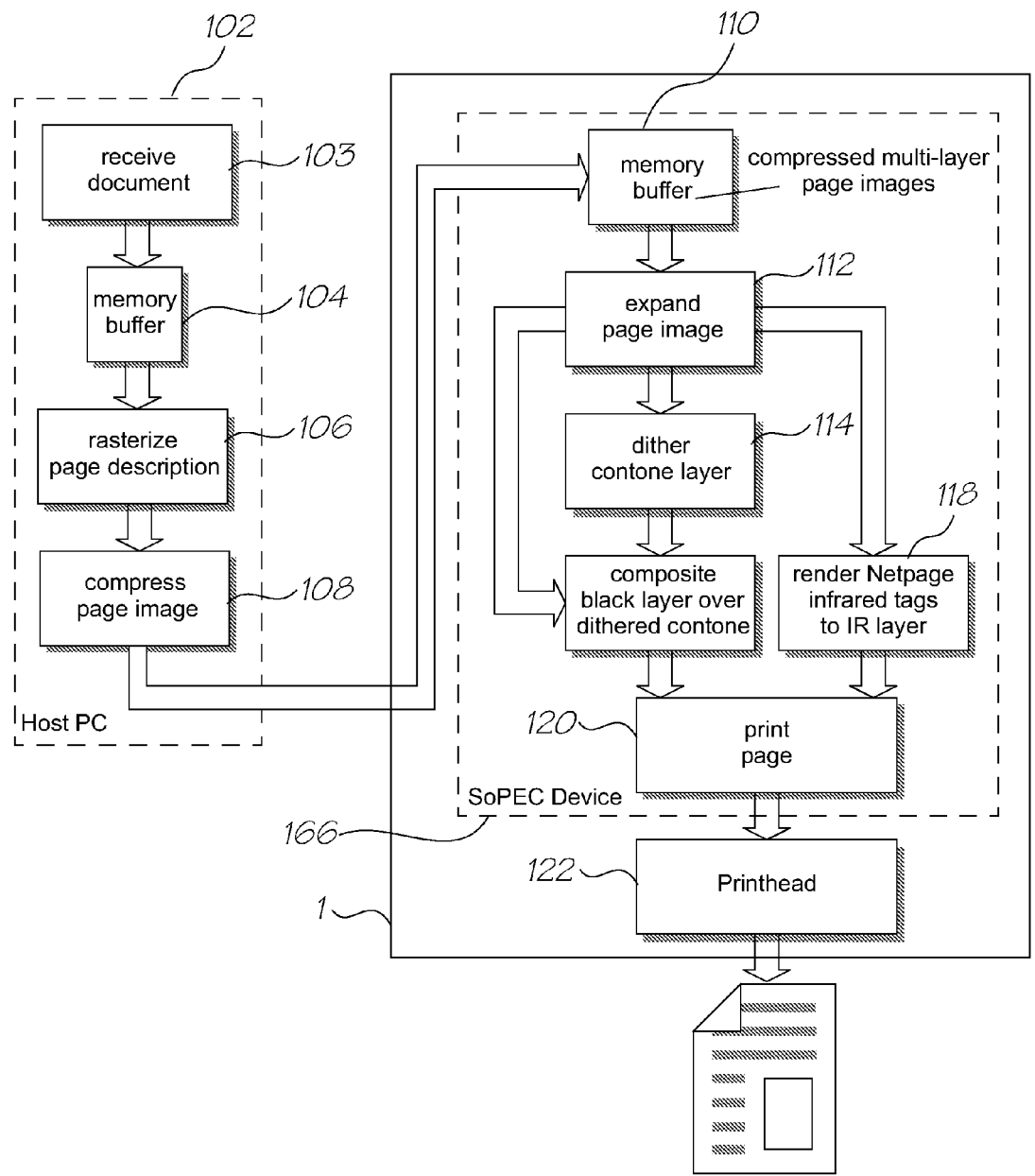
FIG. 47 shows a schematic of document data flow in a printing system incorporating the printer unit of the present invention.

As discussed previously, the printer unit 1 of the present invention makes it possible to provide a network or workgroup printer unit that can perform a variety of printing tasks depending upon the type of print jobs received. In this regard, the printer unit 1 is an inkjet printer unit capable of printing standard monochrome text or images at speeds of 60 pages per minute (ppm) as well as printing full colour, photo images at 1600 dpi and 60 ppm. As shown schematically in FIG. 47, in use, the printer unit 1 receives print data from an external source, such as a computer system 102, via the previously described data connections. The external computer system 102 may be programmed to perform various steps involved in printing a document, including receiving the document (step 103), buffering it (step 104) and rasterizing it (step 106), and then compressing it (step 108) for transmission to the printer unit 1.

The printer unit 1 receives the document from the external computer system 102 in the form of a compressed, multi-layer page image, wherein the control system 51 provided within the printer unit 1 buffers the image (step 110), and then expands the image (step 112) for further processing. The expanded contone layer is dithered (step 114) and then the black layer from the expansion step is composited over the dithered contone layer (step 116). Coded data may also be rendered (step 118) to form an additional layer, to be printed (if desired) using an infrared ink that is substantially invisible to the human eye. The black, dithered contone and infrared layers are combined (step 120) to form a page that is supplied to a printhead integrated circuit for printing (step 122).

In this particular arrangement, the data associated with the document to be printed is divided into a high-resolution bi-level mask layer for text and line art and a medium-resolution contone color image layer for images or background colors. Optionally, colored text can be supported by the addition of a medium-to-high-resolution contone texture layer for texturing text and line art with color data taken from an image or from flat colors. The printing architecture generalises these contone layers by representing them in abstract "image" and "texture" layers which can refer to either image data or flat color data. This division of data into layers based on content follows the base mode Mixed Raster Content (MRC) mode as would be understood by a person skilled in the art. Like the MRC base mode, the printing architecture makes compromises in some cases when data to be printed overlap. In particular, in one form all overlaps are reduced to a 3-layer representation in a process (collision resolution) embodying the compromises explicitly.

Figure 48:
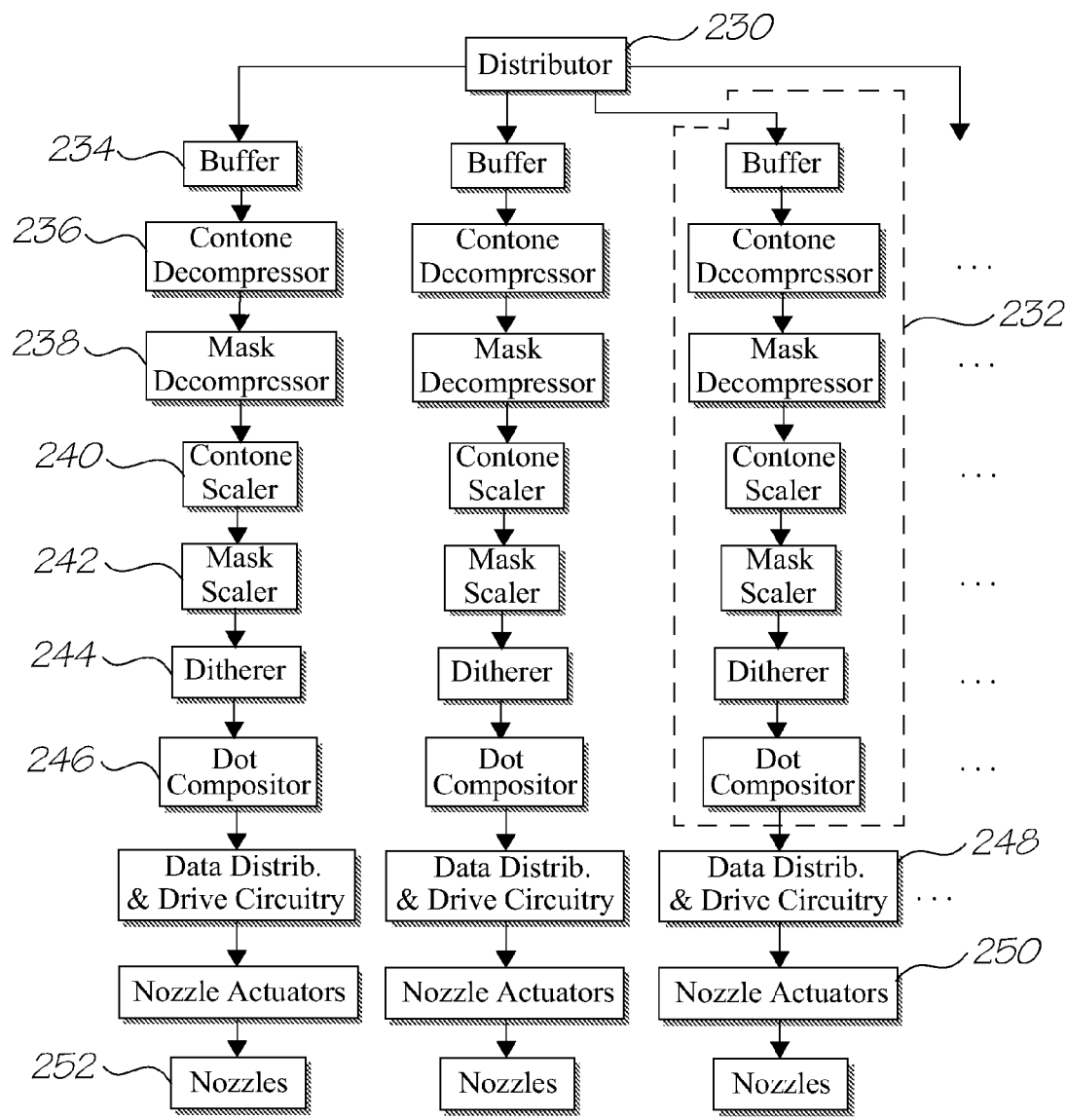
FIG. 48 shows a more detailed schematic showing an embodiment of the architecture used in the control system of the printer unit of the present invention.

As mentioned previously, data is delivered to the printer unit 1 in the form of a compressed, multi-layer page image with the pre-processing of the image performed by a mainly software-based computer system 102. In turn, the printer unit 1 processes this data using a mainly hardware-based system as is shown in more detail in FIG. 48.

Upon receiving the data, a distributor 230 converts the data from a proprietary representation into a hardware-specific representation and ensures that the data is sent to the correct hardware device whilst observing any constraints or requirements on data transmission to these devices. The distributor 230 distributes the converted data to an appropriate one of a plurality of pipelines 232. The pipelines are identical to each other, and in essence provide decompression, scaling and dot compositing functions to generate a set of printable dot outputs.

Each pipeline 232 includes a buffer 234 for receiving the data. A contone decompressor 236 decompresses the color contone planes, and a mask decompressor decompresses the monotone (text) layer. Contone and mask scalers 240 and 242 scale the decompressed contone and mask planes respectively, to take into account the size of the medium onto which the page is to be printed.

The scaled contone planes are then dithered by ditherer 244. In one form, a stochastic dispersed-dot dither is used. Unlike a clustered-dot (or amplitude-modulated) dither, a dispersed-dot (or frequency-modulated) dither reproduces high spatial frequencies (i.e. image detail) almost to the limits of the dot resolution, while simultaneously reproducing lower spatial frequencies to their full color depth, when spatially integrated by the eye. A stochastic dither matrix is carefully designed to be relatively free of objectionable low-frequency patterns when tiled across the image. As such, its size typically exceeds the minimum size required to support a particular number of intensity levels (e.g. 16×16×8 bits for 257 intensity levels).

The dithered planes are then composited in a dot compositor 246 on a dot-by-dot basis to provide dot data suitable for printing. This data is forwarded to data distribution and drive electronics 248, which in turn distributes the data to the correct nozzle actuators 250, which in turn cause ink to be ejected from the correct nozzles 252 at the correct time in a manner which will be described in more detail later in the description.

As will be appreciated, the components employed within the printer unit 1 to process the image for printing depend greatly upon the manner in which data is presented. In this regard it may be possible for the printer unit 1 to employ additional software and/or hardware components to perform more processing within the printer unit 1 thus reducing the reliance upon the computer system 102. Alternatively, the printer unit 1 may employ fewer software and/or hardware components to perform less processing thus relying upon the computer system 102 to process the image to a higher degree before transmitting the data to the printer unit 1. The manner in which the control system 51 of the present invention is configured to perform these tasks will be discussed in more detail below.

As shown in FIG. 12 and as discussed previously, the print engine 3 of the printer unit 1 is an inkjet print engine comprised of two main parts, the cartridge unit 20 and the cradle unit 21. The cartridge unit 20 is configured to be received within the cradle unit 21 and locked in position by the locking arm 22.

Referring to FIG. 15, the cartridge unit 20 is in the form of a body that houses a printhead integrated circuit 60 for printing ink on a sheet of media supplied from the input media trays 4 of the printer unit 1 and the extender tray assemblies 34. The body of the cartridge unit 20 also houses ink storage reservoir(s) 61 for storing ink for printing by the printhead integrated circuit 60. The printhead integrated circuit 60 is a pagewidth printhead integrated circuit that is disposed along the length of the body of the cartridge unit 20 to extend the width of the media being printed. As opposed to conventional inkjet printer units, the printhead integrated circuit 60 of the present invention is fixed in position during operation and does not scan or traverse across the media. As such the print engine of the present invention is able to achieve far higher printing speeds than is currently possible with conventional, reciprocating printhead printer systems.

The ink handling and storage reservoirs 61 are in the form of a plurality of polyethylene membrane pockets that separately store different types of inks and printing fluids for printing. For example, the cartridge unit 20 may be provided with six separate polyethylene membrane reservoirs for storing cyan, magenta, yellow and black ink for full colour printing as well as infra-red ink for specific printing applications and an ink fixative to aid in the setting of the ink. As discussed previously, each of the reservoirs 61 are in fluid communication with a corresponding inlet provided in a refill port 23 formed on the periphery of the body of the cartridge unit 20. As such, the reservoirs 61 are able to be individually refilled by bringing an ink refill unit 24 into contact with the refill port 23 and delivering ink under pressure into the reservoirs 61 as is shown in FIG. 13. In order to ensure the integrity of the ink being refilled, the ink refill unit 24 may be equipped with a QA chip which is read by a corresponding reader provided on the body of the cartridge unit 20. To facilitate refilling, the polyethylene membrane reservoirs 61 are configured such that as they fill they expand to accommodate the fluid and as the ink/fluid is consumed during the printing process the reservoir collapses. It will be appreciated that the ink storage reservoirs 61 could be in other forms that allow the ink to be stored individually within the body of the cartridge unit 20, as would be appreciated by a person skilled in the art.

Ink and printing fluids stored within the reservoirs 61 are delivered to the printhead integrated circuit 60 via a series of conduits arranged to carry a specific fluid, such as a particular colour ink or fixative. Such a system ensures that the fluid is distributed to the correct ink delivery nozzle provided along the length of the printhead integrated circuit 81. The manner in which this is achieved and the general construction of the cartridge unit 80 has been described in the present Applicant's U.S. Pat. Nos. 7,448,734 to 7,083,272, the disclosures of which are all incorporated herein by reference.

As mentioned above, the printhead integrated circuit 60 of the cartridge unit 20 is a pagewidth printhead integrated circuit which is configured to extend a width of around 22.4 cm (8.8 inches) to accommodate print media of a variable width up to around 21.6 cm, which is equivalent to media having the width of standard A4 or US letter form. It is also envisaged however, that the pagewidth printhead integrated circuit may also be fabricated to have a greater or lesser width, dependant greatly upon the operational requirements of the printer unit 1 and the type of print media intended for use. In order to achieve the desired width, the printhead integrated circuit 60 may be made up of a one or more adjacently mounted integrated circuits with each integrated circuit having a plurality of ink delivery nozzles provided thereon.

Figure 34:
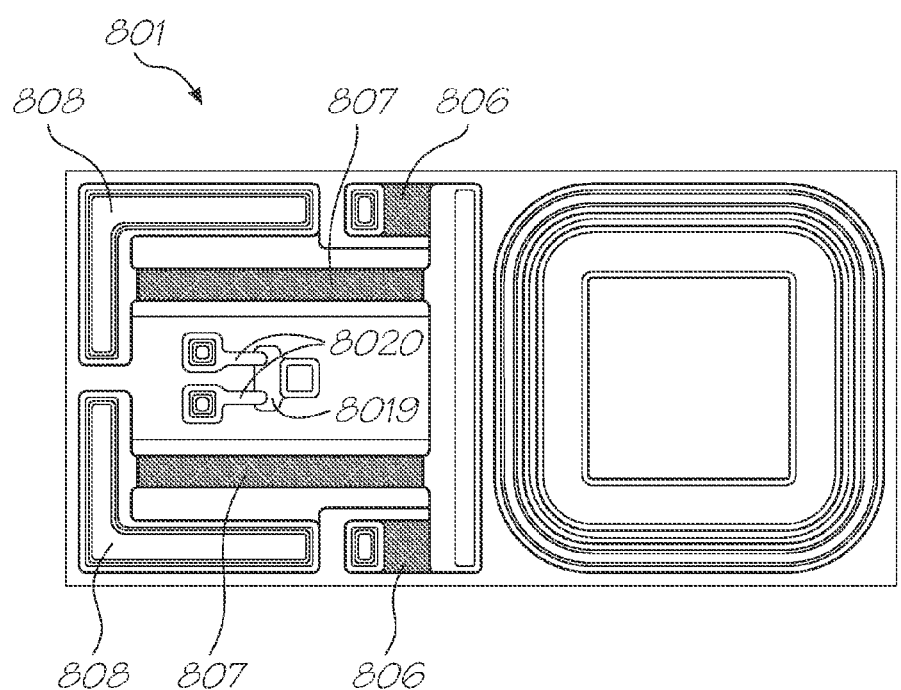
FIG. 34 shows a plan view of the nozzle of FIG. 26 with the lever arm and movable nozzle removed for clarity.
Figure 35:
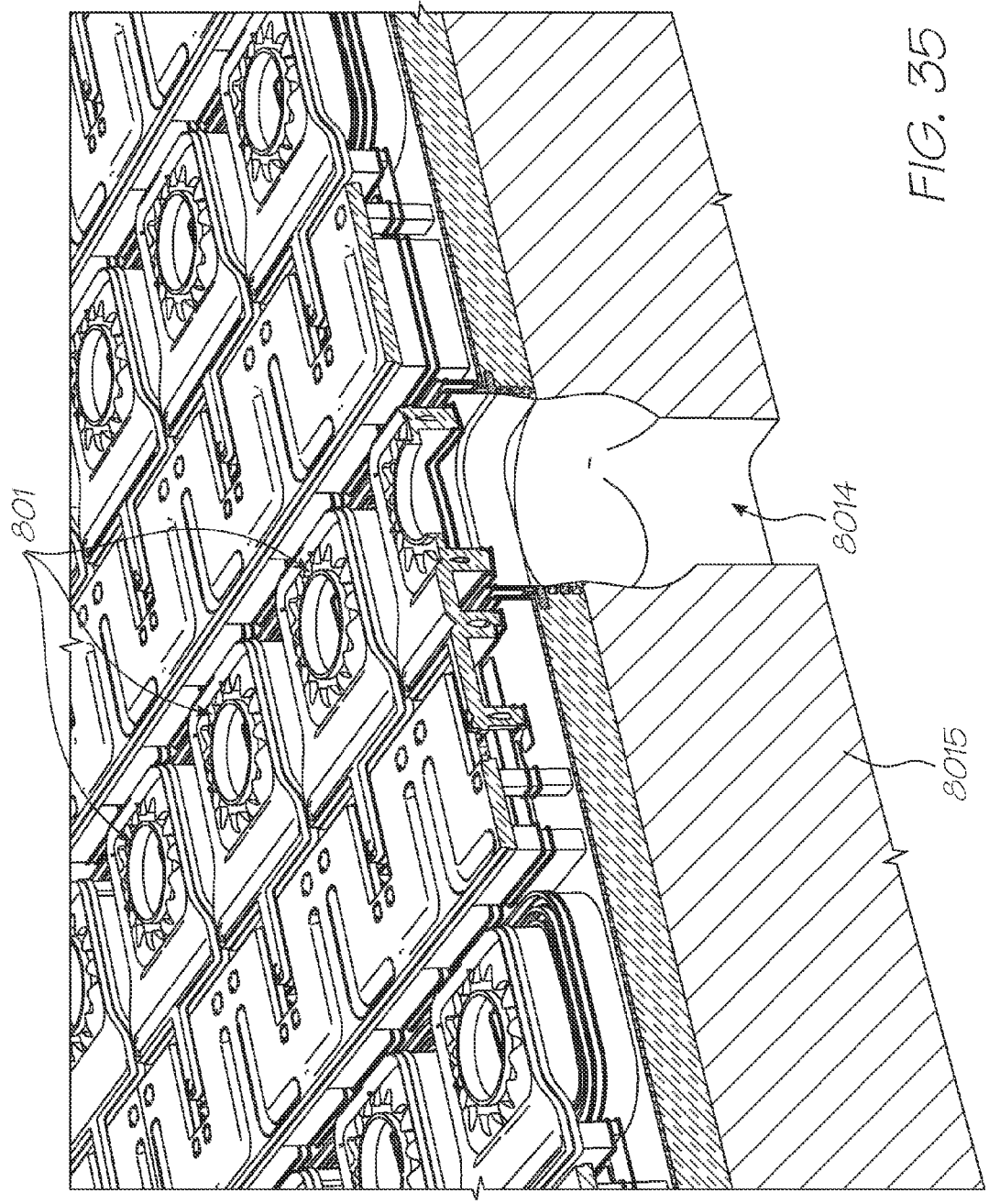
FIG. 35 shows a perspective vertical sectional view of a part of a printhead integrated circuit incorporating a plurality of the nozzle arrangements of the type shown in FIG. 26.

An example of a type of printhead nozzle arrangement suitable for use in the present invention, comprising a nozzle and corresponding actuator, will now be described with reference to FIGS. 26 to 35. FIG. 35 shows an array of the nozzle arrangements 801 formed on a silicon substrate 8015. Each of the nozzle arrangements 801 are identical, however groups of nozzle arrangements 801 are arranged to be fed with different colored inks or fixative. In this regard, the nozzle arrangements are arranged in rows and are staggered with respect to each other, allowing closer spacing of ink dots during printing than would be possible with a single row of nozzles. Such an arrangement makes it possible to provide the density of nozzles as described above. The multiple rows also allow for redundancy (if desired), thereby allowing for a predetermined failure rate per nozzle.

Each nozzle arrangement 801 is the product of an integrated circuit fabrication technique. In particular, the nozzle arrangement 801 defines a micro-electromechanical system (MEMS).

For clarity and ease of description, the construction and operation of a single nozzle arrangement 801 will be described with reference to FIGS. 26 to 34.

The ink jet printhead chip 60 includes a silicon wafer substrate 8015 having 0.35 Micron 1 P4M 12 volt CMOS microprocessing electronics is positioned thereon.

A silicon dioxide (or alternatively glass) layer 8017 is positioned on the substrate 8015. The silicon dioxide layer 8017 defines CMOS dielectric layers. CMOS top-level metal defines a pair of aligned aluminium electrode contact layers 8030 positioned on the silicon dioxide layer 8017. Both the silicon wafer substrate 8015 and the silicon dioxide layer 8017 are etched to define an ink inlet channel 8014 having a generally circular cross section (in plan). An aluminium diffusion barrier 8028 of CMOS metal 1, CMOS metal 2/3 and CMOS top level metal is positioned in the silicon dioxide layer 8017 about the ink inlet channel 8014. The diffusion barrier 8028 serves to inhibit the diffusion of hydroxyl ions through CMOS oxide layers of the drive electronics layer 8017.

A passivation layer in the form of a layer of silicon nitride 8031 is positioned over the aluminium contact layers 8030 and the silicon dioxide layer 8017. Each portion of the passivation layer 8031 positioned over the contact layers 8030 has an opening 8032 defined therein to provide access to the contacts 8030.

Figure 26:
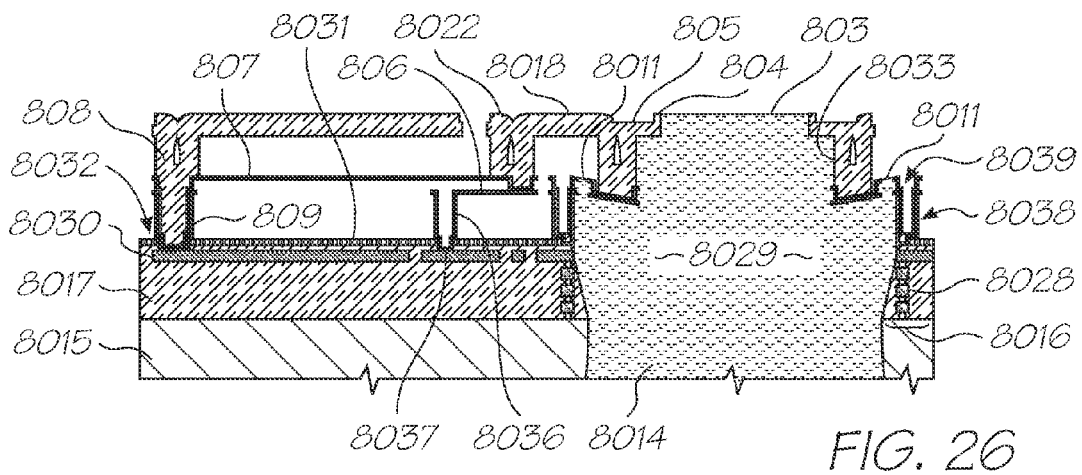
FIG. 26 shows a vertical sectional view of a single nozzle for ejecting ink, for use with the invention, in a quiescent state.

The nozzle arrangement 801 includes a nozzle chamber 8029 defined by an annular nozzle wall 8033, which terminates at an upper end in a nozzle roof 8034 and a radially inner nozzle rim 804 that is circular in plan. The ink inlet channel 8014 is in fluid communication with the nozzle chamber 8029. At a lower end of the nozzle wall, there is disposed a moving rim 8010, that includes a moving seal lip 8040. An encircling wall 8038 surrounds the movable nozzle, and includes a stationary seal lip 8039 that, when the nozzle is at rest as shown in FIG. 26, is adjacent the moving rim 8010. A fluidic seal 8011 is formed due to the surface tension of ink trapped between the stationary seal lip 8039 and the moving seal lip 8040. This prevents leakage of ink from the chamber whilst providing a low resistance coupling between the encircling wall 8038 and the nozzle wall 8033.

Figure 33:
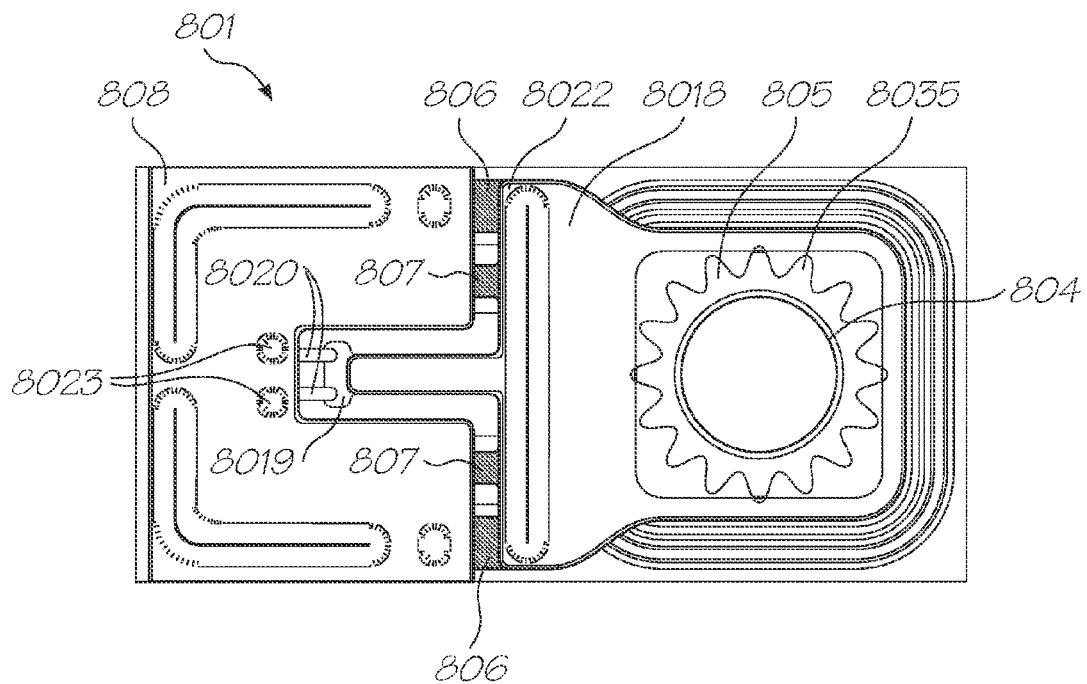
FIG. 33 shows a plan view of the nozzle of FIG. 26.

As best shown in FIG. 33, a plurality of radially extending recesses 8035 is defined in the roof 8034 about the nozzle rim 804. The recesses 8035 serve to contain radial ink flow as a result of ink escaping past the nozzle rim 804.

The nozzle wall 8033 forms part of a lever arrangement that is mounted to a carrier 8036 having a generally U-shaped profile with a base 8037 attached to the layer 8031 of silicon nitride.

Figure 29:
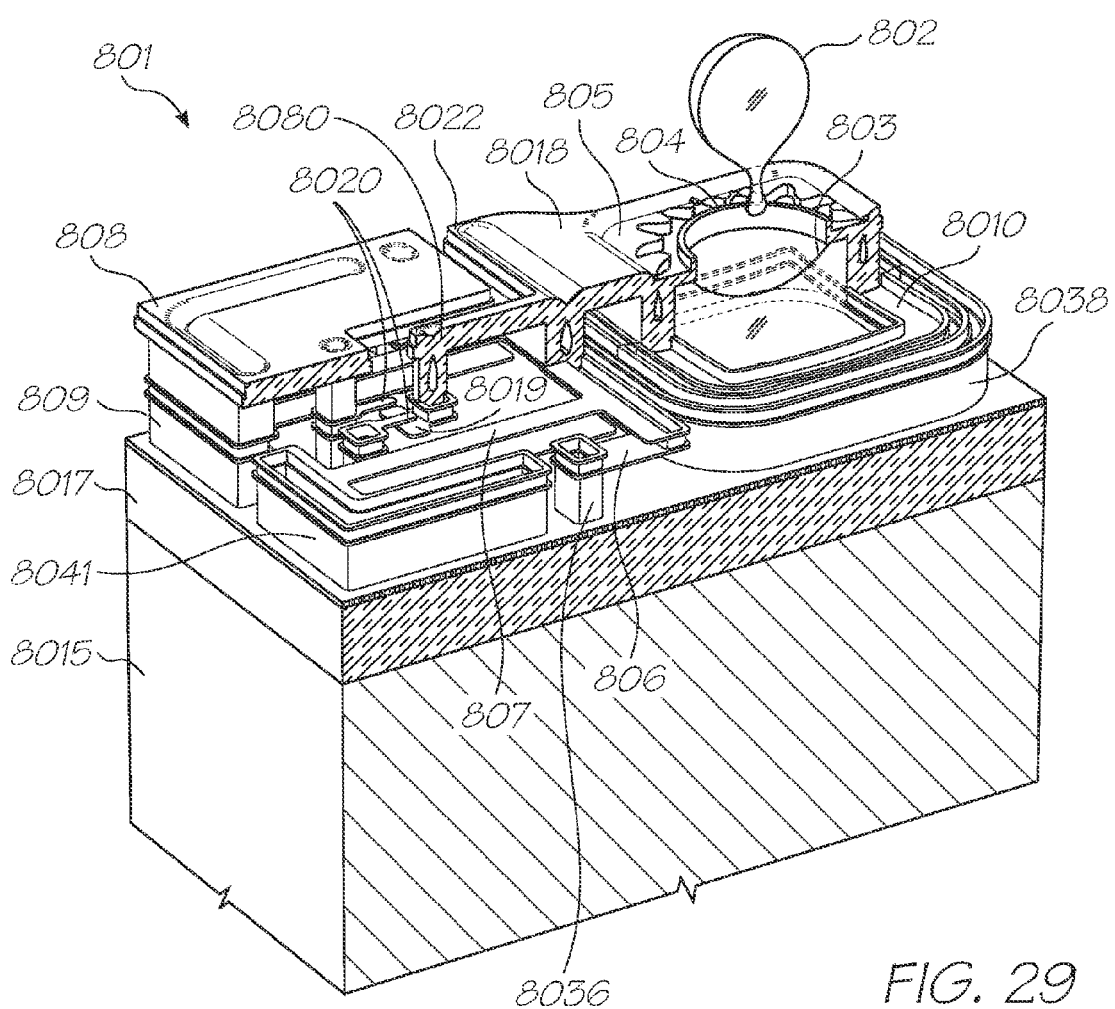
FIG. 29 shows a perspective partial vertical sectional view of the nozzle of FIG. 18, at the actuation state shown in FIG. 28.
Figure 30:
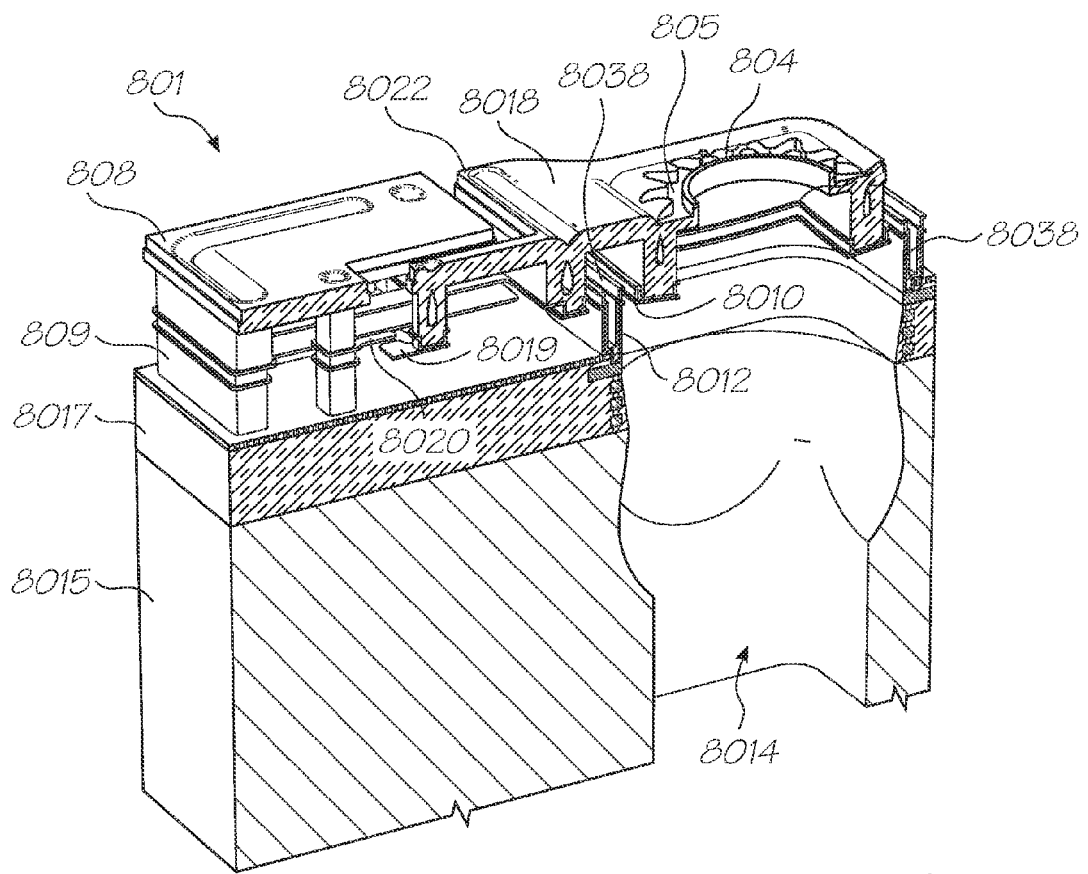
FIG. 30 shows a perspective vertical section of the nozzle of FIG. 26, with ink omitted.
Figure 31:
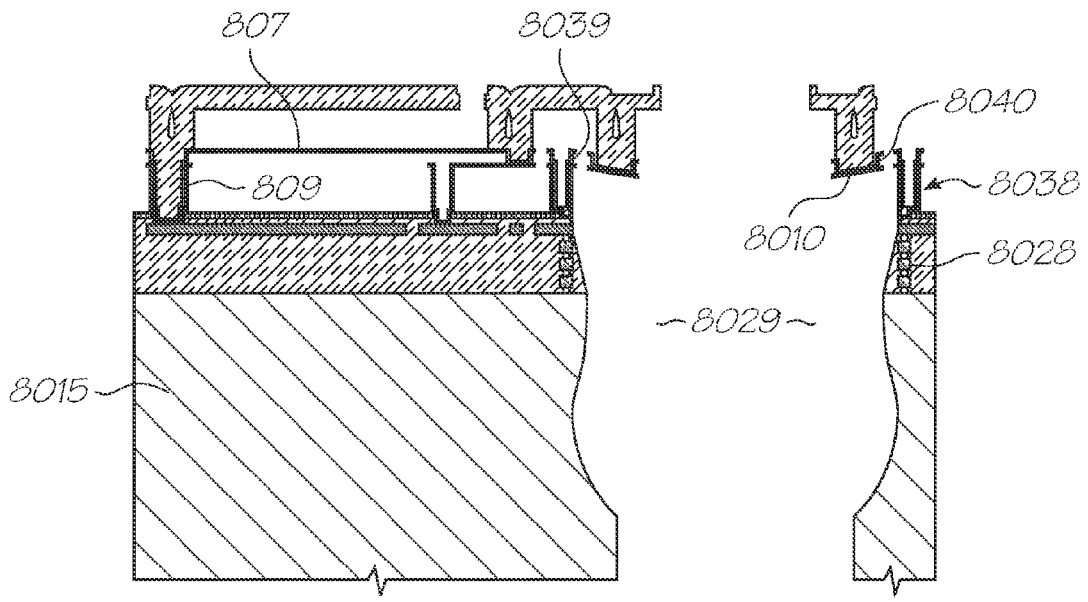
FIG. 31 shows a vertical sectional view of the of the nozzle of FIG. 30.

The lever arrangement also includes a lever arm 8018 that extends from the nozzle walls and incorporates a lateral stiffening beam 8022. The lever arm 8018 is attached to a pair of passive beams 806, formed from titanium nitride (TiN) and positioned on either side of the nozzle arrangement, as best shown in FIGS. 29 and 34. The other ends of the passive beams 806 are attached to the carrier 8036.

The lever arm 8018 is also attached to an actuator beam 807, which is formed from TiN. It will be noted that this attachment to the actuator beam is made at a point a small but critical distance higher than the attachments to the passive beam 806.

Figure 32:
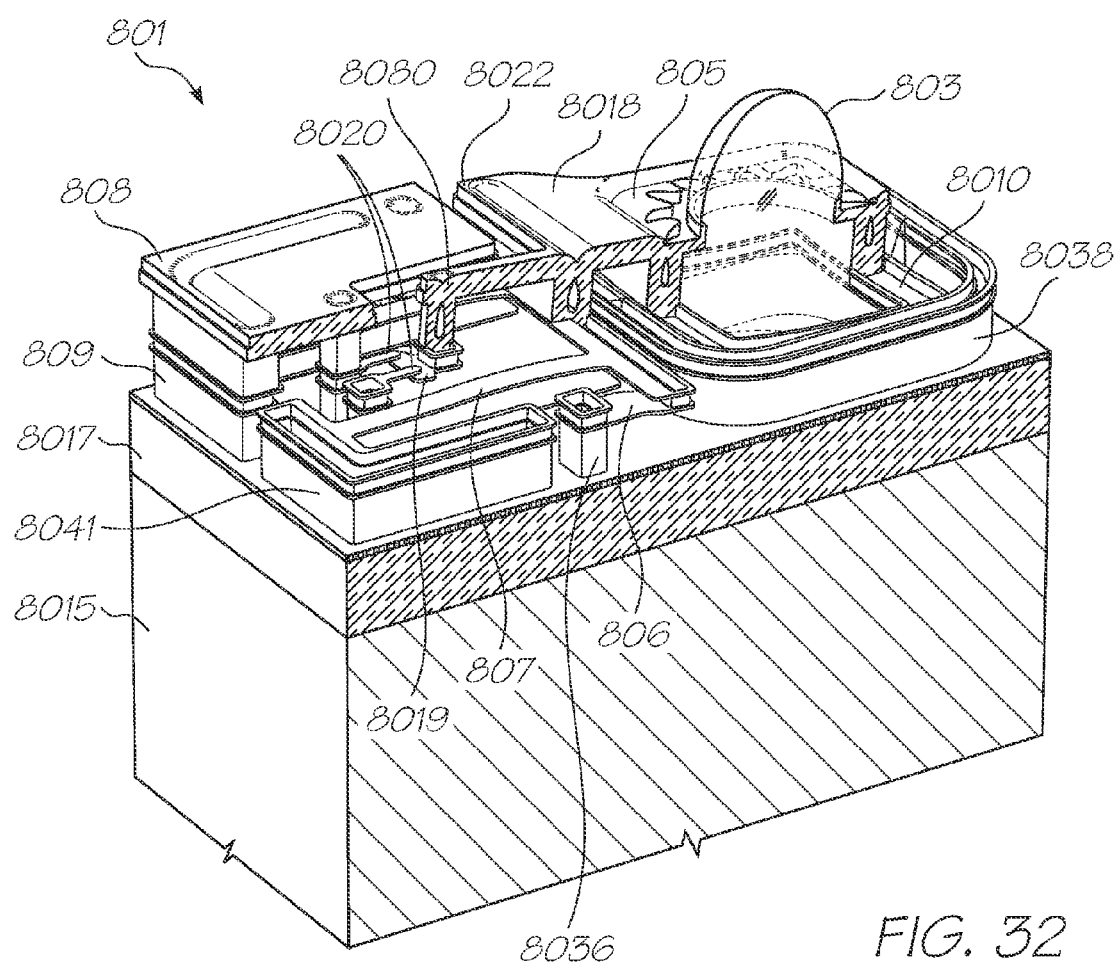
FIG. 32 shows a perspective partial vertical sectional view of the nozzle of FIG. 26, at the actuation state shown in FIG. 27.

As best shown in FIGS. 26 and 32, the actuator beam 807 is substantially U-shaped in plan, defining a current path between the electrode 809 and an opposite electrode 8041. Each of the electrodes 809 and 8041 are electrically connected to respective points in the contact layer 8030. As well as being electrically coupled via the contacts 809, the actuator beam is also mechanically anchored to anchor 808. The anchor 808 is configured to constrain motion of the actuator beam 807 to the left of FIGS. 26 to 28 when the nozzle arrangement is in operation.

The TiN in the actuator beam 807 is conductive, but has a high enough electrical resistance that it undergoes self-heating when a current is passed between the electrodes 809 and 8041. No current flows through the passive beams 806, so they do not expand.

In use, the device at rest is filled with ink 8013 that defines a meniscus 803 under the influence of surface tension. The ink is retained in the chamber 8029 by the meniscus, and will not generally leak out in the absence of some other physical influence.

Figure 27:
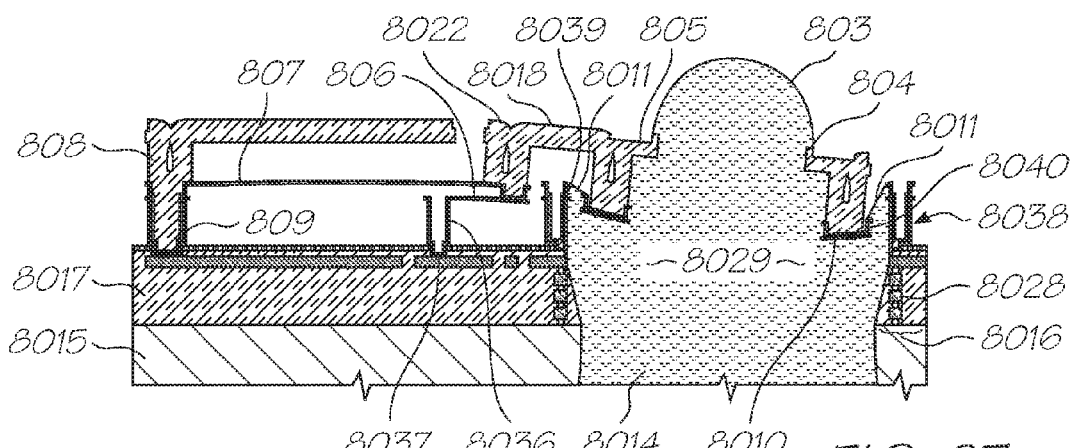
FIG. 27 shows a vertical sectional view of the nozzle of FIG. 26 during an initial actuation phase.

As shown in FIG. 27, to fire ink from the nozzle, a current is passed between the contacts 809 and 8041, passing through the actuator beam 807. The self-heating of the beam 807 due to its resistance causes the beam to expand. The dimensions and design of the actuator beam 807 mean that the majority of the expansion in a horizontal direction with respect to FIGS. 26 to 28. The expansion is constrained to the left by the anchor 808, so the end of the actuator beam 807 adjacent the lever arm 8018 is impelled to the right.

The relative horizontal inflexibility of the passive beams 806 prevents them from allowing much horizontal movement the lever arm 8018. However, the relative displacement of the attachment points of the passive beams and actuator beam respectively to the lever arm causes a twisting movement that causes the lever arm 8018 to move generally downwards. The movement is effectively a pivoting or hinging motion. However, the absence of a true pivot point means that the rotation is about a pivot region defined by bending of the passive beams 806.

The downward movement (and slight rotation) of the lever arm 8018 is amplified by the distance of the nozzle wall 8033 from the passive beams 806. The downward movement of the nozzle walls and roof causes a pressure increase within the chamber 8029, causing the meniscus to bulge as shown in FIG. 27. It will be noted that the surface tension of the ink means the fluid seal 8011 is stretched by this motion without allowing ink to leak out.

Figure 28:
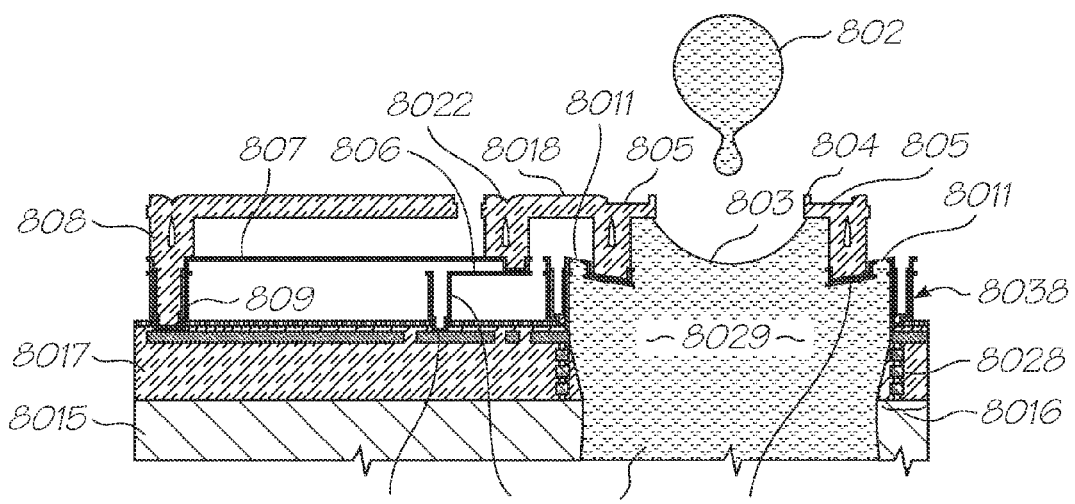
FIG. 28 shows a vertical sectional view of the nozzle of FIG. 27 later in the actuation phase.

As shown in FIG. 28, at the appropriate time, the drive current is stopped and the actuator beam 807 quickly cools and contracts. The contraction causes the lever arm to commence its return to the quiescent position, which in turn causes a reduction in pressure in the chamber 8029. The interplay of the momentum of the bulging ink and its inherent surface tension, and the negative pressure caused by the upward movement of the nozzle chamber 8029 causes thinning, and ultimately snapping, of the bulging meniscus to define an ink drop 802 that continues upwards until it contacts adjacent print media.

Immediately after the drop 802 detaches, meniscus 803 forms the concave shape shown in FIG. 28. Surface tension causes the pressure in the chamber 8029 to remain relatively low until ink has been sucked upwards through the inlet 8014, which returns the nozzle arrangement and the ink to the quiescent situation shown in FIG. 26.

With the above described arrangement, the printhead integrated circuit 60 of the cartridge unit 20 can have between 5000 to 100,000 of the above described nozzles arranged along its surface. For simple, single colour printing applications of low-to-medium resolution, the pagewidth printhead integrated circuit 60 may require only around 5000 nozzles situated along the length thereof to print the desired image or text. However, for photo quality images at or around 1600 dpi the printhead integrated circuit 60 may have 13824 nozzles per color. Therefore, in the case where the printer unit 1 is capable of printing in 4 colours (C, M, Y, K), the printhead integrated circuit 60 has around 53396 nozzles disposed along the surface thereof. Further, in a case where the printhead integrated circuit 60 is capable of printing 6 printing fluids (C, M, Y, K, IR and a fixative) this results in 82944 nozzles being provided on the surface of the printhead integrated circuit 60.

The manner in which the individual nozzle arrangements 801 are controlled within the printhead integrated circuit 60 to deliver ink to the media, will now be described with reference to FIGS. 36-39.

Figure 36:
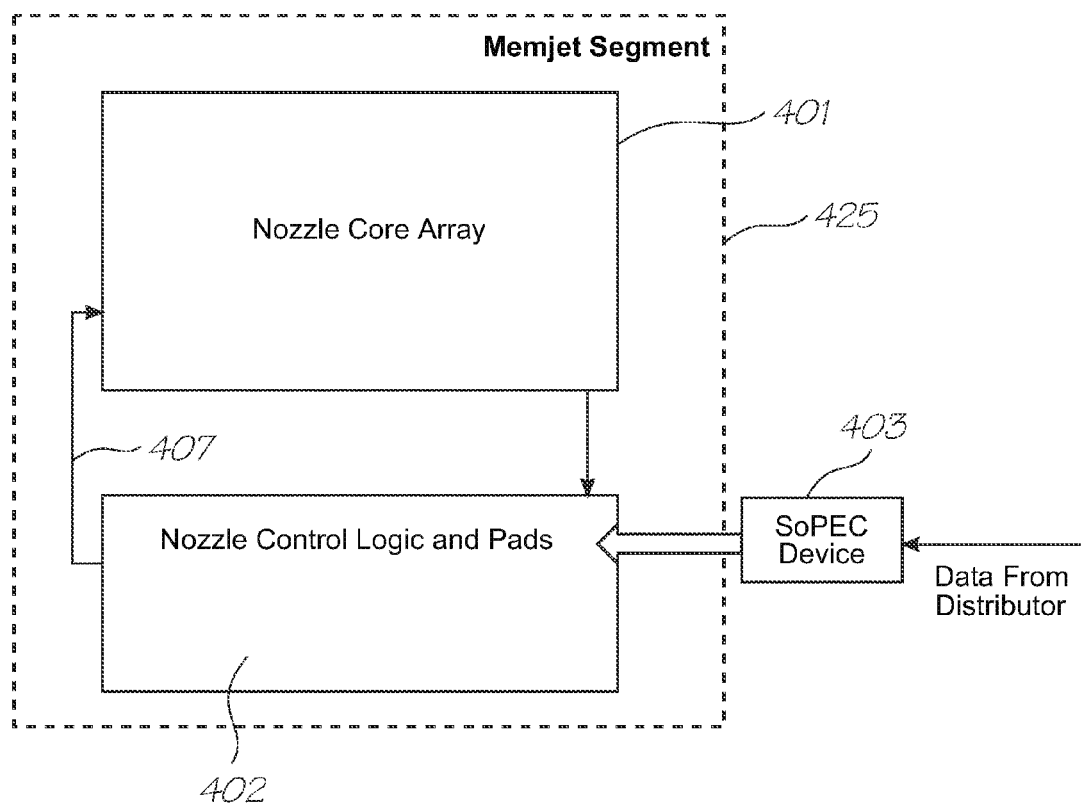
FIG. 36 shows a schematic showing CMOS drive and control blocks suitable for use with the present invention.

FIG. 36 shows an overview of the printhead integrated circuit 60 and its connections to the control system of the printer engine 3. As discussed above, printhead integrated circuit 60 includes a nozzle core array 401 containing the repeated logic to fire each nozzle, and nozzle control logic 402 to generate the timing signals to fire the nozzles. The nozzle control logic 402 receives data from the control system via a high-speed link.

The nozzle control logic 402 is configured to send serial data to the nozzle array core for printing, via a link 407, which may be in the form of an electrical connector. Status and other operational information about the nozzle array core 401 is communicated back to the nozzle control logic 402 via another link 408, which may be also provided on the electrical connector.

Figure 37:
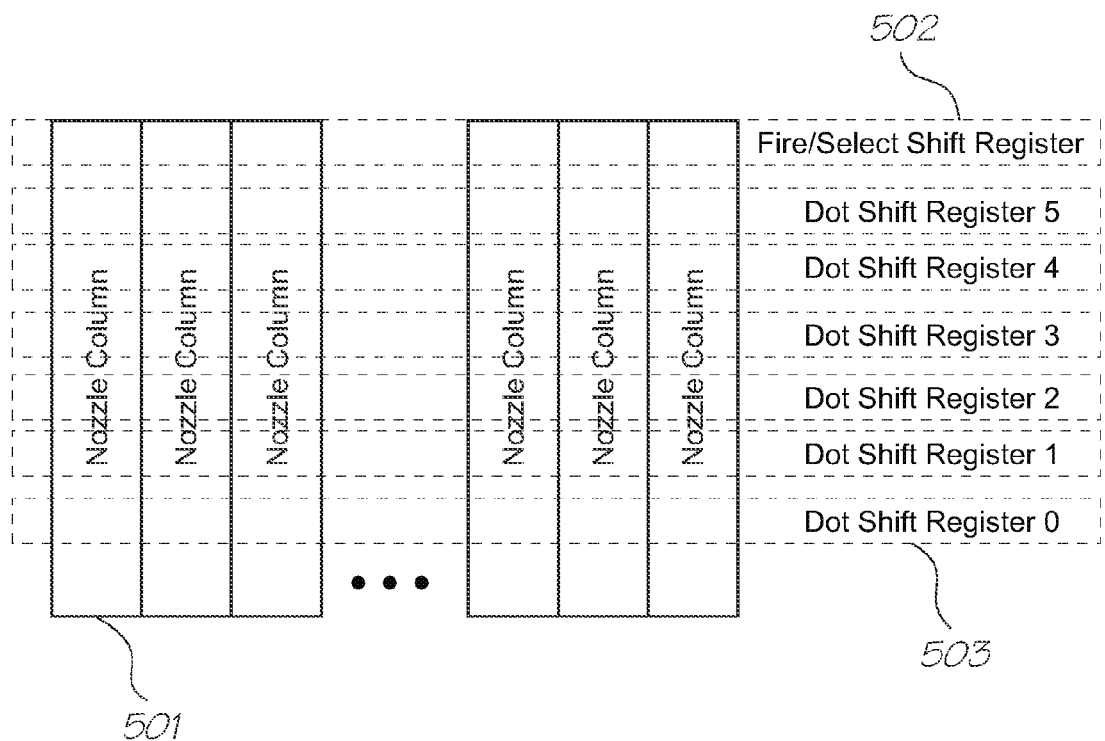
FIG. 37 shows a schematic showing the relationship between nozzle columns and dot shift registers in the CMOS blocks of FIG. 36.
Figure 38:
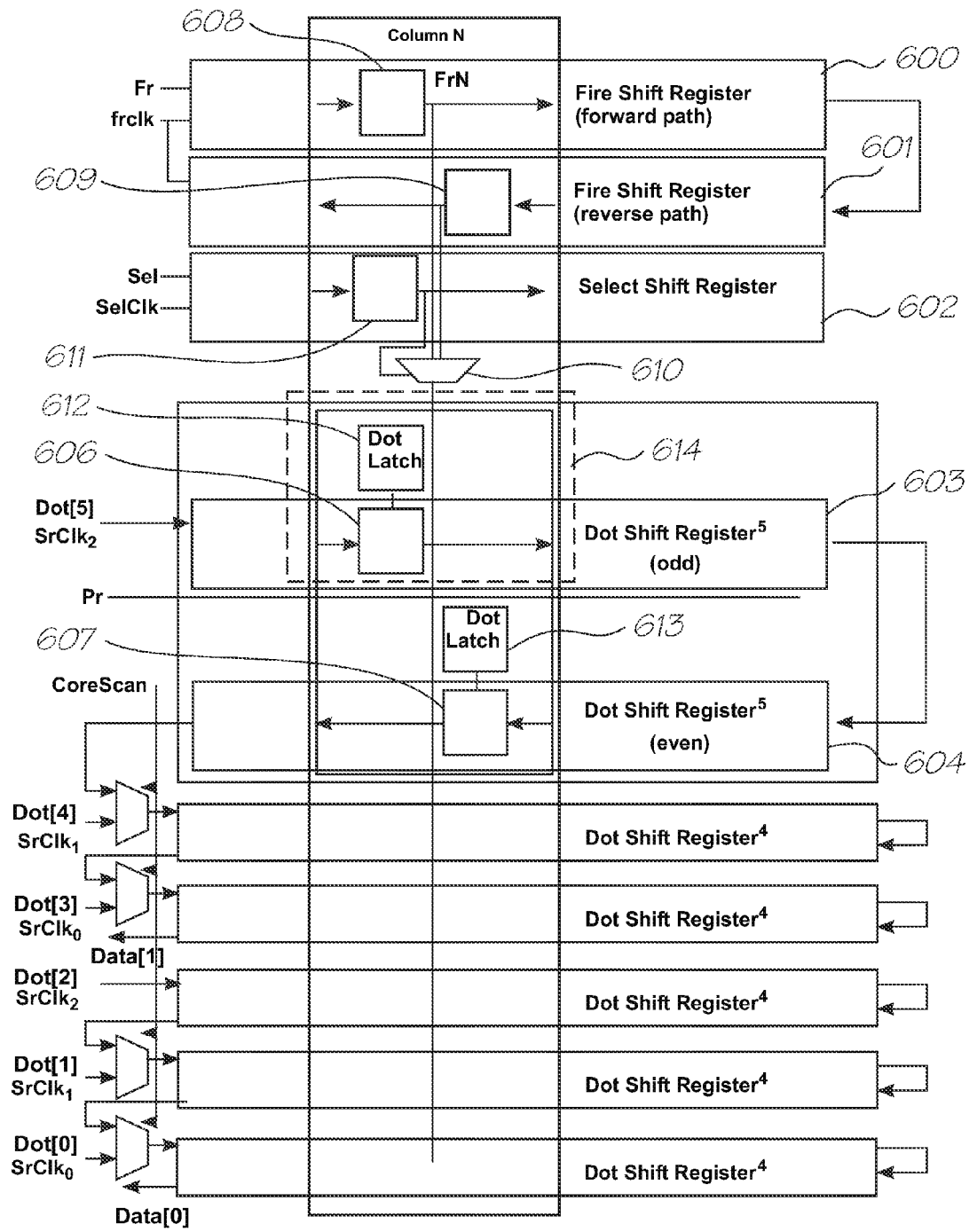
FIG. 38 shows a more detailed schematic showing a unit cell and its relationship to the nozzle columns and dot shift registers of FIG. 37.

The nozzle array core 401 is shown in more detail in FIGS. 37 and 38. In FIG. 37, it will be seen that the nozzle array core 401 comprises an array of nozzle columns 501. The array includes a fire/select shift register 502 and up to 6 color channels, each of which is represented by a corresponding dot shift register 503.

As shown in FIG. 38, the fire/select shift register 502 includes forward path fire shift register 600, a reverse path fire shift register 601 and a select shift register 602. Each dot shift register 503 includes an odd dot shift register 603 and an even dot shift register 604. The odd and even dot shift registers 603 and 604 are connected at one end such that data is clocked through the odd shift register 603 in one direction, then through the even shift register 604 in the reverse direction. The output of all but the final even dot shift register is fed to one input of a multiplexer 605. This input of the multiplexer is selected by a signal (corescan) during post-production testing. In normal operation, the corescan signal selects dot data input Dot[x] supplied to the other input of the multiplexer 605. This causes Dot[x] for each color to be supplied to the respective dot shift registers 503.

A single column N will now be described with reference to FIG. 38. In the embodiment shown, the column N includes 12 data values, comprising an odd data value 606 and an even data value 607 for each of the six dot shift registers. Column N also includes an odd fire value 608 from the forward fire shift register 600 and an even fire value 609 from the reverse fire shift register 601, which are supplied as inputs to a multiplexer 610. The output of the multiplexer 610 is controlled by the select value 611 in the select shift register 602. When the select value is zero, the odd fire value is output, and when the select value is one, the even fire value is output.

Each of the odd and even data values 606 and 607 is provided as an input to corresponding odd and even dot latches 612 and 613 respectively.

Each dot latch and its associated data value form a unit cell, such as unit cell 614. A unit cell is shown in more detail in FIG. 39. The dot latch 612 is a D-type flip-flop that accepts the output of the data value 606, which is held by a D-type flip-flop 614 forming an element of the odd dot shift register 603. The data input to the flip-flop 614 is provided from the output of a previous element in the odd dot shift register (unless the element under consideration is the first element in the shift register, in which case its input is the Dot[x] value).

Data is clocked from the output of flip-flop 614 into latch 612 upon receipt of a negative pulse provided on LsyncL.

The output of latch 612 is provided as one of the inputs to a three-input AND gate 615. Other inputs to the AND gate 615 are the Fr signal (from the output of multiplexer 610) and a pulse profile signal Pr. The firing time of a nozzle is controlled by the pulse profile signal Pr, and can be, for example, lengthened to take into account a low voltage condition that arises due to low power supply (in a removable power supply embodiment). This is to ensure that a relatively consistent amount of ink is efficiently ejected from each nozzle as it is fired. In the embodiment described, the profile signal Pr is the same for each dot shift register, which provides a balance between complexity, cost and performance. However, in other embodiments, the Pr signal can be applied globally (ie, is the same for all nozzles), or can be individually tailored to each unit cell or even to each nozzle.

Once the data is loaded into the latch 612, the fire enable Fr and pulse profile Pr signals are applied to the AND gate 615, combining to the trigger the nozzle to eject a dot of ink for each latch 612 that contains a logic 1.

The signals for each nozzle channel are summarized in the following table:

| Name | Direction | Description |
| --- | --- | --- |
| D | Input | Input dot pattern to shift register bit |
| Q | Output | Output dot pattern from shift register bit |
| SrClk | Input | Shift register clock in - d is captured on rising edge of this clock |
| LsyncL | Input | Fire enable - needs to be asserted for nozzle to fire |
| Pr | Input | Profile - needs to be asserted for nozzle to fire |

Figure 39:
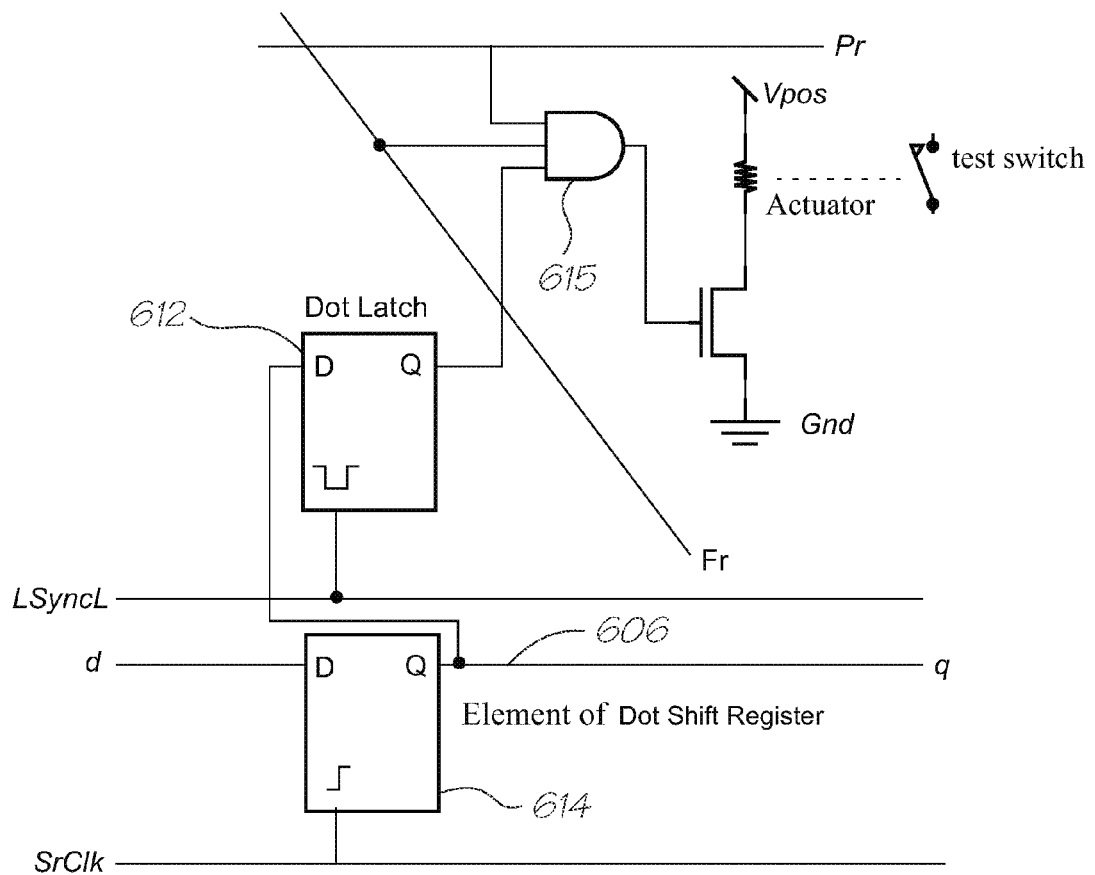
FIG. 39 shows a circuit diagram showing logic for a single printer nozzle suitable for use with the present invention.

As shown in FIG. 39, the fire signals Fr are routed on a diagonal, to enable firing of one color in the current column, the next color in the following column, and so on. This averages the current demand by spreading it over 6 columns in time-delayed fashion.

The dot latches and the latches forming the various shift registers are fully static in this embodiment, and are CMOS-based. The design and construction of latches is well known to those skilled in the art of integrated circuit engineering and design, and so will not be described in detail in this document.

The nozzle speed may be as much as 20 kHz for the printer unit 1 capable of printing at about 60 ppm, and even more for higher speeds. At this range of nozzle speeds the amount of ink than can be ejected by the entire printhead 60 is at least 50 million drops per second. However, as the number of nozzles is increased to provide for higher-speed and higher-quality printing at least 100 million drops per second, preferably at least 300 million drops per second, and more preferably at least 1 billion drops per second may be delivered.

Consequently, in order to accommodate printing at these speeds, the control system of the print engine must calculate whether each nozzle is to eject a drop of ink at a rate of at least 50 million dots per second, and depending on the printing speed, at least 100 million dots per second, preferably at least 300 million dots per second, and more preferably at least 1 billion dots per second for the higher-speed, higher-quality printing applications.

For the printer unit 1 printing with the maximum width of A4 paper, the above-described ranges of the number of nozzles and print speeds results in an area print speed of at least 50 cm$^2$ per second, and depending on the printing speed, at least 100 cm$^2$ per second, preferably at least 200 cm$^2$ per second, and more preferably at least 500 cm$^2$ per second at the higher-speeds.

As will be appreciated, in this arrangement the cartridge unit 20 is specifically designed to store the ink and other printing fluids and to deliver the ink/printing fluids onto a surface of media, under control of the print engine control system. In this regard, the cartridge unit 20 can be readily replaced in the event of one or more nozzles of the printhead integrated circuit 60 malfunctioning or any problem with the conduits delivering the ink to the printhead integrated circuit 60, without having to replace the entire print engine 3.

With reference to FIG. 15, the cradle unit 21 forms the second part of the print engine 3 and is fixed within the body 2 of the printer unit in an elevated position above the media output region 6. A cover 19 is provided over the print engine 3 and is pivoted to an open position to allow access to the print engine 3. In this position, the cradle unit 21 is able to receive data from external data sources such as a digital camera or one or more personal computers on a network, via the data connector provided on the body 2 of the printer unit. Similarly, power is supplied to the cradle unit 21 from the power inlet 10 via a suitable electrical connection (not shown) and can be distributed to the relevant system components as required.

As is shown in FIG. 12, in order to enable control data and power to be transmitted to the cartridge unit 20, the cradle unit 21 is provided with a number of electrical contacts 62 arranged along its length which mate with corresponding electrical contacts (not shown) provided along the length of the cartridge unit 20 when the cartridge unit 20 is inserted into the cradle unit 21. In this regard, the cradle unit 21 is shaped to receive the cartridge unit 20 therein.

The body of the cradle unit 21 comprises a drive motor 63, a drive roller 64 and a pinch roller 65 for transporting paper through the print engine 3. A printhead maintenance unit 66 is also provided for capping the printhead integrated circuit 60 when not in use, as well as performing other forms of maintenance to the printhead integrated circuit 60 of the cartridge unit 20. The cradle unit also contains the control system 67 which includes the electronics required to control the overall operation of the printer unit 1.

The drive motor 63 is a standard brushless DC motor having bidirectional capabilities. The drive motor 63 is gearingly engaged with the drive roller 64 to provide driving motion to the drive roller 64 to control delivery of print media past the printhead integrated circuit 60. As discussed previously, the transport rollers 26, 45 of the printer unit 1 and the extender tray assemblies 34 deliver the media to the print engine 3, however upon reaching the print engine 3, the media is then progressed past the printhead integrated circuit 60 for printing, under action of the drive motor 63 and drive roller 64. In this regard, the speed at which the drive roller 64 is driven by the motor 63 is controlled by the control system 67 to ensure that the paper is delivered past the printhead 60 in a finely controlled manner at the desired rate, which, for the present embodiment, is at a rate of 60 ppm. The drive roller 64 engages with the pinch roller 65 and together cooperate to capture the sheet of media to advance the media past the printhead integrated circuit 60.

The cradle unit 21 is also provided with a printhead maintenance unit 66 which is also gearingly engaged to the drive motor 63. The printhead maintenance unit 66 includes a capping element that is adapted to be moved into position to cap the printhead integrated circuit 60 of the cartridge unit 20. In such instances, upon determination of an idle state of the printer unit 1, the control system 67 initiates engagement of the printhead maintenance unit 66 with the drive motor 63 to move the printhead maintenance unit 66 into capping engagement with the printhead integrated circuit 60. The capping engagement essentially forms a perimeter seal around the ink delivery nozzles of the printhead integrated circuit 60, thereby reducing the evaporation of moisture from the ink present in the ink delivery nozzles, and preventing ink from drying and clogging the nozzles. Similarly, upon determination of the onset of printing, the control system 67 initiates uncapping of the printhead integrated circuit 60 thereby allowing the printhead maintenance unit 66 to return to an uncapped position. The printhead maintenance unit 66 may also perform other features such as wiping or blotting of the printhead 60, as necessary.

Figure 40:
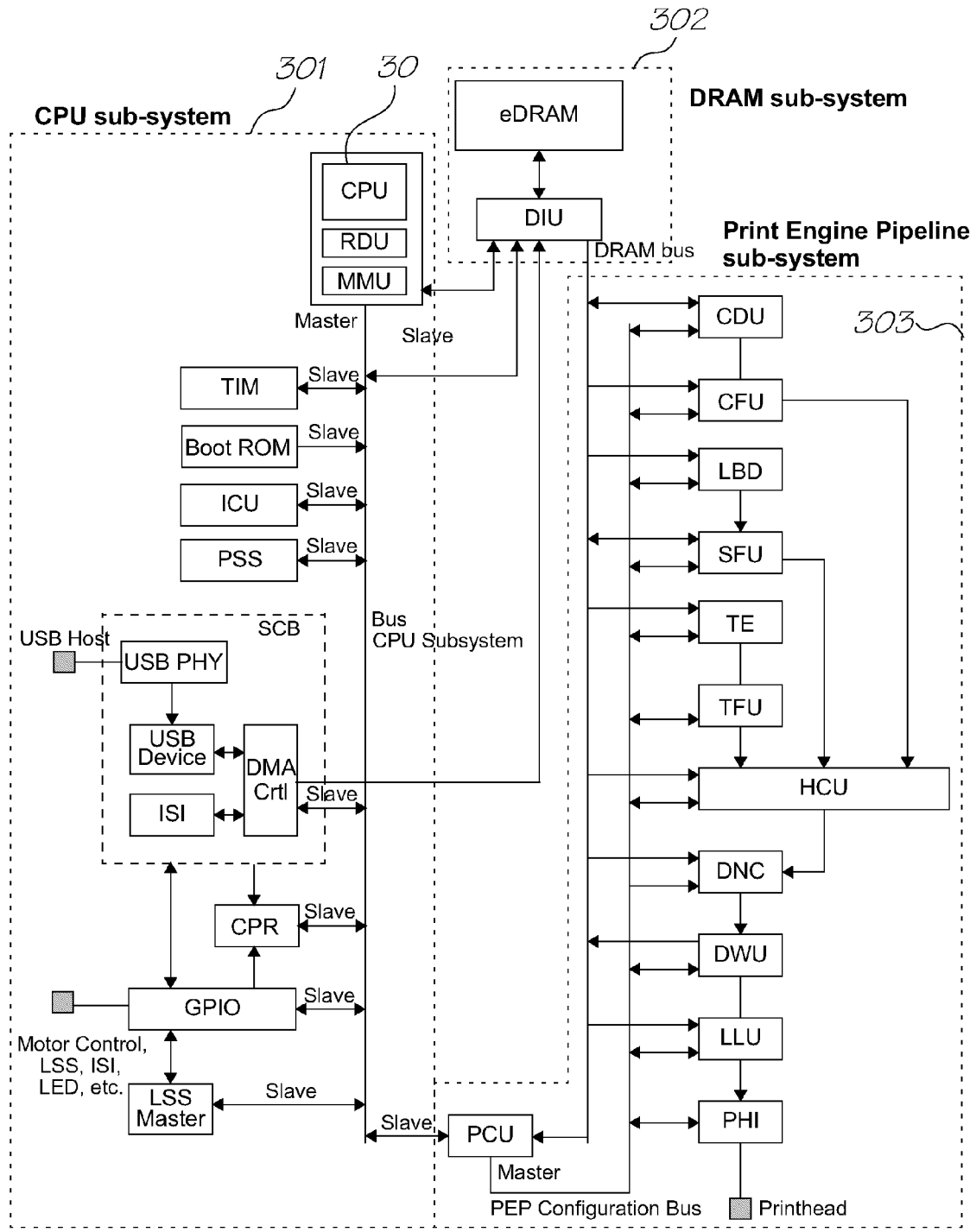
FIG. 40 shows a block diagram showing an embodiment of the control system used in the printer unit of the present invention.

As alluded to previously, the control system 67 of the cradle unit controls the operation of the various components of the printer unit 1 and processes print data received from external sources to control the printhead integrated circuit 60 in order to print the data. FIG. 40 provides a block representation of an embodiment of this system.

In this arrangement, the control system 67 is embodied in a Small Office Home Office Printer Engine Chip (SoPEC). As shown, a SoPEC device consists of 3 distinct subsystems: a Central Processing Unit (CPU) subsystem 301, a Dynamic Random Access Memory (DRAM) subsystem 302 and a Print Engine Pipeline (PEP) subsystem 303.

The CPU subsystem 301 includes a CPU that controls and configures all aspects of the other subsystems. It provides general support for interfacing and synchronizing all elements of the printer unit 1 and controls the low-speed communication to QA chips. The CPU subsystem 301 also contains various peripherals to aid the CPU, such as General Purpose Input Output (GPIO, which includes motor control), an Interrupt Controller Unit (ICU), LSS Master and general timers. The Serial Communications Block (SCB) on the CPU subsystem provides a full speed USB1.1 interface to the host as well as an Inter SoPEC Interface (ISI) to other SoPEC devices (not shown).

The DRAM subsystem 302 accepts requests from the CPU, Serial Communications Block (SCB) and blocks within the PEP subsystem. The DRAM subsystem 302, and in particular the DRAM Interface Unit (DIU), arbitrates the various requests and determines which request should win access to the DRAM. The DIU arbitrates based on configured parameters, to allow sufficient access to DRAM for all requesters. The DIU also hides the implementation specifics of the DRAM such as page size, number of banks and refresh rates.

The Print Engine Pipeline (PEP) subsystem 303 accepts compressed pages from DRAM and renders them to bi-level dots for a given print line destined for a printhead interface (PHI) that communicates directly with the printhead. The first stage of the page expansion pipeline is the Contone Decoder Unit (CDU), Lossless Bi-level Decoder (LBD) and, where required, Tag Encoder (TE). The CDU expands the JPEG-compressed contone (typically CMYK) layers, the LBD expands the compressed bi-level layer (typically K), and the TE encodes any Netpage tags for later rendering (typically in IR or K ink), in the event that the printer unit 1 has Netpage capabilities. The output from the first stage is a set of buffers: the Contone FIFO unit (CFU), the Spot FIFO Unit (SFU), and the Tag FIFO Unit (TFU). The CFU and SFU buffers are implemented in DRAM.

The second stage is the Halftone Compositor Unit (HCU), which dithers the contone layer and composites position tags and the bi-level spot layer over the resulting bi-level dithered layer.

A number of compositing options can be implemented, depending upon the printhead with which the SoPEC device is used. Up to 6 channels of bi-level data are produced from this stage, although not all channels may be present on the printhead. For example, the printhead may be CMY only, with K pushed into the CMY channels and IR ignored. Alternatively, any encoded tags may be printed in K if IR ink is not available (or for testing purposes).

In the third stage, a Dead Nozzle Compensator (DNC) compensates for dead nozzles in the printhead by color redundancy and error diffusing of dead nozzle data into surrounding dots.

The resultant bi-level 6 channel dot-data (typically CMYK, Infrared, Fixative) is buffered and written to a set of line buffers stored in DRAM via a Dotline Writer Unit (DWU).

Finally, the dot-data is loaded back from DRAM, and passed to the printhead interface via a dot FIFO. The dot FIFO accepts data from a Line Loader Unit (LLU) at the system clock rate (pclk), while the PrintHead Interface (PHI) removes data from the FIFO and sends it to the printhead at a rate of ⅔ times the system clock rate.

In the preferred form, the DRAM is 2.5 Mbytes in size, of which about 2 Mbytes are available for compressed page store data. A compressed page is received in two or more bands, with a number of bands stored in memory. As a band of the page is consumed by the PEP subsystem 303 for printing, a new band can be downloaded. The new band may be for the current page or the next page.

Using banding it is possible to begin printing a page before the complete compressed page is downloaded, but care must be taken to ensure that data is always available for printing or a buffer under-run may occur.

The embedded USB device accepts compressed page data and control commands from a host PC, and facilitates the data transfer to either the DRAM (or to another SoPEC device in multi-SoPEC systems, as described below).

Multiple SoPEC devices can be used in alternative embodiments, and can perform different functions depending upon the particular implementation. For example, in some cases a SoPEC device can be used simply for its onboard DRAM, while another SoPEC device attends to the various decompression and formatting functions described above. This can reduce the chance of buffer under-run, which can happen in the event that the printer commences printing a page prior to all the data for that page being received and the rest of the data is not received in time. Adding an extra SoPEC device for its memory buffering capabilities doubles the amount of data that can be buffered, even if none of the other capabilities of the additional chip are utilized.

Each SoPEC system can have several quality assurance (QA) devices designed to cooperate with each other to ensure the quality of the printer mechanics, the quality of the ink supply so the printhead nozzles will not be damaged during prints, and the quality of the software to ensure printheads and mechanics are not damaged.

Normally, each printing SoPEC will have an associated printer QA, which stores information printer attributes such as maximum print speed. An ink cartridge for use with the system will also contain an ink QA chip, which stores cartridge information such as the amount of ink remaining. The printhead also has a QA chip, configured to act as a ROM (effectively as an EEPROM) that stores printhead-specific information such as dead nozzle mapping and printhead characteristics. The CPU in the SoPEC device can optionally load and run program code from a QA Chip that effectively acts as a serial EEPROM. Finally, the CPU in the SoPEC device runs a logical QA chip (ie, a software QA chip).

Usually, all QA chips in the system are physically identical, with only the contents of flash memory differentiating one from the other.

Each SoPEC device has two LSS system buses that can communicate with QA devices for system authentication and ink usage accounting. A large number of QA devices can be used per bus and their position in the system is unrestricted with the exception that printer QA and ink QA devices should be on separate LSS busses.

In use, the logical QA communicates with the ink QA to determine remaining ink. The reply from the ink QA is authenticated with reference to the printer QA. The verification from the printer QA is itself authenticated by the logical QA, thereby indirectly adding an additional authentication level to the reply from the ink QA.

Data passed between the QA chips, other than the printhead QA, is authenticated by way of digital signatures. In the preferred embodiment, HMAC-SHA1 authentication is used for data, and RSA is used for program code, although other schemes could be used instead.

As will be appreciated, the SoPEC device of the control system 67 therefore controls the overall operation of the printer unit 1 and performs essential data processing tasks as well as synchronising and controlling the operation of the individual components of the printer unit 1 to facilitate print media handling. In this regard, the SoPEC device of the control system 67 can send control signals to the control system 51 provided on the extender tray assemblies 34 to control the delivery of media from the extender tray assemblies 34 to the print engine 3.

As shown in FIG. 15 and discussed previously, the body of the cradle unit 21 has an inlet 31 provided upstream of the printhead integrated circuit 60, for receiving the media for printing. The inlet 31 receives a leading edge of the print media delivered by the transport rollers 26 and includes guide members 32 that assist in directing the leading edge of the print media towards the drive and pinch rollers 64, 65.

An outlet 68 is provided in the body of the cradle unit 21 downstream of the printhead integrated circuit 60 to provide a path for the print media to exit the print engine 3. In this regard, following printing by the printhead integrated circuit 60, the leading edge of the printed media exits the print engine 3 via the outlet 68 under the action of the drive and pinch rollers 64, 65. A paper exit mechanism 69 is provided adjacent the outlet 68 to deliver the printed media to the media output region 6.

The paper exit mechanism 69 may be formed on the cover 19 of the printer unit 1 or on the external surface of the cradle unit 21 of the printer unit 2 and consists of an exit roller 70 and a plurality of idler wheels 71. The exit roller 70 is provided by an elongate shaft that extends across the cradle unit 21 and which may have an outer shell comprising a rubber material or the like to aid in gripping the media. The exit roller 70 is driven by the drive motor 63 of the cradle unit 21 via drive gears (not shown). In this arrangement, the control system 51 of the cradle unit 21 is able to control the operation of the paper exit mechanism 69 to ensure that it is initiated at an appropriate time and speed to correspond with the speed and timing of the drive roller 64 of the cradle unit 21.

The idler wheels 71 of the paper exit mechanism 69 act in cooperation with the exit roller 70 to capture and deliver the printed media to the media output region 6. The idler wheels 71 are flexibly mounted to be in rotational contact with the surface of the exit roller 70. As shown in FIG. 13, the idler wheels 71 are in the form of star wheels which may be arranged at regular intervals along the exit roller 70, to rotate upon the surface of the exit roller 70 to capture the media.

It should be appreciated that whilst the paper exit mechanism 69 is shown and described as being outside the print engine 3, it is envisaged that the paper exit mechanism could also be incorporated within the print engine 3. Further, whilst the paper exit mechanism 69 is shown as having star wheels, other types of idler wheels or rollers could also be employed as would be apparent to a person skilled in the art and still fall within the scope of the present invention.

As described above, the present invention resides in an inkjet printer unit 1 which is capable of being used in a network or workgroup environment to receive and print multiple jobs having a variety of colour and quality requirements. However, the present invention may also employ other functions such as an image reader or scanner to provide a multi-purpose printer unit.

Figure 41:
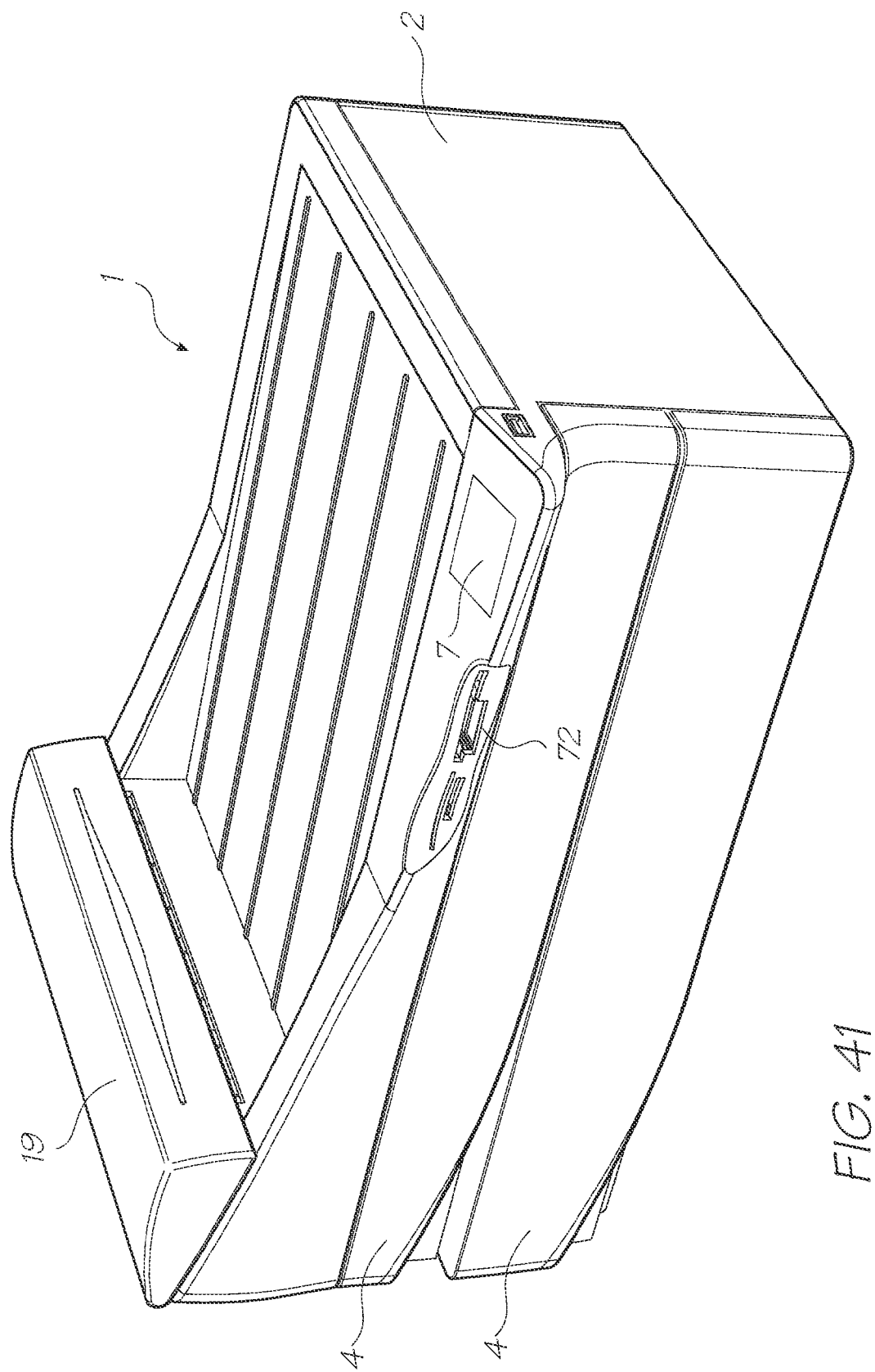
FIG. 41 shows a front perspective view of the printer unit of FIG. 1, having an inlet for receiving a photocard for printing.

As shown in FIG. 41, in an alternative embodiment the printer unit 1 may include a photocard inlet 72 formed in the body 2. The photocard inlet 72 enables a user to remove a photocard from a conventional digital camera or the like and insert the card directly into the inlet 72. In this regard, the control system 51 of the cradle unit is able to receive the image data from the photocard and process the data for printing. In providing an inlet 72 for receiving a photocard, photos can be easily printed by the printer unit 1 without the need to send the photo images to the printer unit 1 via a remote computer.

Figure 42:
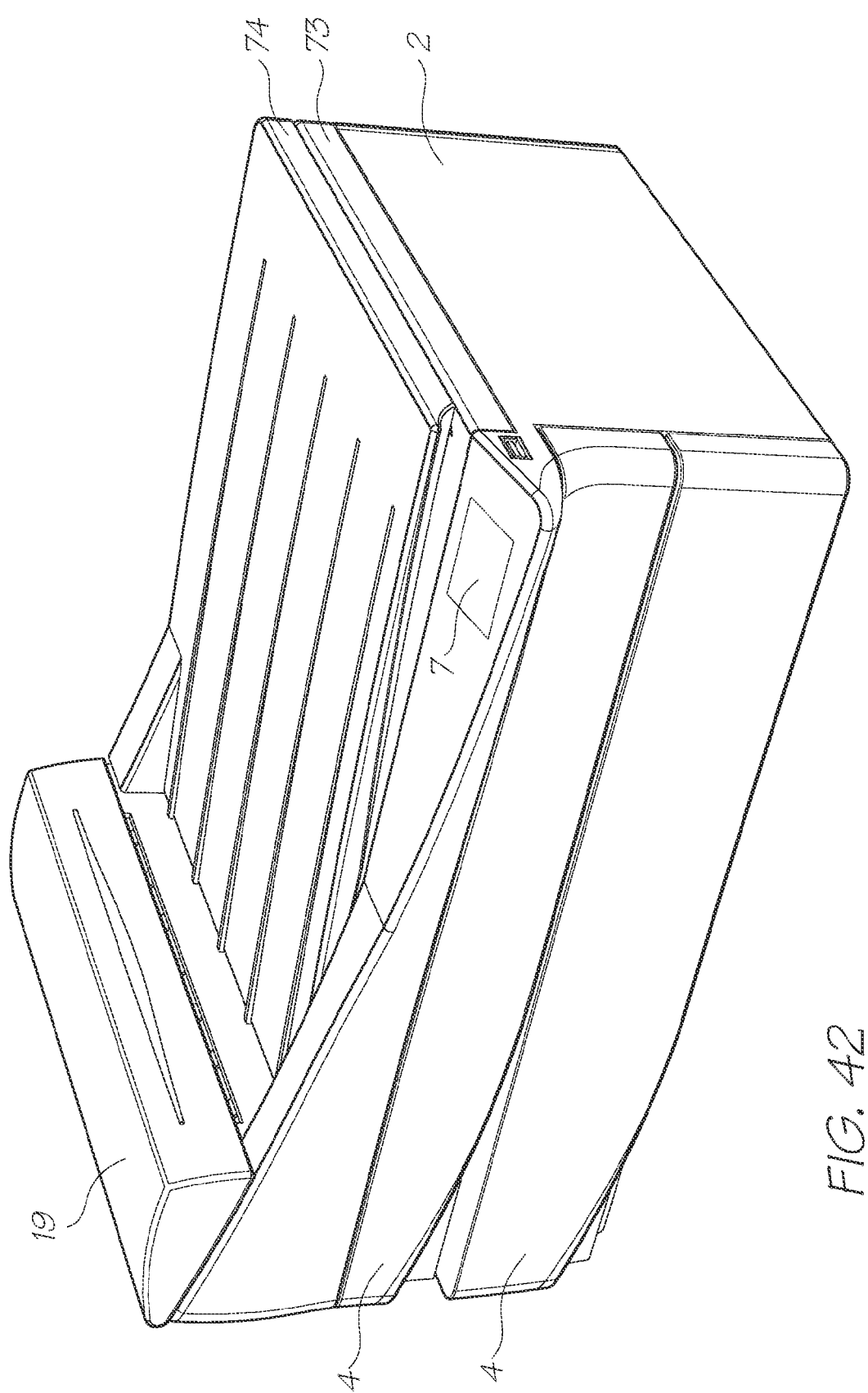
FIG. 42 shows a front perspective view of the printer unit of FIG. 1, having an image reading device incorporated therein.
Figure 43:
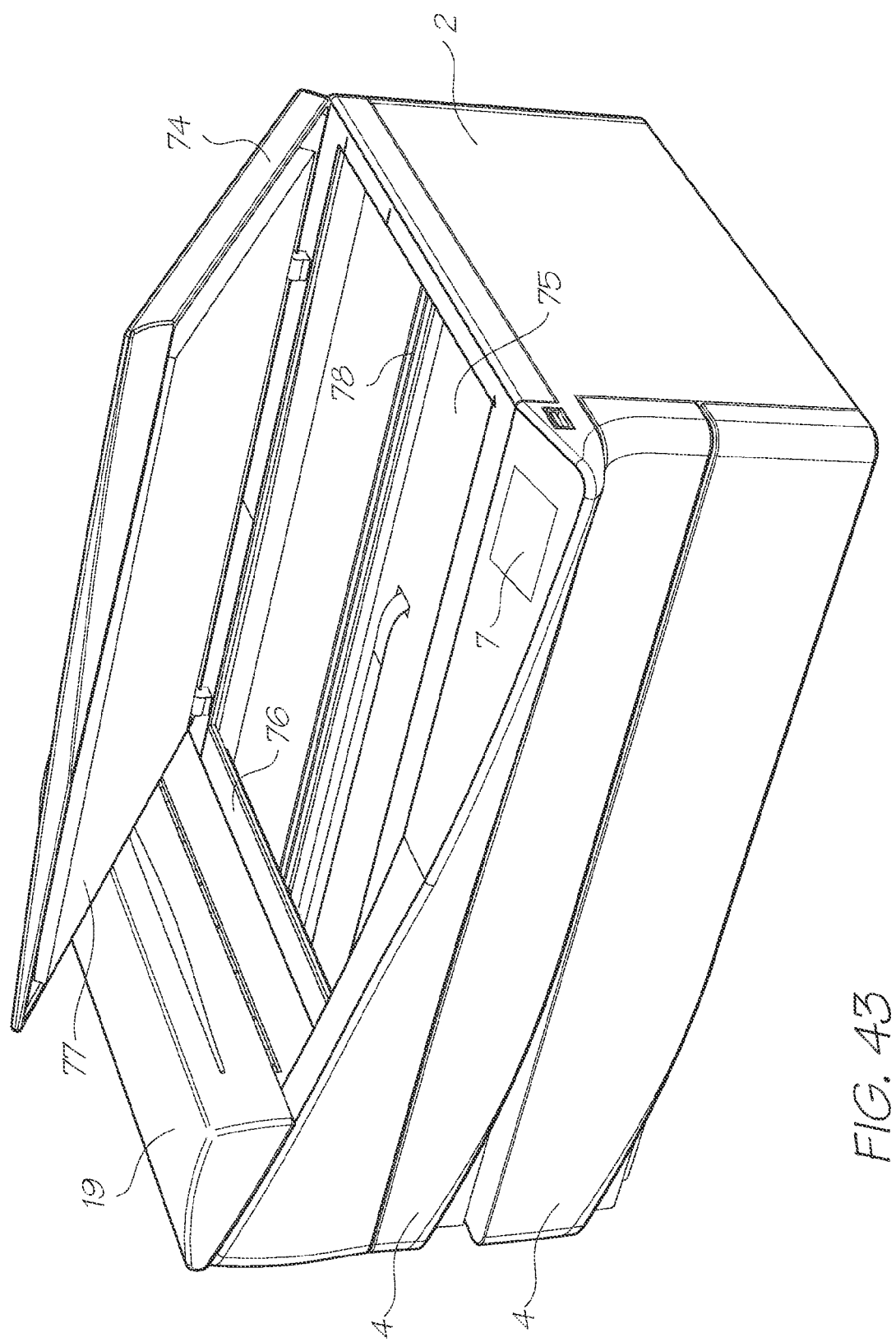
FIG. 43 shows a front perspective view of the printer unit of FIG. 42, having the lid of the image reading device partially opened and showing the image reading surface for receiving a document for reading.
Figure 44:
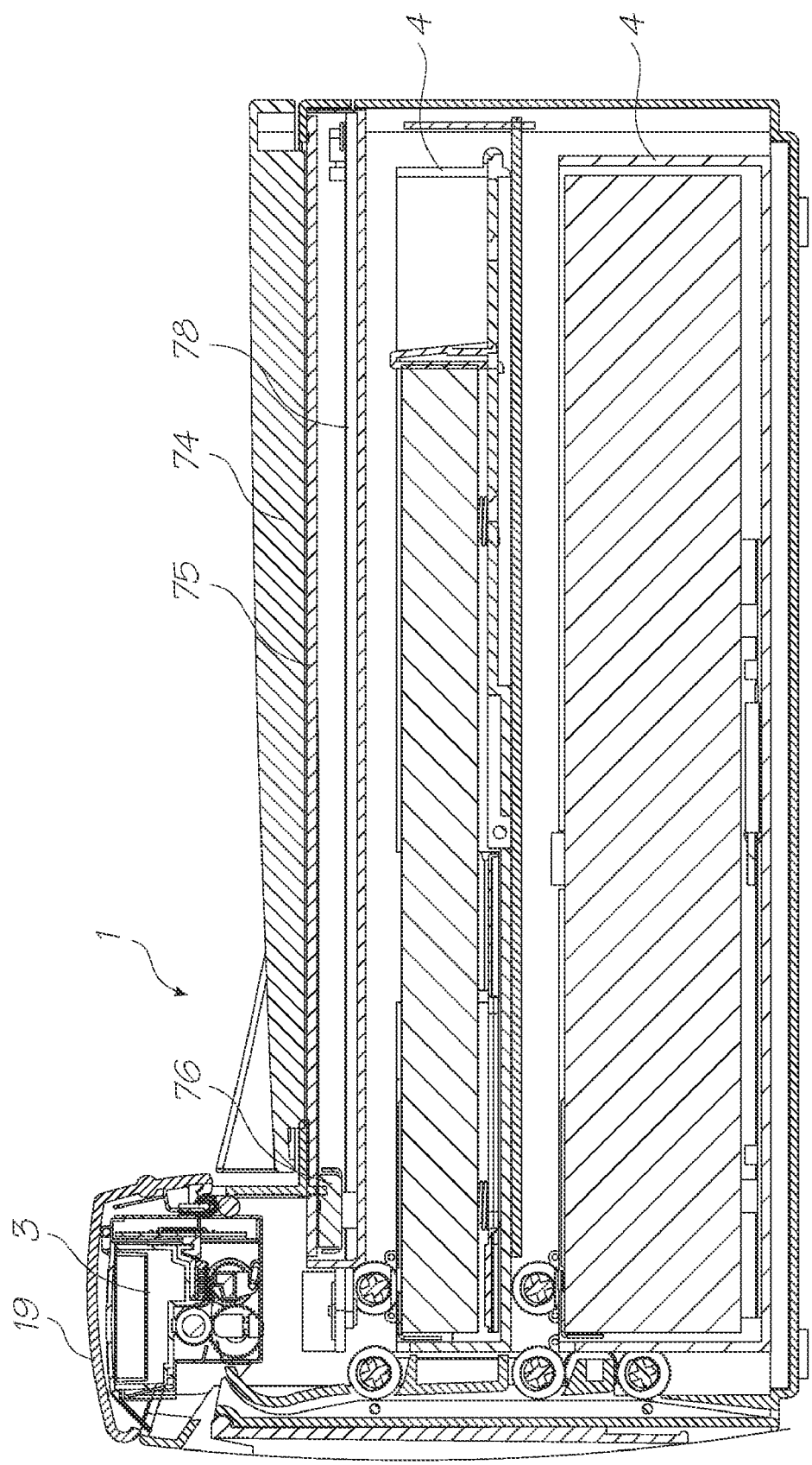
FIG. 44 shows a cross sectional front plan view of the printer unit of FIG. 42.

FIGS. 42-44 show yet another embodiment of the present invention whereby the printer unit includes an image reading device 73, in the form of a flat bed scanner unit. As shown, the image reading device 73 is provided on the upper surface 5 of the printer unit, and the lid 74 of the image reading device 73 forms the media output region 6 which collects the printed media from the print engine 3.

As shown more clearly in FIG. 43, the lid 74 of the image reading device 73 is pivotal upwards to provide access to a reading surface 75 upon which a document can be placed for reading by the image reader 76. The reading surface 75 is a flat glass surface upon which the document can be placed face down for reading. In this regard, the lid 74 may include a pad 77 on its inner surface which contacts the document being read and aids to ensure that the position of the document is maintained during the reading process. The pad 77 may be made from a foam material and is typically white in colour to provide a consistent background which aids in the reading process.

As is more clearly evident in FIG. 44, the image reader 76 of the image reading device 73 is in the form of a scanner head which traverses the document, collecting data associated with the image formed on the document being read. The manner in which the scanner head is configured is well known in the art and the image reader 76 travels along a belt 78, centrally disposed beneath the reading surface 75. Image reading devices of this type are well understood in the art and will not be discussed in more detail in the present application.

Figure 45:
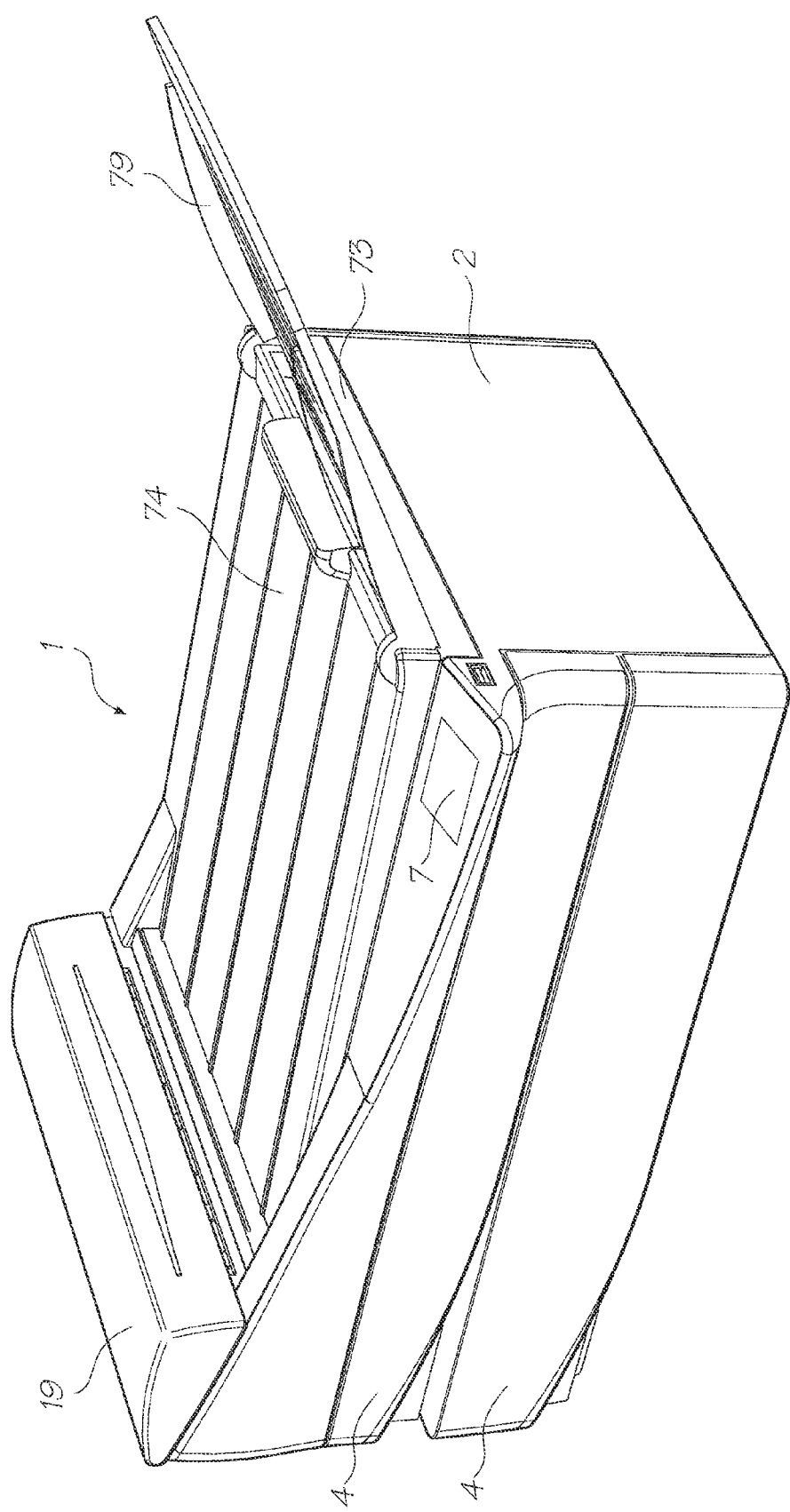
FIG. 45 shows a front perspective view of the printer unit of FIG. 42, having an automatic document feeder for feeding a document to the image reading device for reading.
Figure 46:
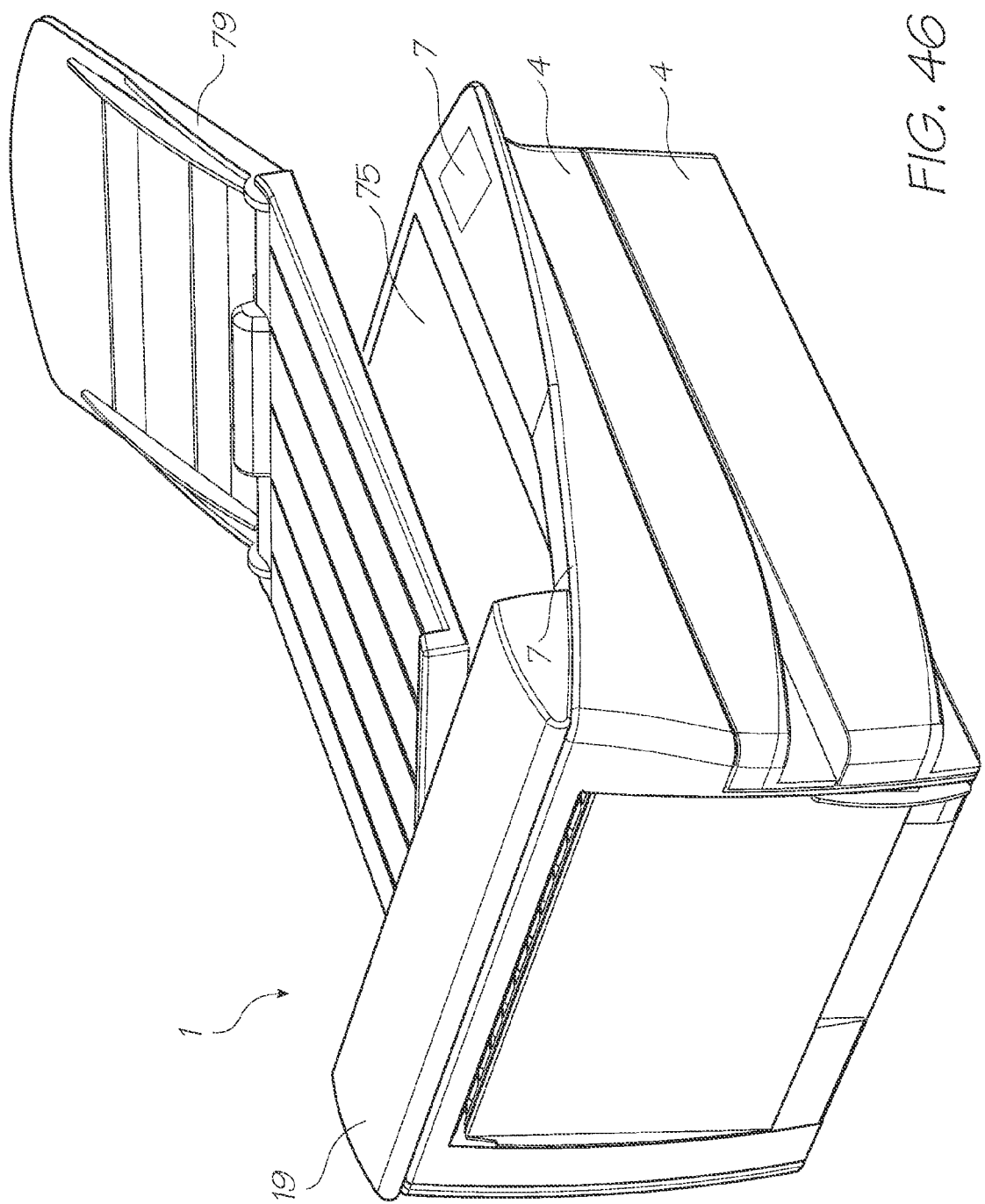
FIG. 46 shows an alternative front perspective view of the printer unit of FIG. 45.

In this embodiment of the present invention, images can be scanned by the image reading device 73 and the data associated with the scanned image sent to the control system 51 of the cartridge unit 21 for processing. Following processing of the image, the control system 51 can initiate printing of the image onto an appropriate media, whereby the printed document can be collected from the media output region 6. As the printer unit 1 is able to provide full colour photo-quality images at speeds of 60 ppm, documents, and in particular, photo images can be readily copied at speeds not previously possible with existing inkjet devices. Alternatively, the data associated with the scanned image may be sent from the printer unit 1 to a remote computer without undergoing the printing step and this can be performed by the control system 51 following commands received from the user through the user interface unit. As shown in FIGS. 45 and 46, the printer unit 1 can be provided with an automatic document feeder 79 which allows reading of multiple page documents without requiring each page to be individually placed on the reading surface 75. Such feeders 79 are well known in the art.

While the present invention has been illustrated and described with reference to exemplary embodiments thereof, various modifications will be apparent to and might readily be made by those skilled in the art without departing from the scope and spirit of the present invention. Accordingly, it is not intended that the scope of the claims appended hereto be limited to the description as set forth herein, but, rather, that the claims be broadly construed.

What is claimed is:

1. A printer comprising:
   a media tray;
   a print engine with a printhead;
   at least first and second auxiliary media trays; and
   a delivery passage extending from a base of the printer to the printhead past the media tray via which media is supplied from the media tray to the printhead,
   wherein the base is configured to engage an upper surface of the first auxiliary media tray, the base having a first opening for delivering first auxiliary media supplied by the first auxiliary media tray into the delivery passage, and
   a lower surface of the first auxiliary media tray is configured to engage an upper surface of the second auxiliary media tray, the lower surface having a second opening for delivering second auxiliary media supplied by the second auxiliary media tray into the delivery passage via an auxiliary delivery passage of the first auxiliary media tray; wherein,
   the first auxiliary media tray has a first picker roller for sequentially picking sheets of the first auxiliary media and feeding them to the first opening, and a first transport roller for sequentially feeding sheets of the second auxiliary media along the auxiliary delivery passage to the first opening, the first picker roller being driven by a first picker motor and the first transport roller being driven by a first transport motor such that the first picker roller and the first transport roller are independently operable; and,
   the second auxiliary media tray has a second picker roller for sequentially picking sheets of the second auxiliary media and feeding them to the first transport roller via the second opening and a second transport roller for sequentially feeding sheets of a further auxiliary media along the auxiliary delivery passage to the second opening, the second picker roller being driven by a second picker motor and the second transport roller being driven by a second transport motor such that the second picker roller and the second transport roller are independently operable; wherein,
   the second auxiliary media tray has a control system and power and data contacts in the upper surface for connection to complementary contacts in the lower surface of the first auxiliary media tray, such that the second picker motor and the second transport motor are operated by the control system to supply media to the print engine as required.

* * * * *